US012321843B2

(12) United States Patent
Nama et al.

(10) Patent No.: US 12,321,843 B2
(45) Date of Patent: Jun. 3, 2025

(54) LOSSLESS TILING IN CONVOLUTION NETWORKS—DATA FLOW LOGIC

(71) Applicant: SambaNova Systems, Inc., Palo Alto, CA (US)

(72) Inventors: Tejas Nagendra Babu Nama, Sunnyvale, CA (US); Ruddhi Chaphekar, Santa Clara, CA (US); Ram Sivaramakrishnan, San Jose, CA (US); Raghu Prabhakar, San Jose, CA (US); Sumti Jairath, Santa Clara, CA (US); Junjue Wang, San Mateo, CA (US); Kaizhao Liang, Palo Alto, CA (US); Adi Fuchs, West Windsor, NJ (US); Matheen Musaddiq, Austin, TX (US); Arvind Krishna Sujeeth, San Francisco, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 306 days.

(21) Appl. No.: 17/700,336

(22) Filed: Mar. 21, 2022

(65) Prior Publication Data
US 2022/0309323 A1    Sep. 29, 2022

Related U.S. Application Data

(60) Continuation of application No. 17/364,110, filed on Jun. 30, 2021, now Pat. No. 11,995,529, which is a
(Continued)

(51) Int. Cl.
*G06N 3/04* (2023.01)

(52) U.S. Cl.
CPC ..................................... *G06N 3/04* (2013.01)

(58) Field of Classification Search
None
See application file for complete search history.

(56) References Cited

U.S. PATENT DOCUMENTS

| 9,646,243 B1 | 5/2017 | Gokmen |
| 10,310,768 B1 | 6/2019 | Gauria et al. |

(Continued)

FOREIGN PATENT DOCUMENTS

WO    2010142987 A1    12/2010

OTHER PUBLICATIONS

U.S. Appl. No. 17/216,657—Office Action dated Jun. 29, 2021, 20 pages.
(Continued)

*Primary Examiner* — Lut Wong
(74) *Attorney, Agent, or Firm* — Flagship Patents; Sikander M. Khan; Bruce A. Young

(57) ABSTRACT

A data processing system includes memory and reconfigurable processors, operatively coupled to the memory, configured to execute a sequence of subgraphs of a graph. The sequence of subgraphs includes a preceding subgraph and a succeeding subgraph. The data processing system also includes data flow logic, operatively coupled to the reconfigurable processors and the memory, configured to store a tiled output of the preceding subgraph as a composed input in the memory and make available parts of the composed input for processing by the succeeding subgraph.

20 Claims, 30 Drawing Sheets

Related U.S. Application Data division of application No. 17/216,651, filed on Mar. 29, 2021, now Pat. No. 11,195,080.

(56) References Cited

U.S. PATENT DOCUMENTS

| | | | |
|---|---|---|---|
| 10,607,331 | B1 | 3/2020 | Tandia et al. |
| 10,812,828 | B2 | 10/2020 | Han et al. |
| 10,891,538 | B2 | 1/2021 | Dally et al. |
| 10,990,650 | B1 | 4/2021 | Vantrease et al. |
| 2014/0177941 | A1 | 6/2014 | Docherty et al. |
| 2014/0201450 | A1 | 7/2014 | Haugen |
| 2016/0239706 | A1 | 8/2016 | Dijkman et al. |
| 2016/0342888 | A1 | 11/2016 | Yang et al. |
| 2016/0350645 | A1 | 12/2016 | Brothers et al. |
| 2017/0102901 | A1 | 4/2017 | Burke |
| 2017/0103309 | A1 | 4/2017 | Chang et al. |
| 2019/0138898 | A1 | 5/2019 | Song et al. |
| 2019/0146497 | A1 | 5/2019 | Urtasun et al. |
| 2019/0220742 | A1* | 7/2019 | Kuo .............. G06N 3/048 |
| 2019/0266485 | A1* | 8/2019 | Singh ............ G06F 9/3001 |
| 2019/0273536 | A1 | 9/2019 | McCallister |
| 2019/0286973 | A1* | 9/2019 | Kovvuri ........... G06N 3/04 |
| 2019/0294108 | A1 | 9/2019 | Ozcan et al. |
| 2019/0295228 | A1 | 9/2019 | Liu et al. |
| 2019/0347549 | A1 | 11/2019 | Phanishayee et al. |
| 2019/0370631 | A1* | 12/2019 | Fais ............... G06F 17/15 |
| 2020/0082215 | A1 | 3/2020 | Aliabadi et al. |
| 2020/0082243 | A1 | 3/2020 | Jin et al. |
| 2020/0159809 | A1 | 5/2020 | Catthoor et al. |
| 2020/0160226 | A1 | 5/2020 | Ross et al. |
| 2020/0193267 | A1 | 6/2020 | Aydonat et al. |
| 2020/0234129 | A1 | 7/2020 | Fagerholm et al. |
| 2020/0272892 | A1 | 8/2020 | Desappan et al. |
| 2020/0279157 | A1 | 9/2020 | Gao et al. |
| 2020/0302223 | A1 | 9/2020 | Dutta et al. |
| 2021/0049463 | A1 | 2/2021 | Ruff |
| 2021/0049804 | A1 | 2/2021 | Sarel et al. |
| 2021/0097347 | A1 | 4/2021 | Kwon et al. |
| 2021/0141571 | A1 | 5/2021 | Lew et al. |
| 2021/0158167 | A1 | 5/2021 | Sharma et al. |
| 2021/0173787 | A1 | 6/2021 | Nagy et al. |
| 2021/0182676 | A1 | 6/2021 | Zlateski et al. |
| 2021/0201124 | A1 | 7/2021 | Gelashvili |

OTHER PUBLICATIONS

U.S. Appl. No. 17/216,655—Office Action dated Jun. 18, 2021, 12 pages.
Sinha, Sudipta N., et al., "Feature tracking and matching in video using programmable graphics hardware", Jul. 16, 2006, 11 pages.
Li, Peng, et. al., "Deep Convolutional Computation Model for Feature Learning on Big Data in Internet of Things", IEEE Transactions on Industrial Informatics, vol. 14, No. 2, Feb. 2018, 9 pages.
Prabhakar et al., Plasticine: A Reconfigurable Architecture for Parallel Patterns, ISCA 2017, Jun. 24-28, 2017, Toronto, ON, Canada, 14 pages.
Koeplinger et al., Spatial: A Language and Compiler for Application Accelerators, Proceedings of the 39th ACM SIGPLAN Conference On Programming Language Design And Embodiment (PLDI), Proceedings of the 43rd International Symposium on Computer Architecture, 2018.
Luo, Yandong, et al., "AILC: Accelerate On-chip Incremental Learning with Compute-in-Memory Technology", DOI 10.1109/TC.2021.3053199, IEEE Transactions on Computers, Jan. 20, 2021, 15 pages.
Jangda et al., Model-Based Warp overlapped Tiling for Image Processing Programs on GPUs, dated Sep. 8, 2020, 14 pages.
Dumoulin et. al., A guide to convolution arithmetic for deep learning, dated Jan. 12, 2018, 31 pages.
Chen et. al., Training Deep Nets with Sublinear Memory Cost, dated Apr. 22, 2016, 12 pages.
Azarkhish et. al., Neurostream: Scalable and Energy Efficient Deep Learning with Smart Memory Cubes, IEEE, dated Sep. 24, 2017, 15 pages.
Kong et. al., Take it in your stride: Do we need striding in CNNs, Carnegie Mellon University, dated Dec. 7, 2017, 9 pages.
Pinckaers et. al., Training Convolutional Neural Networks with Megapixel Images, dated Apr. 16, 2018, 3 pages.
Gui et. al., A Survey on Graph Processing Accelerators: Challenges and Opportunities, dated Feb. 26, 2019, 41 pages.
Pinckaers et. al., Streaming convolutional neural networks for end-to-end learning with multi-megapixel images, dated Nov. 11, 2019, 10 pages.
Kim et. al., DeepTrain: A Programmable Embedded Platform for Training Deep Neural Networks, IEEE Transactions on Computer Aided Design of Integrated Circuits and Systems, dated Nov. 11, 2018, 11 pages.
Schuiki et. al., A scalable near-memory architecture for Training Deep Neural Networks on Large In-Memory Datasets, IEEE Transactions on Computers, vol. 68, No. 4, Apr. 2019, 14 pages.
Liu et. al., An FPGA-Based CNN Accelerator Integrating Depthwise Separable Convolution, Electronics, published Mar. 3, 2019, 18 pages.
Park et. al., HetPipe: enabling Large DNN Training on (Whimpy) Heterogeneous GPU Clusters through Integration of Pipelined Model Parallelism and Data Parallelism, Proceedings of the USENIX Annual Technical Conference, Jul. 15-17, 2020, 16 pages.
Anonymous, BDS-GCN: Efficient full-graph training of graph convolutional nets with partition parallelism and boundary sampling, ICLR, 2021, 11 pages.
Venkataramanaiah et. al., Automatic Compiler Based FPGA Accelerator for CNN Training, dated Aug. 15, 2019, 7 pages.
Podlozhnyuk, Image Convolution with CUDA, NVIDIA, Jun. 2007, 21 pages.
NVIDIA, CSE 599 I Accelerated Computing—Programming GPUs, GPU teaching kit, 61 pages.
Hua et. al., Reverse Engineering Convolutional Neural Networks Through side-channel Information Leaks, DAC 2018, Jun. 24-29, 2018, San Francisco, USA, 6 pages.
Clemons et. al., A Patch memory system for Image Processing and Computer Vision, IEEE 2016, 13 pages.
Anonymous, ECE Exam 1 study guide, Spring 2019, 25 pages.
Zlateski et. al., FFt Convolutions are faster than Winograd on Modern CPUs, Here's Why, dated Sep. 20, 2018, 17 pages.
Zhou et. al., Hierarchical Overlapped Tiling, 12 pages.
Boris Ginzburg, Lecture 3: CNN: Backpropagation, Intel, 18 pages.
Ma, Hardware Acceleration of Deep Convolutional Neural Networks on FPGA, Arizona State University, Dec. 2018, 169 pages.
Versamopoulos et. al., Decoding surface code with a distributed neural network based decoder, published Feb. 6, 2019, 12 pages. Retrieved from the internet [URL: https://researchgate.net/publication/330751526 ].
Liu et. al., Memory-Efficient Architecture for Accelerating Generative Networks on FPGA, EPSRC and European Union Horizon 2020, 8 pages.
Werkhoven et. al., Optimizing Convolution Operations in CUDA and Adaptive Tiling, 12 pages.
U.S. Appl. No. 17/216,651—Non-Final Rejection, dated Jul. 13, 2021, 12 pages.
U.S. Appl. No. 17/216,657—Response to Office Action, dated Jun. 29, 2021, filed Jul. 12, 2021, 16 pages.
U.S. Appl. No. 17/216,655—Response to Office Action, dated Jun. 18, 2021, filed Jul. 12, 2021, 12 pages.
M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.
Podobas et al, A Survey on Coarse-Grained Reconfigurable Architectures From a Performance Perspective, IEEEAccess, vol. 2020. 3012084, Jul. 27, 2020, 25 pages.
U.S. Appl. No. 17/216,651—Response to First Office Action, dated Jul. 13, 2021, filed Jul. 23, 2021, 14 pages.
U.S. Appl. No. 17/216,651—Notice of Allowance, dated Aug. 5, 2021, 14 pages.

(56) References Cited

OTHER PUBLICATIONS

U.S. Appl. No. 17/216,652—Office Action, dated Aug. 2, 2021, 24 pages.
Ren et. al., SBNet: Sparse Blocks Network for Fast Inference, Proceedings of the IEEE Conference on Computer Vision and Pattern Recognition (CVPR), 2018, pp. 8711-8720.
Dathathri et. al., CHET: Compiler and Runtime for Homomorphic Evaluation of Tensor Programs, arXiv:1810.00845v1, dated Oct. 1, 2018.
U.S. Appl. No. 17/216,657—Office Action dated Jul. 28, 2021, 28 pages.
U.S. Appl. No. 17/216,655—Office Action dated Jul. 28, 2021, 16 pages.
U.S. Appl. No. 17/216,654—Office Action dated Sep. 1, 2021, 81 pages.
Zeng, Hanging, et., al, "GraphACT: Accelerating GCN Training on CPU FPGA Heterogeneous Platforms" Feb. 23-25, 2020 11 pages.
U.S. Appl. No. 17/216,657—Office Action dated Sep. 22, 2021, 22 pages.
U.S. Appl. No. 17/216,655—Notice of Allowance dated Aug. 25, 2021, 9 pages.
U.S. Appl. No. 17/216,657—Response to Office Action dated Jul. 28, 2021, filed Aug. 11, 2021, 12 pages.
U.S. Appl. No. 17/216,657—Response to Office Action dated Sep. 22, 2021, filed Sep. 27, 2021, 13 pages.
U.S. Appl. No. 17/216,657 Notice of Allowance, dated Oct. 20, 2021, 16 pages.
U.S. Appl. No. 17/216,652—Response to Office Action dated Aug. 2, filed Aug. 13, 2021, 11 pages.
U.S. Appl. No. 17/216,652—Notice of Allowance, dated Aug. 23, 2021, 9 pages.
Mittal et. al., A Survey on Hardware Accelerators and Optimization on Techniques for RNNs, Journal of Systems Architecture, dated Jul. 2020, 57 pages.
Wang et. al., FPDeep: Scalable Acceleration of CNN Training on Deeply-Pipelined FPGA Clusters, Transactions on Computers, vol. 14, No. 8, dated Aug. 2020, 16 pages.
U.S. Appl. No. 17/216,654—Response to Office Action dated Sep. 1, 2021, filed Sep. 8, 2021, 18 pages.
U.S. Appl. No. 17/216,654 Notice of Allowance, dated Oct. 8, 2021, 20 pages.
U.S. Appl. No. 17/216,655—Response to Office Action dated Jul. 28, 2021, filed Aug. 11, 2021, 9 pages.
List of Related Cases, Aug. 8, 2023, 2 pages.
TW 111111672—Office Action dated Sep. 14, 2022, 5 pgs.
U.S. Appl. No. 17/364,110 Non Final Office Action, dated Jun. 30, 2023, 58 pages.
U.S. Appl. No. 17/364,129—Office Action dated Aug. 9, 2023, 62 pages.
U.S. Appl. No. 17/384,507—Non-final Rejection, dated May 5, 2023, 64 pages.

\* cited by examiner

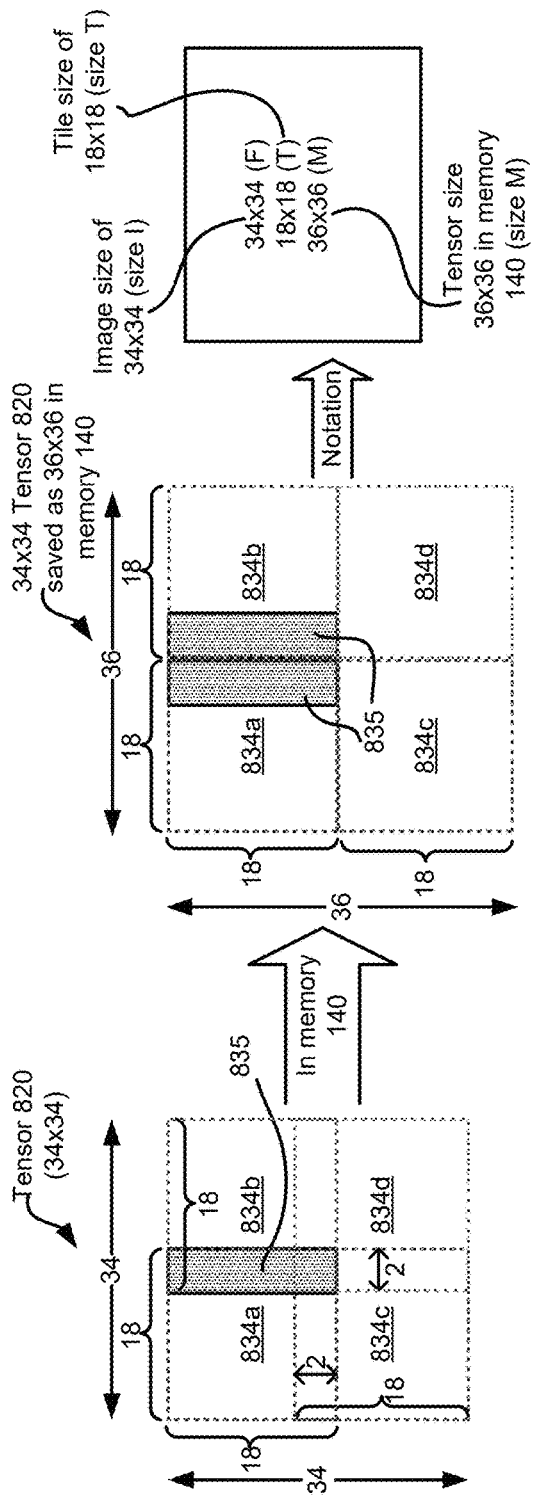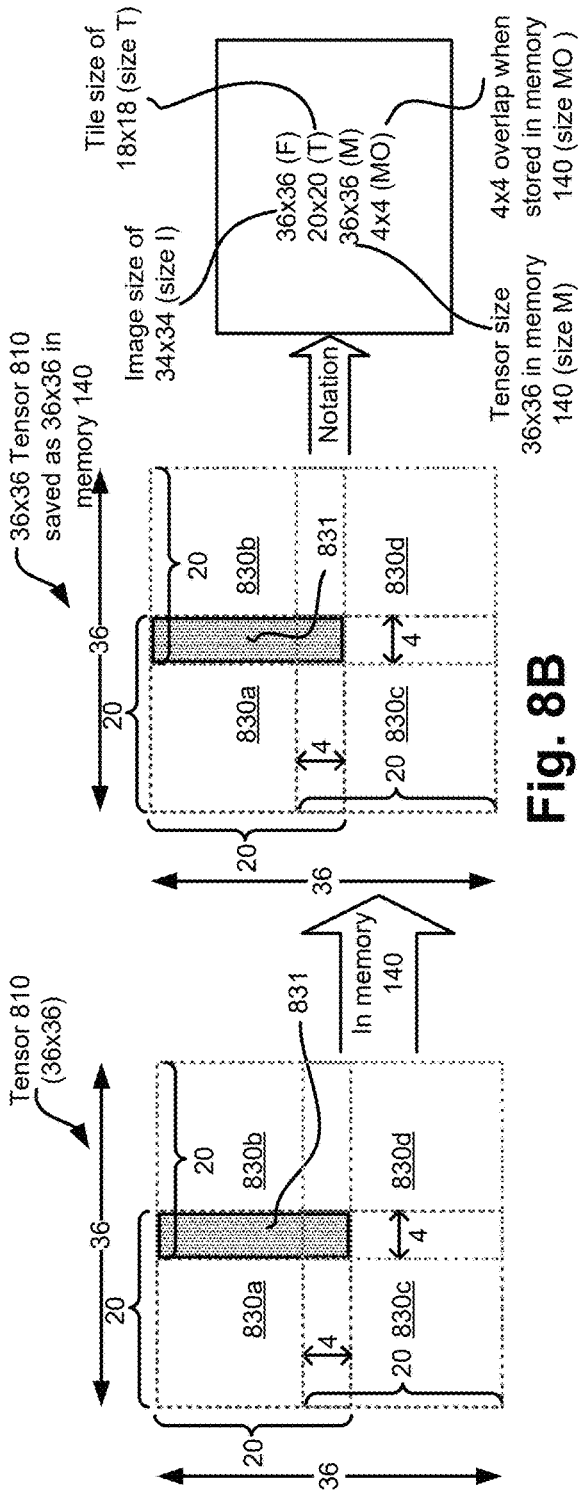

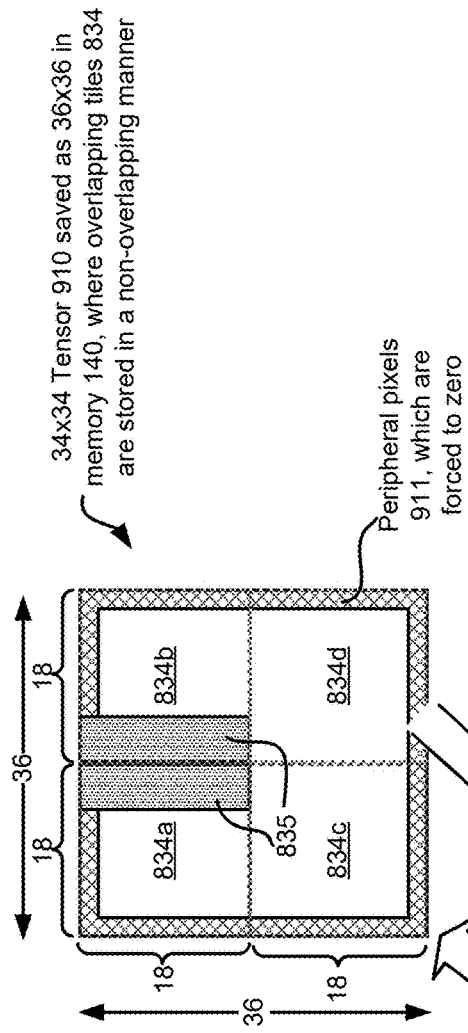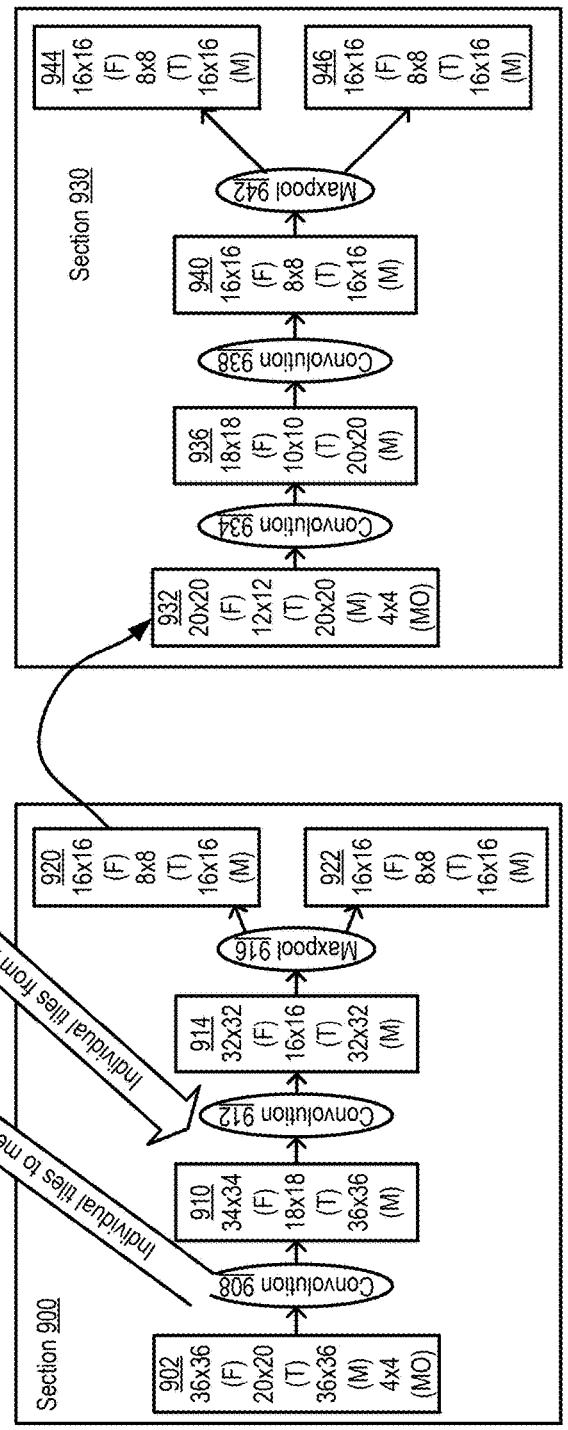
Fig. 9E

1200

```
Receive a processing graph comprising a plurality of sections, where each
section comprises a sequence of processing nodes 1, ..., N, where N is a
positive integer greater than 1,
where for a section in a forward path, a corresponding input node forms a
corresponding 1st processing node, and
where for a section in a backward path, a corresponding input node forms a
corresponding Nth processing node (1204)
```

↓

Determine a $(N+1)^{th}$ tiling configuration comprising a set of non-overlapping tiles for a $(N+1)^{th}$ tensor, and add the $(N+1)^{th}$ tiling configuration to graph metadata (1208)

↓

Set index i = N (1212)

↓

Determine an $i^{th}$ tiling configuration comprising a set of overlapping tiles for an $i^{th}$ tensor, based on a previously determined tiling configuration for $(i+1)^{th}$ tensor, and add $i^{th}$ tiling configuration to graph metadata (1216)

↓ i = 1? (1220)

No → Decrement index i by one (1224)

Yes ↓

Compile the processing graph, based on the graph metadata, to generate a configuration file that is configured in accordance with the $1^{st}$, ..., $N^{th}$ tiling configuration for each section (1228)

Repeat blocks 1208, ..., 1224 for each section of the plurality of sections of the processing graph

Fig. 12A

LOSSLESS TILING IN CONVOLUTION NETWORKS—DATA FLOW LOGIC

CROSS-REFERENCE TO RELATED APPLICATIONS

This application is a continuation of U.S. patent application Ser. No. 17/364,110, now U.S. Pat. No. 11,995,529 B1, entitled "LOSSLESS TILING IN CONVOLUTION NETWORKS-TILING CONFIGURATION FOR A SEQUENCE OF SECTIONS OF A GRAPH," filed Jun. 30, 2021 which is a divisional of U.S. patent application Ser. No. 17/216,651, now U.S. Pat. No. 11,195,080 B1, entitled "LOSSLESS TILING IN CONVOLUTION NETWORKS-TILING CONFIGURATION," filed Mar. 29, 2021. Both of the aforementioned non-provisional applications are incorporated by reference for all purposes.

FIELD OF THE TECHNOLOGY DISCLOSED

The technology disclosed relates to enhanced tiling within a neural network, which can be implemented using processors like Central Processing Units (CPUs), Graphics Processing Units (GPUs), Field Programmable Gate Arrays (FPGAs), Coarse-Grained Reconfigurable Architectures (CGRAs), Application-Specific Integrated Circuits (ASICs), Application Specific Instruction-set Processor (ASIP), and Digital Signal Processors (DSPs). In particular, the technology disclosed relates to using tiling to process relatively large input sizes.

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," *Proceedings Of The 39th ACM SIGPLAN Conference On Programming Language Design And Implementation* (PLDI), Proceedings of the 43rd International Symposium on Computer Architecture, 2018;

U.S. Non-provisional patent application Ser. No. 16/239,252, now U.S. Pat. No. 10,698,853 B1, filed Jan. 3, 2019, entitled, "VIRTUALIZATION OF A RECONFIGURABLE DATA PROCESSOR;"

U.S. Non-provisional patent application Ser. No. 16/197,826, now U.S. Pat. No. 10,831,507 B2, filed Nov. 21, 2018, entitled, "CONFIGURATION LOAD OF A RECONFIGURABLE DATA PROCESSOR;"

U.S. Non-provisional patent application Ser. No. 16/198,086, now U.S. Pat. No. 11,188,497 B2, filed Nov. 21, 2018, entitled, "CONFIGURATION UNLOAD OF A RECONFIGURABLE DATA PROCESSOR;"

U.S. Non-provisional patent application Ser. No. 16/260,548, now U.S. Pat. No. 11,080,227 B2, filed Jan. 29, 2019, entitled, "MATRIX NORMAL/TRANSPOSE READ AND A RECONFIGURABLE DATA PROCESSOR INCLUDING SAME;"

U.S. Non-provisional patent application Ser. No. 16/536,192, now U.S. Pat. No. 11,080,227 B2, filed Aug. 8, 2019, entitled, "COMPILER FLOW LOGIC FOR RECONFIGURABLE ARCHITECTURES;"

U.S. Non-provisional patent application Ser. No. 16/407,675, now U.S. Pat. No. 11,386,038 B2, filed May 9, 2019, entitled, "CONTROL FLOW BARRIER AND RECONFIGURABLE DATA PROCESSOR;"

U.S. Non-provisional patent application Ser. No. 16/504,627, now U.S. Pat. No. 11,055,141 B2, filed Jul. 8, 2019, entitled, "QUIESCE RECONFIGURABLE DATA PROCESSOR;"

U.S. Non-provisional patent application Ser. No. 16/572,516, published as US 2021/0081691 A1, filed Sep. 16, 2019, entitled, "EFFICIENT EXECUTION OF OPERATION UNIT GRAPHS ON RECONFIGURABLE ARCHITECTURES BASED ON USER SPECIFICATION;"

U.S. Non-provisional patent application Ser. No. 16/744,077, now U.S. Pat. No. 11,836,629 B2, filed Jan. 15, 2020, entitled, "COMPUTATIONALLY EFFICIENT SOFTMAX LOSS GRADIENT BACKPROPAGATION;"

U.S. Non-provisional patent application Ser. No. 16/590,058, now U.S. Pat. No. 11,327,713 B2, filed Oct. 1, 2019, entitled, "COMPUTATION UNITS FOR FUNCTIONS BASED ON LOOKUP TABLES;"

U.S. Non-provisional patent application Ser. No. 16/695,138, now U.S. Pat. No. 11,328,038 B2, filed Nov. 25, 2019, entitled, "COMPUTATIONAL UNITS FOR BATCH NORMALIZATION;"

U.S. Non-provisional patent application Ser. No. 16/688,069, now U.S. Pat. No. 11,327,717 B2, filed Nov. 19, 2019, entitled, "LOOK-UP TABLE WITH INPUT OFFSETTING;"

U.S. Non-provisional patent application Ser. No. 16/718,094, now U.S. Pat. No. 11,150,872 B2, filed Dec. 17, 2019, entitled, "COMPUTATIONAL UNITS FOR ELEMENT APPROXIMATION;"

U.S. Non-provisional patent application Ser. No. 16/560,057, now U.S. Pat. No. 11,327,923 B2, filed Sep. 4, 2019, entitled, "SIGMOID FUNCTION IN HARDWARE AND A RECONFIGURABLE DATA PROCESSOR INCLUDING SAME;"

U.S. Non-provisional patent application Ser. No. 16/572,527, now U.S. Pat. No. 11,410,027 B2, filed Sep. 16, 2019, entitled, "PERFORMANCE ESTIMATION-BASED RESOURCE ALLOCATION FOR RECONFIGURABLE ARCHITECTURES;"

U.S. Non-provisional patent application Ser. No. 15/930,381, now U.S. Pat. No. 11,250,105 B2, filed May 12, 2020, entitled, "COMPUTATIONALLY EFFICIENT GENERAL MATRIX-MATRIX MULTIPLICATION (GeMM);"

U.S. Non-provisional patent application Ser. No. 16/890,841, now U.S. Pat. No. 11,709,664 B2, filed Jun. 2, 2020, entitled, "ANTI-CONGESTION FLOW CONTROL FOR RECONFIGURABLE PROCESSORS;"

U.S. Non-provisional patent application Ser. No. 16/922,975, now U.S. Pat. No. 11,809,908 B2, filed Jul. 7, 2020, entitled, "RUNTIME VIRTUALIZATION OF RECONFIGURABLE DATA FLOW RESOURCES;"

U.S. Non-provisional patent application Ser. No. 16/996,666, now U.S. Pat. No. 11,782,729 B2, filed Aug. 18, 2020, entitled, "RUNTIME PATCHING OF CONFIGURATION FILES;"

U.S. Non-provisional patent application Ser. No. 17/023,015, now U.S. Pat. No. 11,237,971 B1, filed Sep. 16, 2020, "COMPILE TIME LOGIC FOR DETECTING STREAMING COMPATIBLE AND BROADCAST COMPATIBLE DATA ACCESS PATTERNS;" and U.S. Non-provisional patent application Ser. No. 17/031,679, now U.S. Pat. No. 11,645,057 B2, filed Sep. 24, 2020, "SYSTEMS AND METHODS FOR MEMORY LAYOUT DETERMINATION AND CONFLICT RESOLUTION."

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

With advent of higher resolution image capturing devices, sizes of image datasets used in various applications are increasing correspondingly. For example, images in 4 k resolution (e.g., 3840×2160 pixel resolution) are now widely available, and even higher resolution images (such as up to, or even higher than 8 k) can be captured. Medical images, such as a 3-dimensional (3D) Computerized Tomography (CT) scan or a pathology image, can have $10^8$ to $10^9$, or even higher numbers of pixels. A whole slide image used in medical applications can have billions of pixels. It is difficult to process such images in machine learning or neural networks, such as Convolutional Neural Networks (CNN), Fully Connected Neural Networks (FCNN), Recurrent Neural Networks (RNN), Long Short-Term Memory (LSTM) networks, autoencoders, deep belief networks, Generative Adversarial Networks (GAN), and/or the like. For example, processing a relatively large sized image requires a corresponding relatively large sized memory and/or large processing power. For example, a single convolution activation of a 3D image having 512×512×512 pixels and with 64 out channels can occupy about 137 GB RAM (Random Access Memory).

When handling such large sized images, downsampling of the image to a lower resolution is often employed, although such downsampling results in loss of information, which can result in relatively less accurate image analysis results. In another example, the image can be split into patches, and different patches can be handled using different models or different neural networks, and a decision fusion model can be used to fuse decisions from the different models. However, such handling of images requires patch level annotations and can be accompanied by other complications. Also, very large input images (e.g., comprising billions of pixels) may not often be satisfactorily processed using the patch-based approach, and the patch-based approach also suffers from insufficient labels usable for image identification tasks.

Yet another approach towards handling relatively large image is to execute data parallelism across spatial dimension of the image, e.g., using Mesh-TensorFlow, which is a framework for large scale data and model parallelism. With this technique, a 3D Unet is trained on up to, in an example, 512×512×512 resolution data. For example, the image is spatially partitioned. Each computational device (such as GPUs and/or Tensor Processing Units (TPUs)) processes corresponding patches. Before every convolution operation, the computational devices exchange patch margins (e.g., half the size of the convolution kernel) with each other, which results in increased computational burden.

The above discussed procedures and supporting structures for processing such large sized images using machine learning models can be complex, and the execution of the procedures can be time consuming and computationally expensive.

Thus, computationally efficient means for processing such large sized images using machine learning models is desired.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 8A and 8B respectively illustrate materialization of a first example tensor and a second example tensor, where during the materialization, the two example tensors are stored in a memory that is external to a data processor.

FIG. 9E illustrates a manner in which a tensor is materialized, where the tensor is within a section and is not an input or output tile of any section.

FIG. 12A illustrates a flowchart depicting a method for generating graph metadata that includes tiling decisions for a processing graph, and compiling the processing graph based on the tiling decisions included in the metadata.

DETAILED DESCRIPTION

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Elements referred to herein with a common reference label followed by a particular number or alphabet may be collectively referred to by the reference label alone. For example, tiles 308a, 308b, . . . , 308R (illustrated in FIG. 3A) may be collectively and generally referred to as tiles 308 (a-R) or simply as tiles 308 in plural, and tile 308 in singular.

System Architecture

Figure 1:
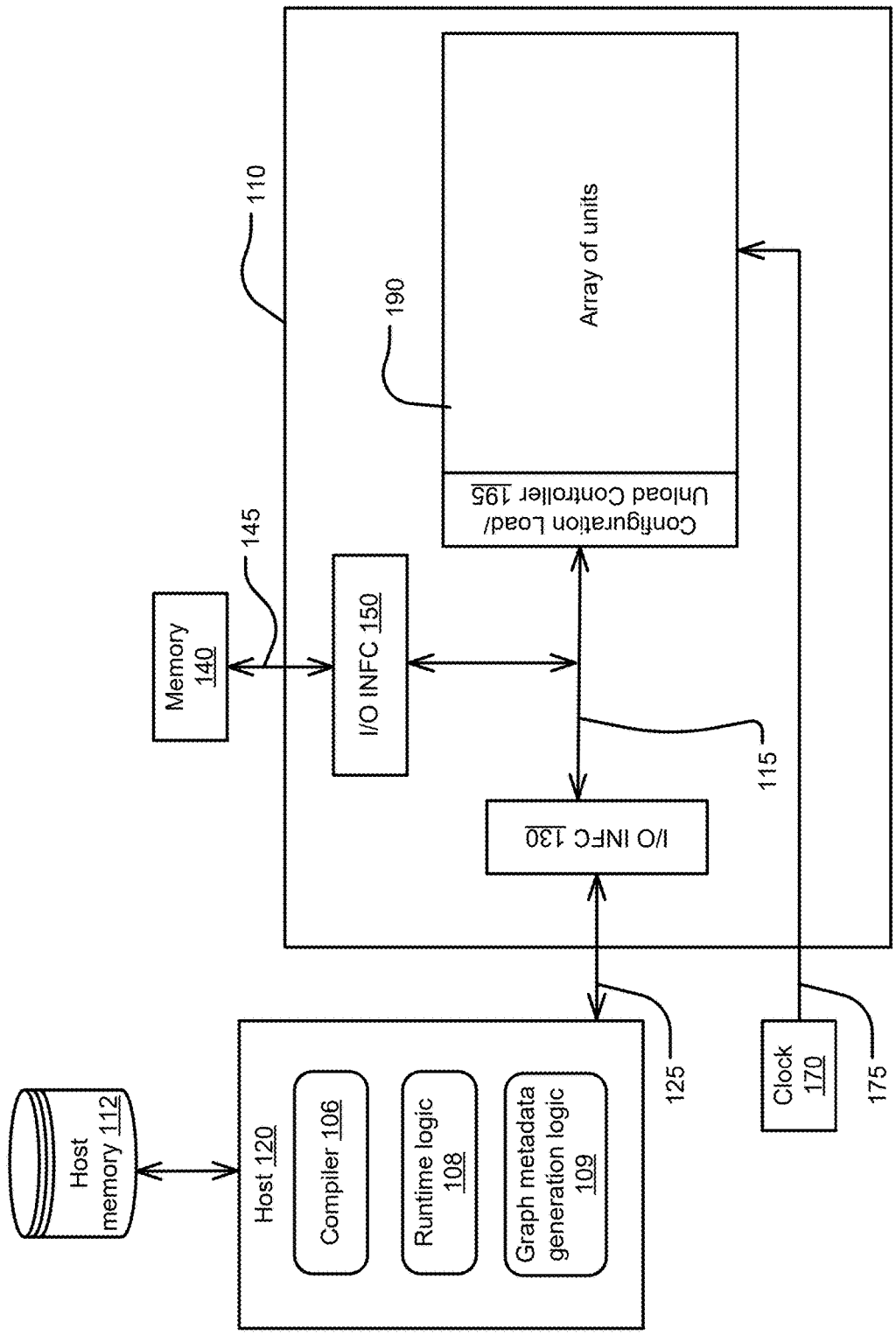
FIG. 1 is a diagram illustrating a system including a host, a memory, and an example data processor.

Systems and processes for tiling images that are processed by a neural network (such as a CNN, or another type of neural network) are described. The systems and processes will be described with reference to FIG. 1 showing an architectural level schematic of a system 100 undertaking tiling decisions and implementing tiling of the various tensors in accordance with an implementation. Because FIG. 1 is an architectural diagram, certain details of the system 100 are intentionally omitted to improve the clarity of the description. It may be noted that system 100 can include the same, more, or fewer elements configured in the same or different manner in other implementations.

FIG. 1 is a diagram illustrating a system 100 including a host 120, a memory 140, and an example data processor 110. As shown in the example of FIG. 1, the data processor 110 includes an array 190 of units and a configuration load/unload controller 195. In an embodiment, the data processor 110 is a reconfigurable data processor 110, and the array 190 of units comprises an array of configurable units.

Examples of units in the array 190 are further described later in this disclosure, e.g., with respect to FIG. 13. Individual ones of the units can include, or can have units configured to implement, a computation unit or a memory unit, as described herein. Examples of the data processor 110 include Graphics Processing Unit (GPU), Central Processing Unit (CPU), Field Programmable Gate Arrays (FPGAs), Coarse-Grained Reconfigurable Architectures (CGRAs), Application-Specific Integrated Circuits (ASICs), and Application Specific Instruction-set Processor (ASIP). In an example where the data processor 110 is a reconfigurable data processor, examples of the data processor 110 includes FPGAs, CGRAs, ASICs, and ASIP.

Various examples and embodiments discussed herein assume that the data processor 110 is a reconfigurable data processor, and units within the array 190 are configurable units. However, such an assumption is to facilitate discussion of the examples and embodiments, and not limit the scope of this disclosure. For example, the tiling decisions and tiling of tensors, as discussed throughout this disclosure, can be performed by a reconfigurable data processor, and can also be performed by non-reconfigurable data processors (such as GPUs and/or CPUs).

The data processor 110 includes an external I/O interface 130 connected to the host 120 by line 125, and an external I/O interface 150 connected to the memory 140 by line 145. The I/O interfaces 130, 150 connect via a bus system 115 to the array 190 of processing units and to the configuration load/unload controller 195.

The memory 140 is within a chip that is different from a chip comprising the data processor 110, and hence, the memory 140 is also referred to herein as an off-chip memory. In contrast, the reconfigurable array of units 190 comprises configurable memory units (such as local memory 128 illustrated in FIG. 2), which are referred to herein as on-chip memory.

In an example where the data processor 110 is a reconfigurable data processor and where the processing units within the array 190 are configurable units, the configurable units can be configured to perform specific operations. For example, the array 190 is an array of configurable units, which includes configurable compute units and configurable memory units in a programmable interconnect fabric. The array of configurable units in a reconfigurable processor is partitionable into a plurality of subarrays (or tiles) of configurable units, as will be discussed herein in turn.

The host 120 executes a compiler 106 to compile applications and a runtime logic 108 to execute the compiled applications on the data processor 110. For example, the compiler 106 compiles a high-level application and generates one or more corresponding configuration files. The runtime logic 108 is configured to load and execute the one or more configuration files on the reconfigurable data processor 110. The reconfigurable data processor 110 is configured to process the configuration files and generate corresponding outputs.

For example, to configure the configurable units in the array 190 of configurable units with a configuration file, the host 120 can send the configuration file to the memory 140 via the I/O interface 130, the bus system 115, and the I/O interface 150 in the reconfigurable data processor 110. The configuration file can be loaded in many ways, as suits a particular architecture, including in data paths outside the data processor 110. The configuration file can be retrieved from the memory 140 via the memory I/O interface 150. Chunks of the configuration file can then be sent in a distribution sequence to configurable units in the array 190 of configurable units in the reconfigurable data processor 110.

The host 120 also executes a graph metadata generation logic 109, which generates graph metadata. For example, as will be discussed herein in further detail, individual tensors processed by the neural network executed in the system 100 can be divided in multiple tiles, and graph metadata associated with a tensor stores tiling information associated with the tensor.

An external clock generator 170 or other clock line sources can provide a clock line 175 or clock lines to elements in the reconfigurable data processor 110, including the array 190 of configurable units, and the bus system 115, and the external data I/O interfaces. The bus system 115 can communicate data at a processor clock rate via a clock line 175 or clock lines.

Figure 2:
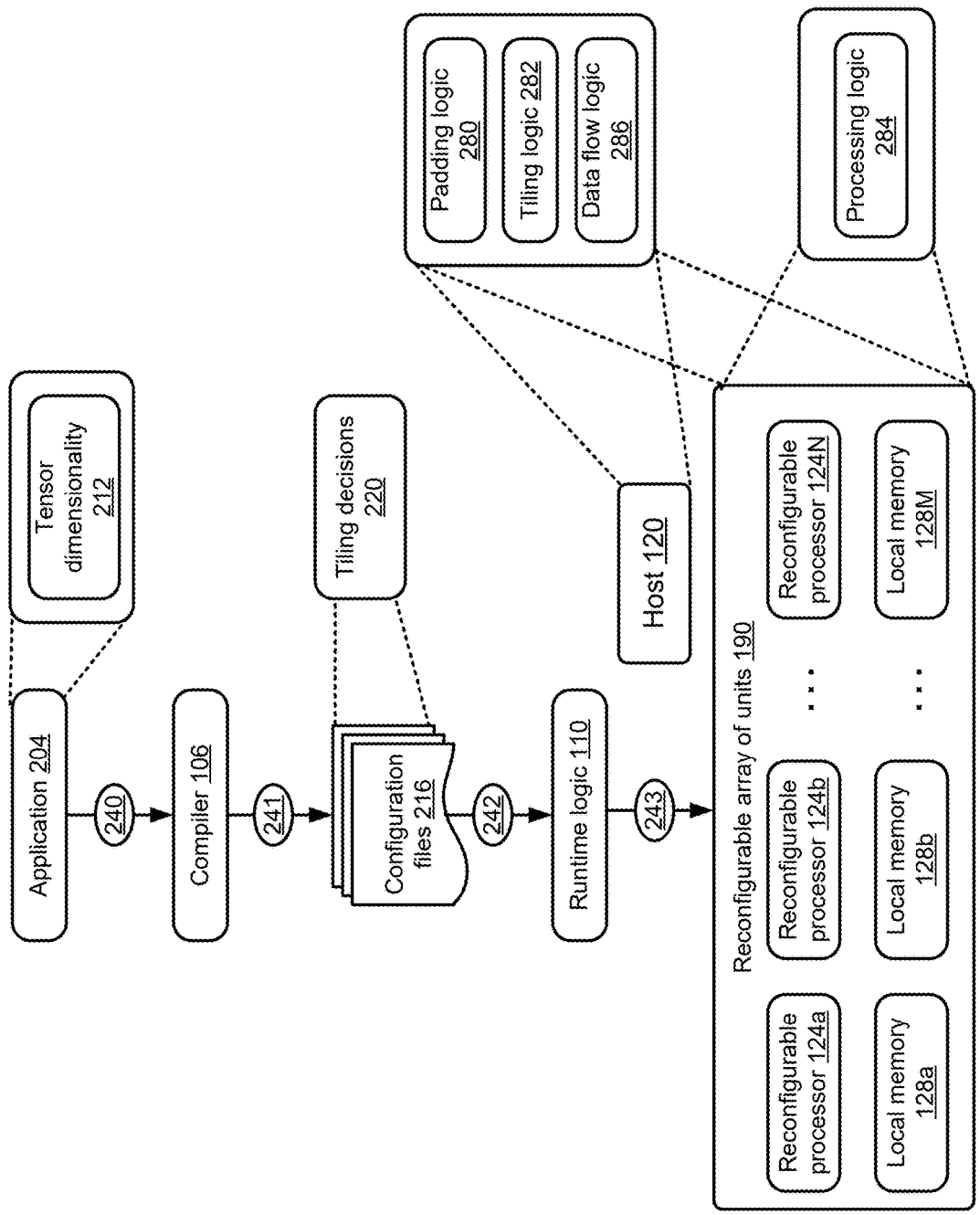
FIG. 2 illustrates compilation and execution of configuration files in the system of FIG. 1.

FIG. 2 illustrates compilation and execution of configuration files in the system 100 of FIG. 1. At operation 240, the compiler 106 receives an application 204 for compilation. The application, for example, is a neural network application. The application involves processing tensors using a neural network, such as a CNN. In an embodiment, the application 204 includes information (such as metadata) specifying tensor dimensionality 212, which provides dimensions of input tensors, output tensors, and/or one or more intermediate tensors.

At operation 241, the compiler 106 compiles the application 204 to generate one or more configuration files 216. The configuration files 216 include a plurality of functions. Examples of functions in the plurality of functions include, but are not limited to, non-linearities like Rectified Linear Unit (ReLU) and its variants (e.g., leaky ReLU), convolution, transpose convolution, hyperbolic tangent, sigmoid, and softmax, element-wise addition, matrix multiplication (e.g., General Matrix Multiply (GeMM)), layer normalization (e.g., batch normalization), loss functions like cross-entropy, and tensor shape modifiers like transpose. In an embodiment, the configuration files 216 also include tiling decisions 220. In an embodiment, the tiling decisions are included in metadata included in the configuration files 216. Tiling decisions 220 provide dimensionality and/or number of tiles in various tensors received, generated, and/or output by the system 100 while executing the configuration files 216, as will be discussed in further detail herein.

At operation 242, the compiler 106 sends the configuration files 216 to the runtime logic 110 for execution. At operation 243, the runtime logic 100 loads the configuration files 216 (or at least sections of the configuration files 216) and/or the data therefor (e.g., weights, coefficients, vectors, tensors (image data, audio data, natural language processing (NLP data), control data (e.g., control tokens)) on one or more of reconfigurable processors 124a, 124b, ..., 124N and/or reconfigurable local memory 128a, 128b, ..., 128M of the reconfigurable array of units 190. In an embodiment, the reconfigurable array of units 190 implements processing logic 284 that processes the various functions included in the configuration files 216.

In an embodiment, the reconfigurable array of units 190 and/or the host 120 also executes one or more of padding logic 280 that pads an input tensor with zero-valued peripheral pixels, tiling logic that tiles (or re-tiles) a tensor into multiple corresponding tiles, and data flow logic 286 that facilitates materializing individual tiles (e.g., by storing the tiles to the off-chip memory 140) and facilitates reading individual tiles from the memory 140. Each of these logics 280, 282, and 286 will be discussed in further detail herein.

Having described the reconfigurable processor, the discussion now turns to a manner in which tensors are processed by the reconfigurable processor.

Non-Overlapping Tiling

Figure 3A:
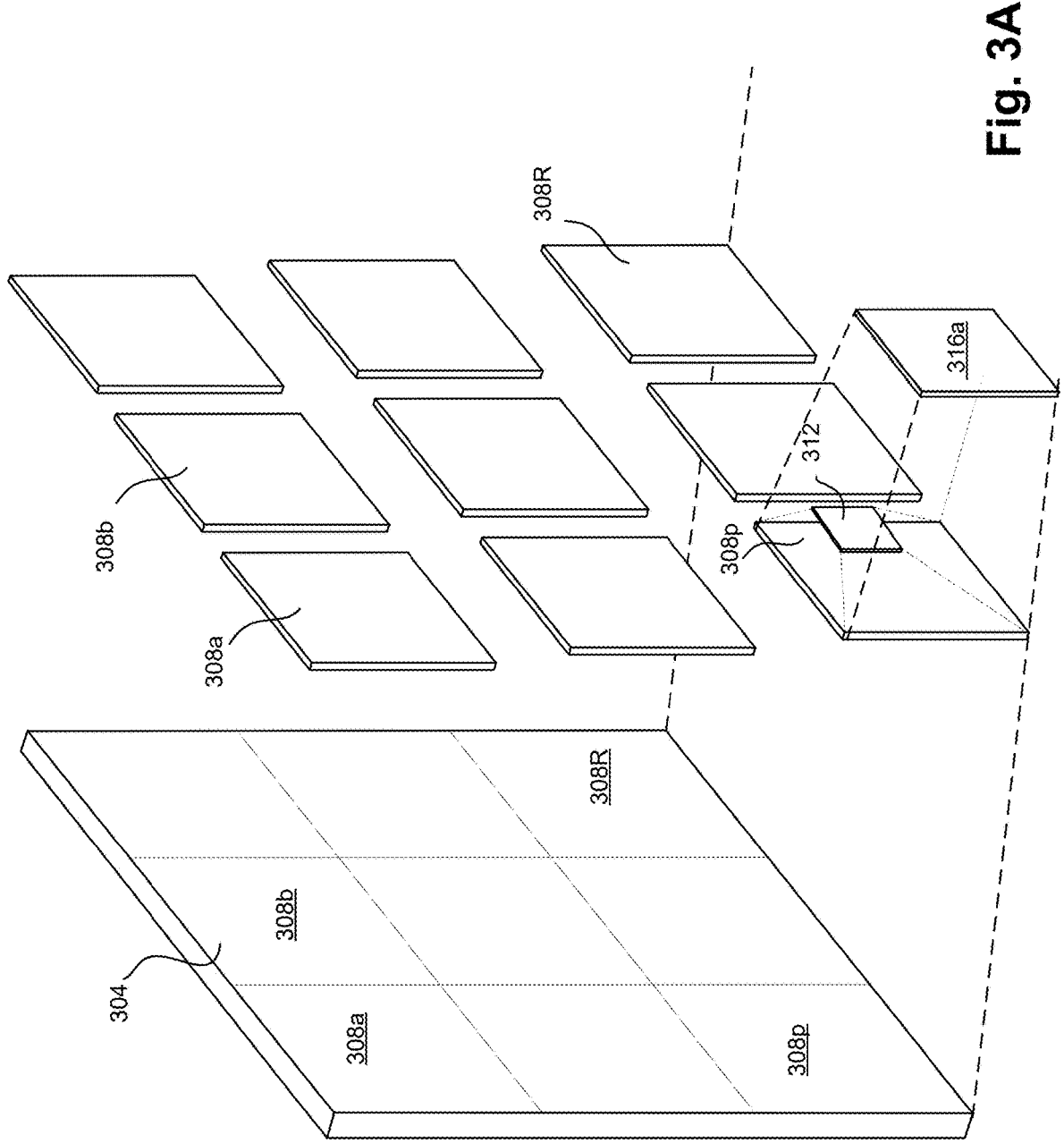
FIGS. 3A and 3B illustrate tiling of a tensor into a plurality of tiles and subsequent convolution of the tiles, where there are no overlaps among neighboring tiles within the tensor.
Figure 3B:
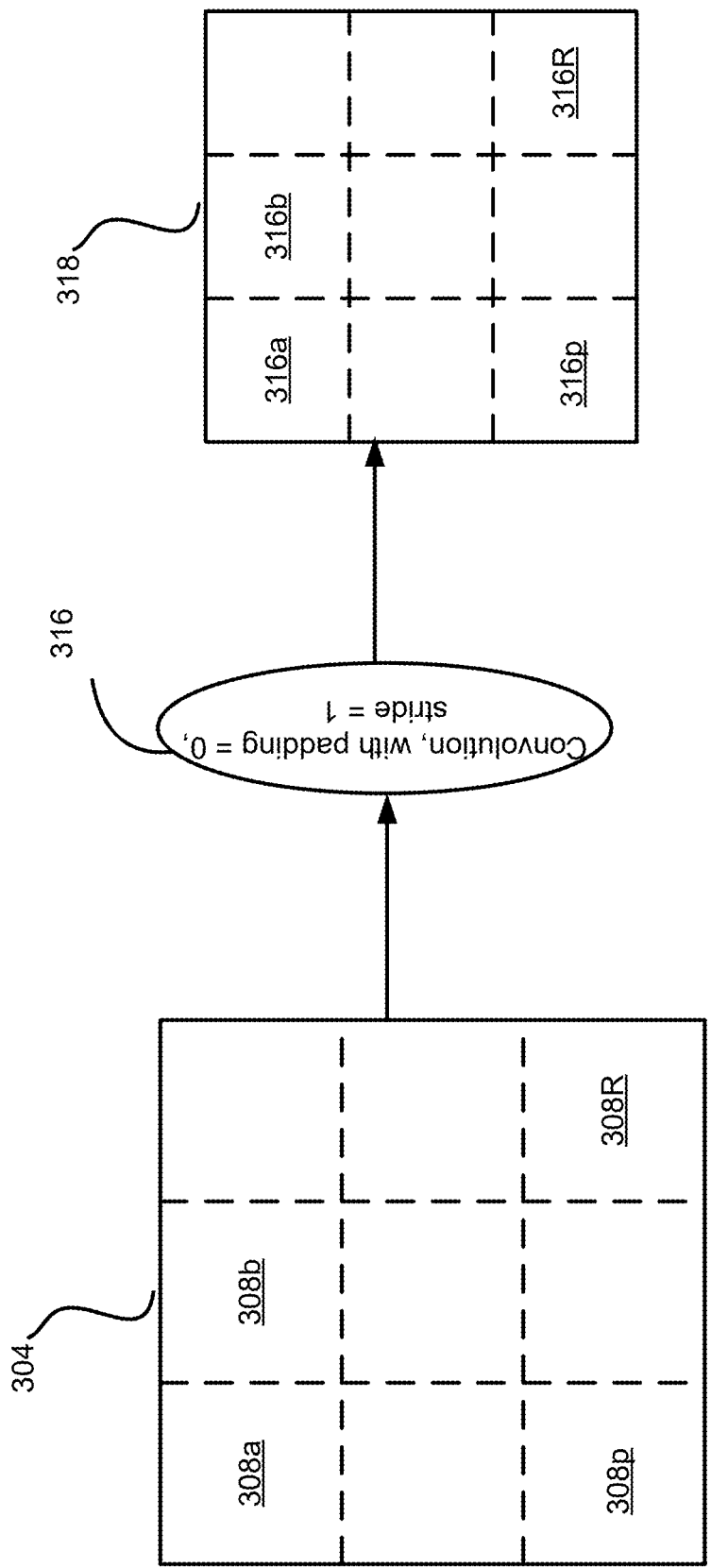

Tiling is often employed to process large sized tensors. In tiling, an input tensor is tiled or divided into multiple tiles or sections, during a forward pass and/or a backward pass of a neural network. FIGS. 3A and 3B illustrate tiling of a tensor 304 into a plurality of tiles 308a, ..., 308R and subsequent convolution of the tiles, where there are no overlaps among neighboring tiles. FIG. 3A illustrates a 3D perspective view of the tiling process merely for illustration purposes, whereas FIG. 3B illustrate a 2D view of the tiling process. Note that the underlying tensor 304 can be a 2D or a 3D image, or is derived from such an image (e.g., by convoluting the image and/or otherwise processing the image). In the example of FIGS. 3A and 3B, the tiles 308a, ..., 308R are non-overlapping tiles, e.g., two neighboring tiles do not have any overlapping region. In FIG. 3B, each of the tiles 308a, ..., 308R is convolved with a kernel 312 (illustrated in FIG. 3A) during a convolution operation 316, to generate a corresponding one of a plurality of tiles 316a, 316b, 316R, respectively, of an output tensor 318 (illustrated in FIG. 3B). For example, tile 308a is convolved to generate a corresponding tile 316a, tile 308b is convolved to generate a corresponding tile 316b, and so on. The output tensor 318 is a combination of the non-overlapping tiles 316a, 316b, ..., 316R. Although not illustrated, the tiles 316a, ..., 316R can be further convolved or processed by another operation (e.g., max-pooling) within the neural network.

Overlapping Tiling

Figure 4A:
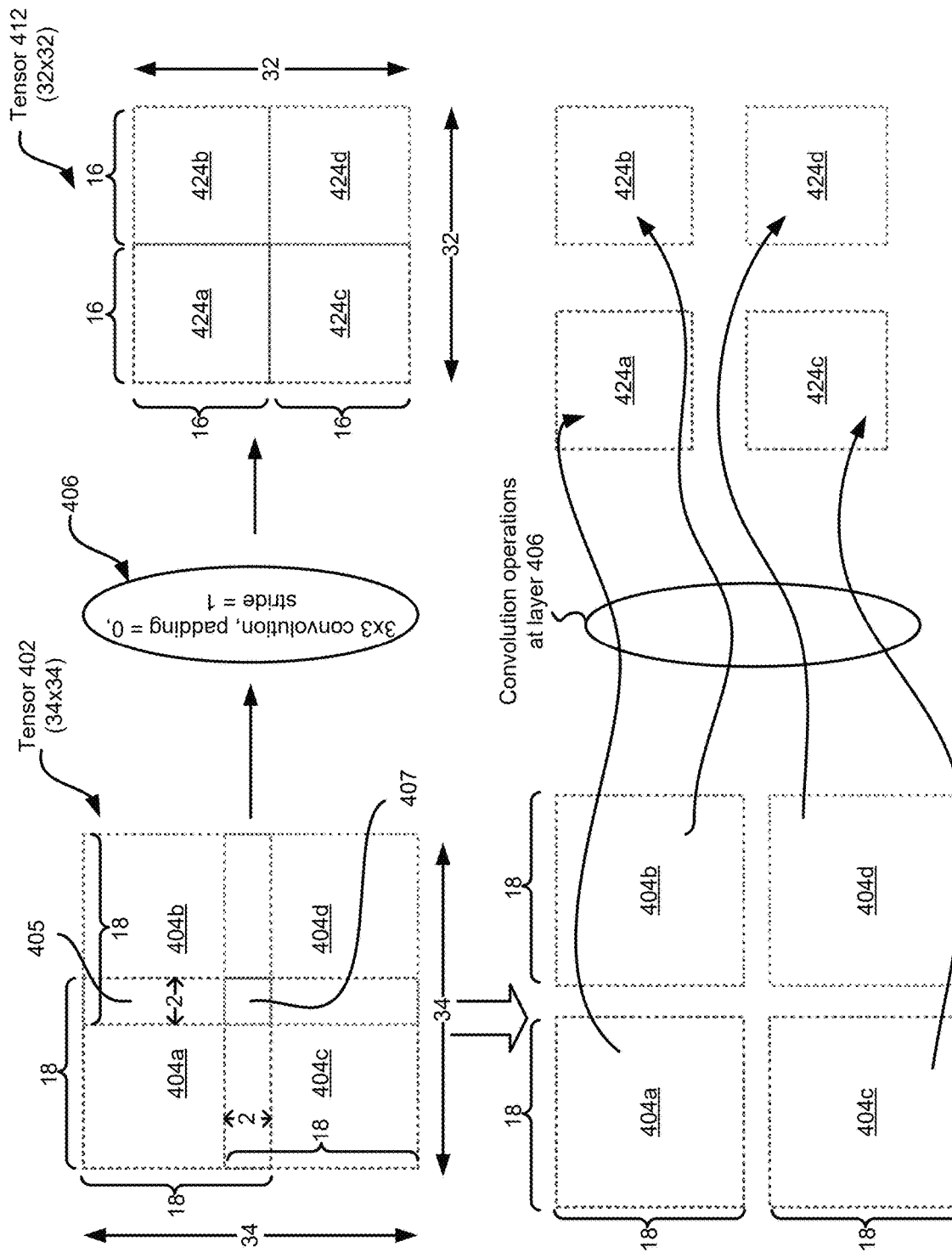
FIG. 4A illustrates tiling of an input tensor into a plurality of tiles and subsequent convolution of the tiles, where neighboring tiles in the input tensor partially overlap.

FIG. 4A illustrates tiling of an input tensor 402 into a plurality of tiles 404a, ..., 404d and subsequent convolution of the tiles, where neighboring tiles in the input tensor 402 partially overlap. Although FIG. 4A illustrates the input tensor 402 being tiled into merely four tiles, such a number of tiles is merely an example and is not intended to limit the scope of this disclosure. In other examples, the input tensor 402 can be tiled into a higher number of tiles, such as 9, 16, 25, 64, or higher, and is implementation specific. In an example, the number of tiles is based on a variety of factors, such as a size of the input tensor 402, a memory and/or processing capacity of the network processing the tensors, a configuration (such as a number of layers) of the network, and/or the like. Calculating the size of the tiles and/or the overlaps will be discussed in further detail herein in turn (e.g., with respect to FIG. 12A).

FIG. 4A illustrates the boundary of various tiles using respective colors, where the color drawing can be obtained from the U.S. Patent and Trademark Office upon request. For example, the boundary of tile 404a is illustrated using red, the boundary of tile 404b is illustrated using green, and so on. Throughout this disclosure, where a tensor comprises four tiles and the tiles are illustrated using different respective colors, generally, the top-left tile boundary is illustrated in red, the top-right tile boundary is illustrated in green, the bottom-left tile boundary is illustrated in blue, and the bottom-right tile boundary is illustrated in orange color.

As seen, neighboring tiles in the input tensor 402 partially overlap. FIG. 4A also illustrates example dimensions of various tiles, and dimensions of the overlapping sections. The dimensions are mere examples and are not intended to limit the scope of the disclosure. For example, the input tensor 402 has a dimension of 34×34 pixels, and individual tiles 404 has a dimension of 18×18 pixels. Thus, in an embodiment, each tile within the input tensor 402 has the same dimension.

Two tiles in a tensor are neighboring tiles if the two tiles have at least one immediate adjacent edge and/or an immediate adjacent corner. Thus, in the input tensor 402 that is divided into 4 tiles, each tile is a neighboring tile to the other tiles. Thus, each tile has three neighboring tiles in the input tensor 402. For example, a right section of the tile 404a overlaps with a left section of the tile 404b, to generate an overlapping section 405 comprising 18×2 pixels. Thus, pixels within the overlapping section 405 are common to both tiles 404a and 404b. Similarly, a 2×18 bottom section of the tile 404a overlaps with a 2×18 top section of the tile 404c, and a 2×2 right-bottom section of the tile 404a overlaps with a left-top section of the tile 404d. As illustrated, the central 2×2 overlap region 407 is common to all the four tiles 404a, . . . , 404d.

Also illustrated in FIG. 4A is a convolution operation within a processing node or layer 406 of a neural network, in which a kernel is convolved with each tile 404, to generate a corresponding tile 424 of an output tensor 412. The lower portion of FIG. 4A illustrates how individual tile 404 is convolved with the kernel to generate a corresponding tile 424a (note that the lower portion of the figure shows the tiles in non-overlapping manner, for clearly depicting the tile-wise convolution operations). For example, tile 404a is convolved to generate a corresponding tile 424a, tile 404b is convolved to generate a corresponding tile 424b, and so on. The output tensor 412 is a combination of the tiles 424a, . . . , 424d. Although not illustrated, the tiles 424a, . . . , 424d can be further convolved or processed by another operation (e.g., max-pooling) within the neural network.

To generate an output tile of a certain size, the corresponding input tile size is determined from the receptive field of the filter used for the convolution operation. For example, a tiling that is to be performed at a section output is initially determined. Then, using the information about the receptive field of each operation in the section, an algorithm (e.g., discussed with respect to FIG. 12A) works backwards through the section until it reaches the input. In other words, the tile size of the output is used to calculate the tile size of the input. During a convolution operation, dimensions of an input tile (e.g., input tile 404 of the input tensor 402) can be different from the dimensions of the corresponding output tile (e.g., output tile 424 of the output tensor 412). For example, an output width $W_o$ and an output height $H_o$ of the output receptive field is given by:

$$W_o = \frac{W_i - K_w + P_w}{S_w} + 1 \quad \text{Equation 1}$$

$$H_o = \frac{H_i - K_h + P_h}{S_h} + 1 \quad \text{Equation 2}$$

In equations 1 and 2, $W_i$ and $H_i$ are a width and a height, respectively, of the input tile; $K_w$ and $K_h$ are a width and a height, respectively, of the convolution kernel used during the convolution operation; $P_w$ and $P_h$ are convolution padding used in horizontal and vertical directions, respectively of the convolution operation; and $S_w$ and $S_h$ are strides in horizontal and vertical directions, respectively, of the convolution operation.

For example, for FIG. 4A, assume that the underlying convolution 406 uses a 3×3 filter with a stride of 1 and equal padding. The output 412 is a 32×32 tensor that is split into 4 non-overlapping 16×16 tiles 424. When tiling is enabled, the convolution to generate each output tile 424 is performed as a valid padding convolution that uses a corresponding input tile 404 of size 18×18 from an input tensor 402 of size 34×34.

Figure 4B:
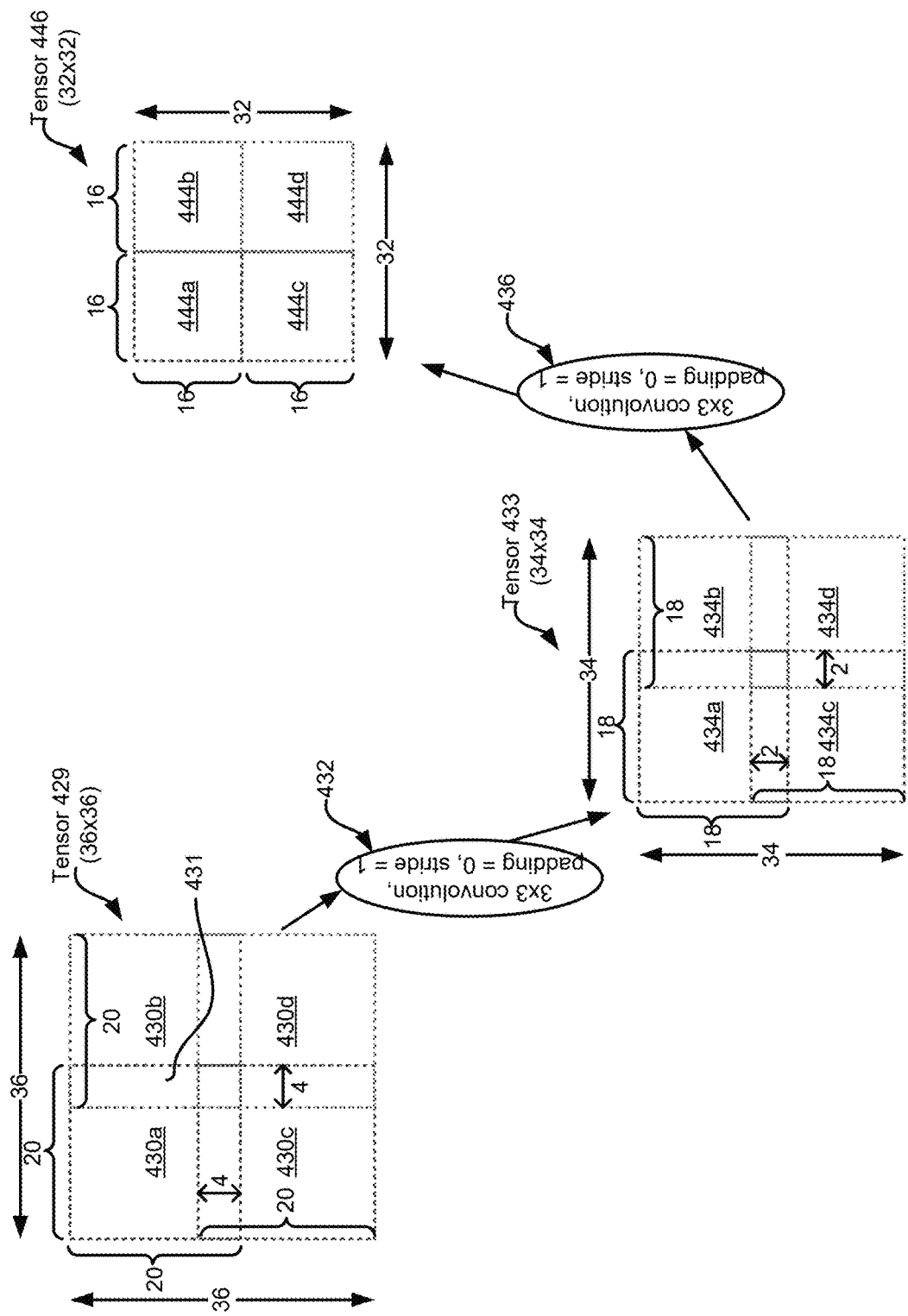
FIGS. 4B-4D illustrate tiling of an input tensor into a plurality of tiles and subsequent two successive convolutions of the tiles, where neighboring tiles in the input tensor partially overlap.

FIG. 4B illustrates tiling of an input tensor 429 into a plurality of tiles 430a, . . . , 430d and subsequent two successive convolutions of the tiles, where neighboring tiles in the input tensor 429 partially overlap. Thus, while FIG. 4A illustrates a single convolution, FIG. 4B illustrates two convolution operations.

Although FIG. 4B (and various other figures discussed herein) illustrates the input tensor being tiled into merely four tiles, such a number of tiles is merely an example and is not intended to limit the scope of this disclosure. FIG. 4B illustrates the boundary of various tiles using respective colors. For example, the boundary of tile 430a is illustrated using red, the boundary of tile 430b is illustrated using green, and so on. As seen, neighboring tiles in the input tensor 429 partially overlap.

FIG. 4B also illustrates example dimensions of various tiles, and dimensions of the overlapping sections, which are mere examples and are not intended to limit the scope of the disclosure. For example, the input tensor 429 has a dimension of 36×36 pixels, and individual tiles 430 has a dimension of 20×20 pixels. Thus, in an embodiment, each tile 430 within the input tensor 429 has the same dimension.

In the input tensor 429 that is divided into 4 tiles, each tile is a neighboring tile to the other tiles. For example, a right section of the tile 430a overlaps with a left section of the tile 430b, to generate an overlapping section 431 comprising 20×4 pixels. Thus, pixels within the overlapping section 431 are common to both tiles 430a and 430b. Similarly, a 4×20 bottom section of the tile 430a overlaps with a top section of the tile 430c, and a 4×4 right-bottom section of the tile 430a overlaps with a left-top section of the tile 430d.

Also illustrated in FIG. 4B is a first convolution operation performed by processing node or layer 432, in which a kernel is convolved with each tile 430, to generate a corresponding tile 434 of an intermediate tensor 433. For example, tile 430a is convolved with the kernel to generate a corresponding tile 434a, tile 430b is convolved with the kernel to generate a corresponding tile 434b, and so on. The intermediate tensor 433 is a combination of the tiles 434a, . . . , 434d.

During the convolution in the layer 432, a padding of 0, a 3×3 kernel, and a stride of 1 are used. Accordingly, referring to equations 1, 2 and FIG. 4B, a width of each tile 434 of the intermediate tensor 433 is given by (20−3+0)/1+1=18, and similarly a height of each tile 434 of the intermediate tensor 433 is also 18, as illustrated in FIG. 4B. Thus, individual 18×18 tiles 434 form the intermediate tensor 433 of size 34×34. Thus, there is an overlap among neighboring tiles in the intermediate tensor 433. The dimensions of the tiles, the overlaps, and the overall tensor dimensions for the intermediate tensor 433 are similar to those discussed with respect to the input tensor 402 discussed with respect to FIG. 4A.

Also illustrated in FIG. 4B is a second convolution operation performed by the processing node 436, in which a kernel is convolved with each tile 434 of the intermediate tensor 433, to generate a corresponding tile 444 of an output tensor 446. For example, tile 434a is convolved with the kernel to generate a corresponding tile 444a, tile 434b is convolved with the kernel to generate a corresponding tile 444b, and so on. The output tensor 446 is a combination of the tiles 444a, . . . , 444d.

It may be noted that the terms input tensor and output tensor are relative to the figure in which these are displayed and used for ease of discussion, and need not be an input to a neural network or an output of the neural network. For example, the output tensor 446 can be further convolved, and hence, the output tensor 446 would be an input for that convolution operation.

During the convolution 436, a padding of 0, a 3×3 kernel, and a stride of 1 are used. Accordingly, referring to equations 1, 2 and FIG. 4B, a width of each tile 444 of the output tensor 446 is given by (18−3+0)/1+1=16, and similarly a height of each tile 444 of the output tensor 446 is also 16, as illustrated in FIG. 4B. Thus, individual 16×16 tiles 444 form the output tensor 446 of size 32×32. Thus, there is no overlap among the tiles 444 in the output tensor 446.

Figure 4C:
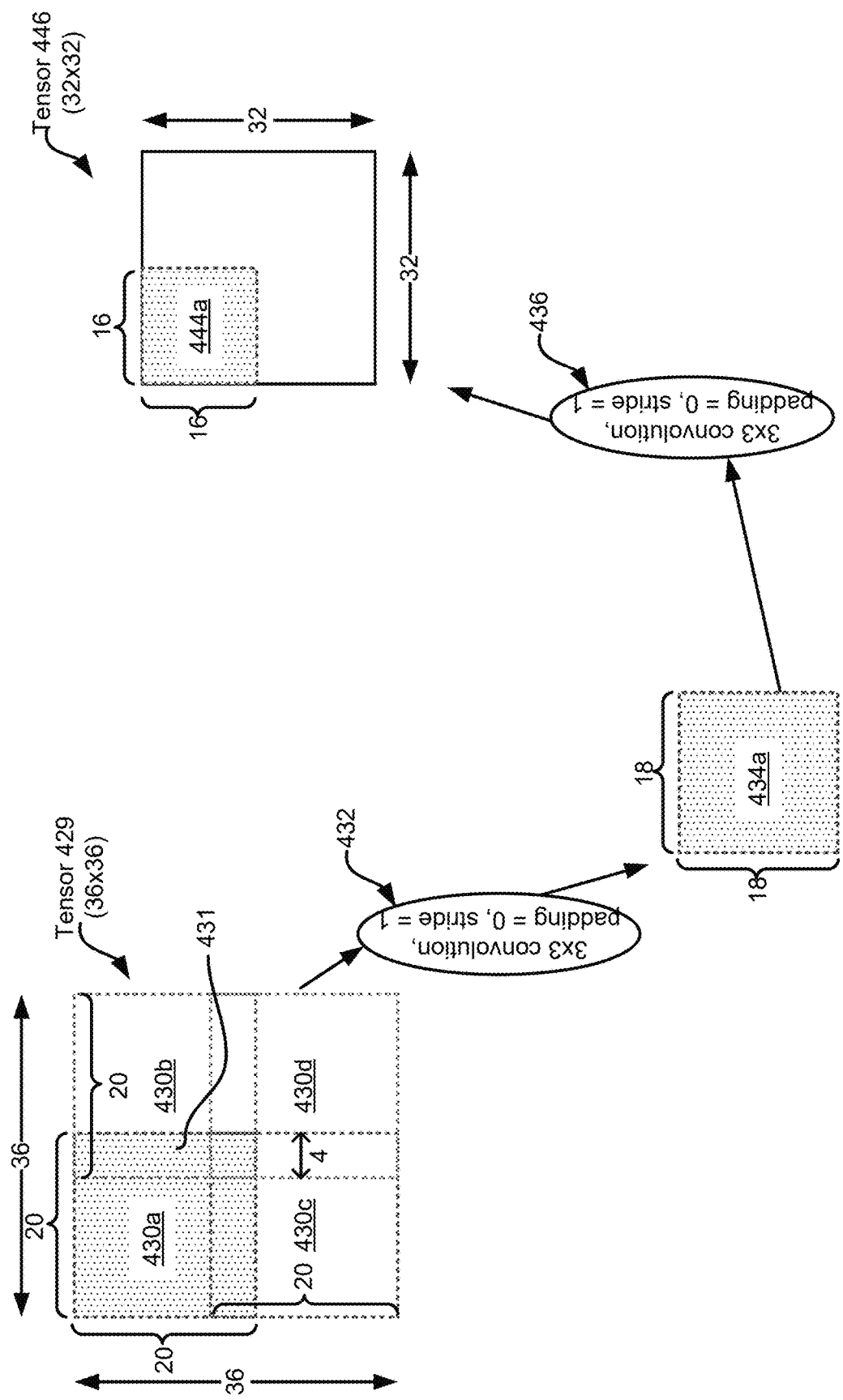
Figure 4D:
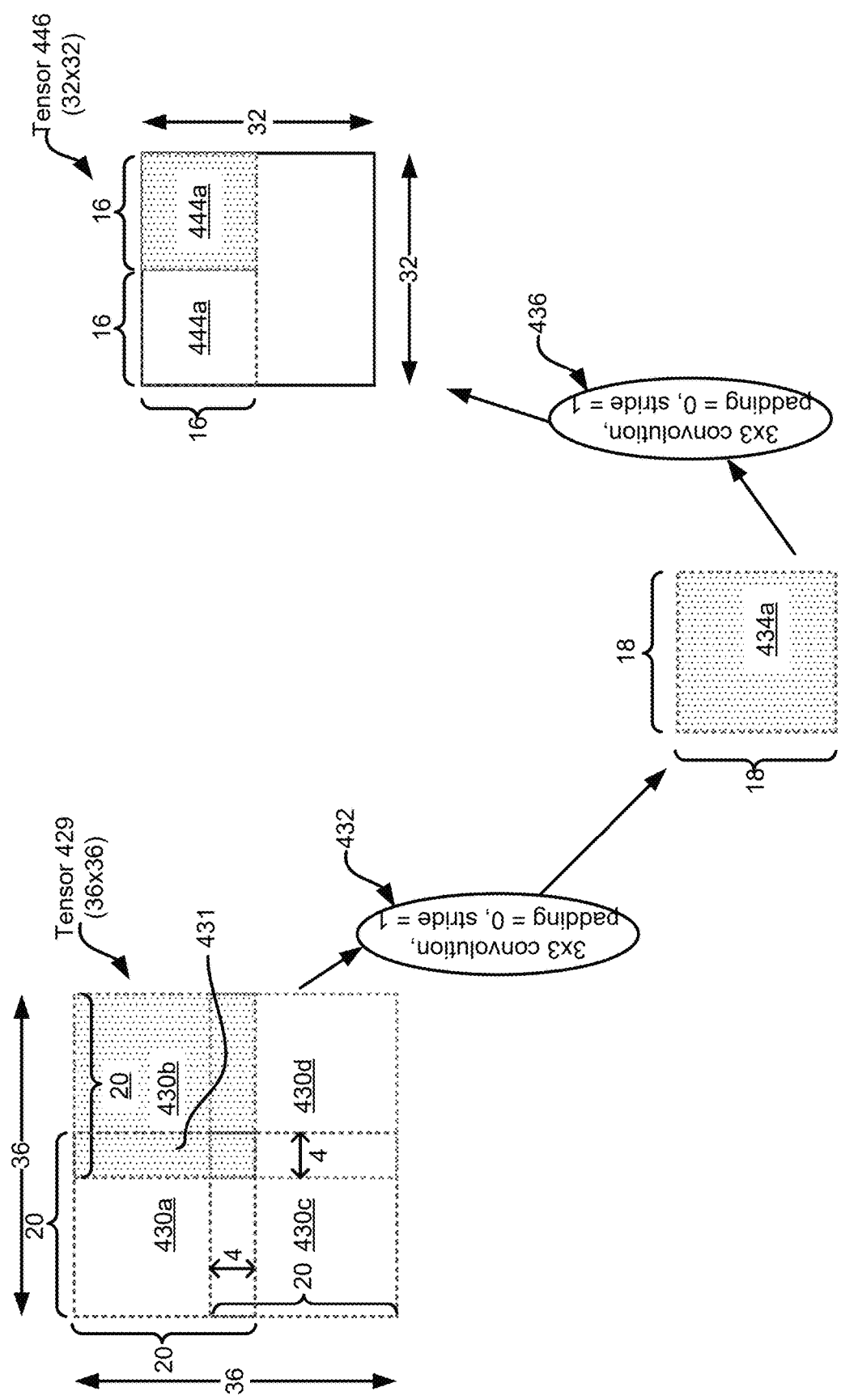

FIGS. 4C and 4D illustrate the convolution operations of FIG. 4B in further details. For example, in FIG. 4C, the shaded tile 430a of the input tensor 429 is convolved to generate the shaded tile 434a of the intermediate tensor 433, and the shaded tile 434a of the intermediate tensor 433 is further convolved to generate the shaded tile 444a of the output tensor 446. Similarly, in FIG. 4D, the shaded tile 430b of the input tensor 429 is convolved to generate the shaded tile 434b of the intermediate tensor 433, and the shaded tile 434b of the intermediate tensor 433 is further convolved to generate the shaded tile 444b of the output tensor 446. Thus, FIGS. 4C and 4D depict a tile-wise convolution, where a first tile is convolved separately from a second tile. The convolutions of the various tiles can occur in parallel, or sequentially, and independent to each other.

Overlapping Tiling, and then Individual Tile-Padding During Convolution

Due to tiling and the receptive fields of the convolutional operations in a section, the peripheral input tiles may contain pixels outside the boundary of the original input. These out of bounds pixels are zero-padded for every successive convolutional layer in the section. For any given convolution layer, a relatively small number of pixels can be outside the boundary of the original input, but this can increase and exacerbate as many successive convolutional layers are applied. In an example, to address this issue, extra pixels are added around the boundary of the tensor or receptive field to be convolved, thus increasing the effective size of the image and preserving edge pixel information. In an example, these filler pixels added along one or more edges have zero value. Addition of filler pixels added along one or more edges of a receptive field is also referred to herein as "padding." When the filler pixels have zero values, such addition of the filler pixels are also referred to herein as "zero-padding."

Figure 5:
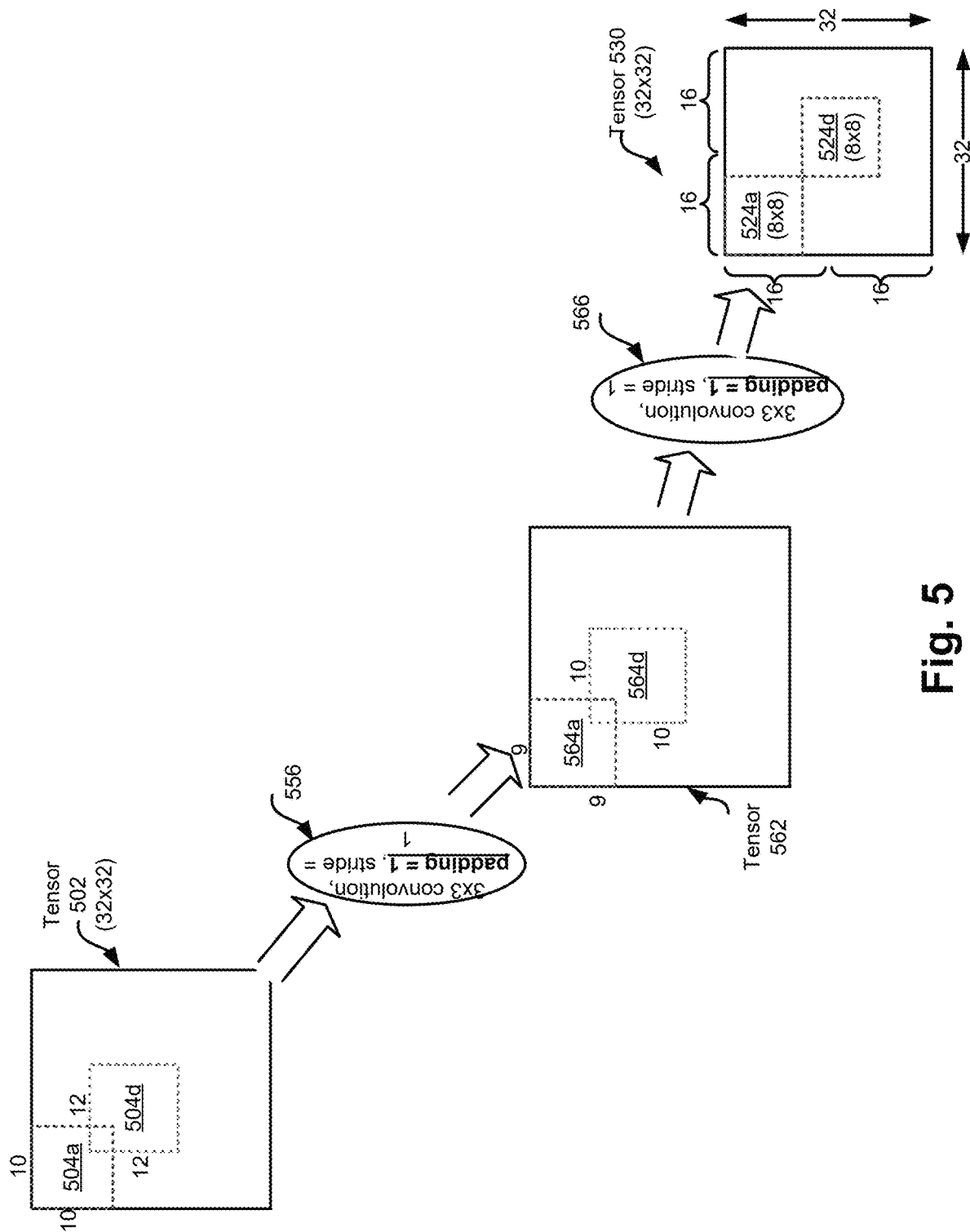
FIG. 5 illustrates tiling of an input tensor into a plurality of overlapping tiles, and subsequent two successive convolution operations of the tiles, where the tiles are individually padded during each convolution operation.

FIG. 5 illustrates tiling of an input tensor 502 into a plurality of overlapping tiles (where example tiles 504a, 504d are illustrated in the figure), and two subsequent successive convolution operations of the tiles, where the tiles are individually padded during each convolution operation. Although the input tensor 502 is tiled into multiple tiles, merely two example tiles are illustrated for purposes of illustrative clarity.

The tiles 504 of the input tensor 502 are individually convolved at processing node 556, to generate corresponding tiles 564 of an intermediate tensor 562. The tiles 564 of the intermediate tensor 562 are individually convolved at processing node 566, to generate corresponding tiles 524 of an output tensor 530. The output tensor 530 has a target size of 32×32, with each non-overlapping tile 524 having dimensions of 8×8.

Each of the tiles 504a, 504d is convolved with a kernel during a convolution operation at the processing node 556, to generate a corresponding one of tiles 564a, 564d, respectively, of the intermediate tensor 562. During the convolution operation, edges of individual tiles are padded with one or more lines of pixels arranged along a periphery of the corresponding tile. Individual padded tile 504 is convolved with a kernel at processing node 556, to generate the corresponding tile 564. Similarly, individual padded tile 564 is convolved with a kernel at processing node 566, to generate the corresponding tile 524. The convolution operations at processing nodes 556 and 566 have a padding of 1, and stride of 1.

For performing a tile-wise convolution operation at processing node 556, tiles at the border of the input tensor 502 (such as tile 504a) have to be treated differently from tiles that are surrounded by other tiles (such as 504d). Tile 504d shares pixels with its neighboring tiles on all four of its sides. In contrast, corner tile 504a shares pixels with its neighboring tiles on two sides (e.g., on right and bottom sides) only. This results in a difference in the effective dimensions of the tiles 504a, 504d, required to compute intermediate results 564a, and 564d, respectively. For example, the effective dimension tile 504a is 10×10, while that of tile 504d is 12×12.

This kind of individual treatment of tiles as discussed with respect to FIG. 5, results in different tile dimensions for tiles within a tensor, thus complicating the machine execution of a convolution operation.

Image Padding, and then Overlapping Tiling

Figure 6A:
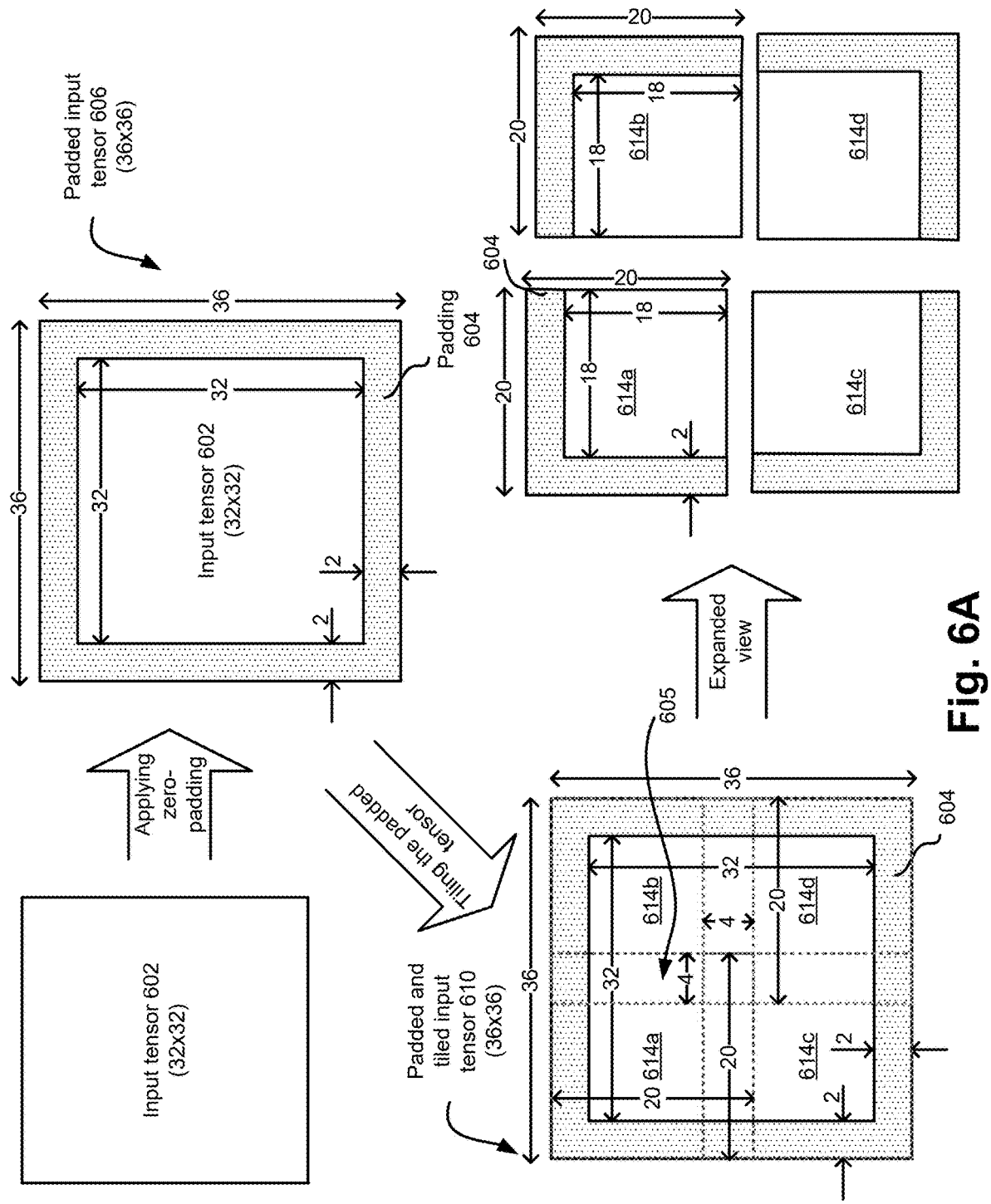
FIG. 6A illustrates zero padding of an input tensor, and subsequent tiling of the zero-padded input tensor.

FIG. 6A illustrates zero padding of an input tensor, and subsequent tiling of the zero-padded input tensor. For example, FIG. 5 discussed herein earlier padded individual tiles of a tensor, and in contrast, FIG. 6A discusses padding tiles of a tensor, and then tiling the padded tensor.

For example, in FIG. 6, an input tensor 602 is received. In an embodiment, the input tensor 602 is zero-padded. For example, padding 604 is applied along a periphery of the input tensor 602, thereby increasing a size of the input tensor 602 and generating a padded input tensor 606.

In the example use case of FIG. 6A, the input tensor 602 has a 32×32 dimension, and a padding 604 that comprises 2 lines of pixels is applied to the input tensor 602. This generates the padded input tensor 606 that has dimensions of 36×36. It may be noted that as the 2-pixel wide padding is added to both left and right sides of the input tensor 602, the padded input tensor 606 is 4 pixels wider than the input tensor 602. Similarly, as the 2-pixel high padding is added to both top and bottom sides of the input tensor 602, the padded input tensor 606 is 4 pixels higher than the input tensor 602.

In FIG. 6A, the padding 604 comprises 2 lines of pixels added around the periphery or edges of the input tensor 602. However, adding 2 lines of pixels is merely an example, and any different number of lines of pixels can be added in another example. A number of lines of pixels to be padded to the input tensor 602 is based on, for example, a target size of the output tensor, a size of the input tensor, a number of convolution operations being performed by the network, and/or the like. In another example, the padding can be applied to one or more sides, but not necessarily on all sides, of the input tensor. In an embodiment, the padding logic 280 of FIG. 2 can be used to implement the padding of the input tensor 602. In an embodiment, the padding 604 is zero-padding. Thus, pixels within the padding 604 have zero values.

Once the padded input tensor 606 is generated from the input tensor 602, the padded input tensor 606 is tiled, to generate a plurality of tiles 614a, 614b, 614c, 614d. In the example of FIG. 6A, the tiles 614 are overlapping tiles. Thus, two neighboring tiles have an overlapping region, as discussed with respect to FIG. 4A herein previously. Although the tiles are overlapping in the example use case of FIG. 6A, in another example, the tiles of the padded input tensor 606 can be non-overlapping tiles.

The right-bottom corner of FIG. 6A also separately illustrates the individual tiles 614 in an expanded view. For example, the zero-padded pixels are along a top edge and left edge of the tile 614a, the zero-padded pixels are along a top edge and right edge of the tile 614b, the zero-padded pixels are along a bottom edge and left edge of the tile 614c, and the zero-padded pixels are along a bottom edge and right edge of the tile 614d. In the example of FIG. 6A, each tile 614 has an 18×18 area of pixels that are from the input tensor 602, where the pixels within this 18×18 area can be zero or non-zero pixels (e.g., depending on the pixel values of the input tensor 602). Each tile 614 also has zero-pixels, which are a part of the padding 604, arranged along two edges of the tile, as illustrated.

Any two neighboring tiles in the padded input tensor 606 have an overlapping area. For example, an overlapping area 605 between tiles 614a and 614b has a dimension of 20×4. Similarly, an overlapping area between tiles 614a and 614c has a dimension of 4×20, and a centrally located overlapping area among all the tiles 614a, . . . , 614d has a dimension of 4×4.

Figure 6B:
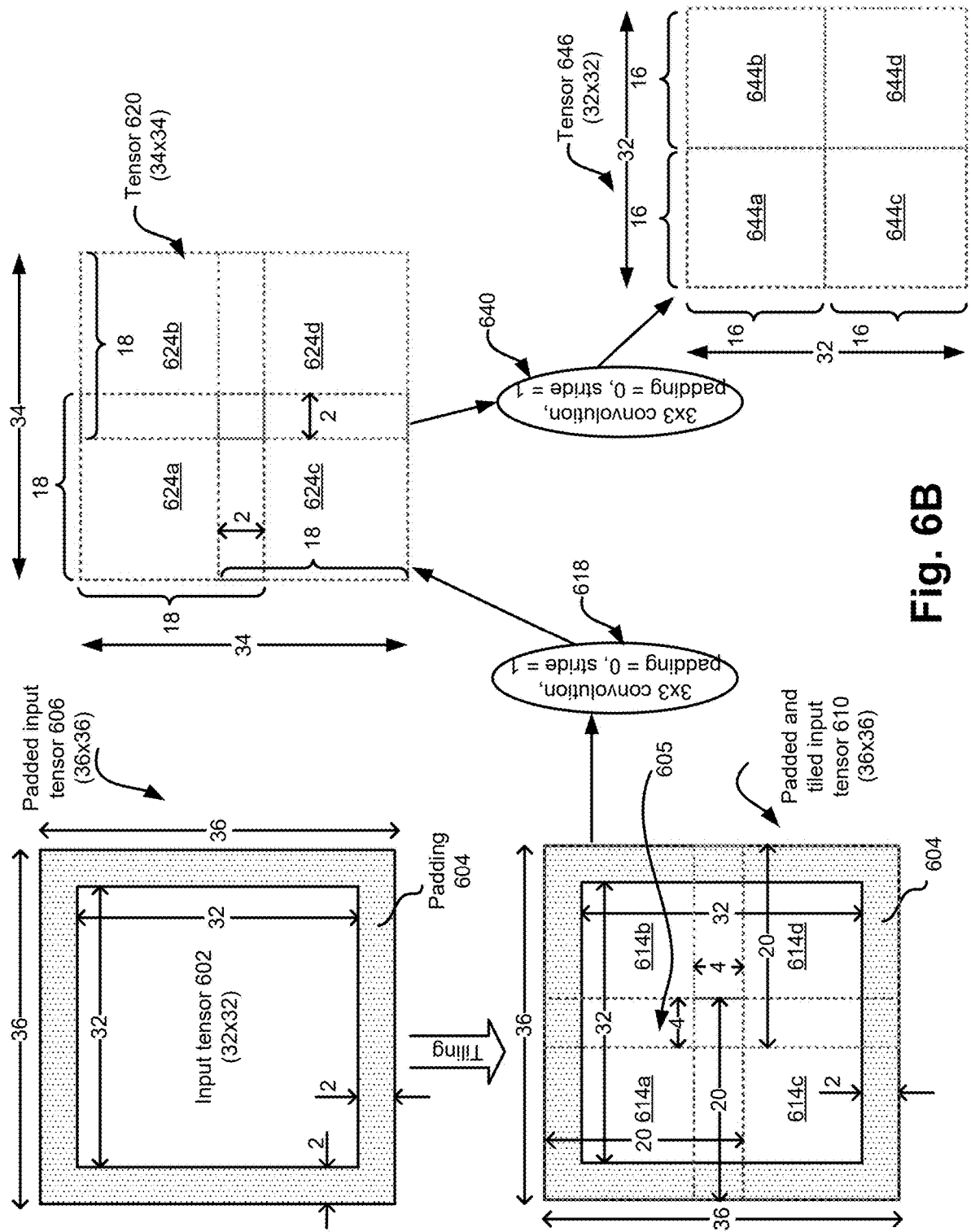
FIG. 6B illustrates tiling of a zero-padded input tensor into a plurality of overlapping tiles, and subsequent two-stage convolution of the tiles.

FIG. 6B illustrates tiling of a zero-padded input tensor 606 into a plurality of overlapping tiles 614a, 614b, 614c, 614d, and subsequent two-stage convolution of the tiles. The 36×36 zero-padded input tensor 606 and the tiling of the zero-padded input tensor 606 have been discussed in detail with respect to FIG. 6A.

Each of the tiles 614a, . . . , 614d is convolved with a kernel during a first convolution operation in a processing node 618, to generate a corresponding one of a plurality of tiles 624a, . . . , 624d, respectively, of an intermediate tensor 620. During the first convolution operation, no additional padding is applied to individual tiles. Thus, padding for the first convolution operation is set to zero, and each of the padding width $P_w$ and padding height $P_h$ is 0 for the first convolution operation 618. A stride of 1 is assumed, e.g., each of the strides $S_w$ and $S_h$ is assumed to be 1. The convolution kernel for the first convolution operation at the processing node 618 is assumed to be 3×3. The input receptive field is individual tiles 614 having a size of 20×20. Accordingly, referring to equations 1, 2 and FIG. 6B, for the first convolution operation at processing node 618, a width of each tile 624 of the intermediate tensor 620 is given by (20−3+0)/1+1=18, and similarly a height of each tile 624 of the intermediate tensor 620 is also 18, as illustrated in FIG. 6B. Because all the tiles 614a, . . . , 614d have the same dimension, each of tiles 624a, . . . , 624d of the intermediate tensor 620 also have the same dimension of 18×18.

Also illustrated in FIG. 6B is a second convolution operation at a processing node 640, in which a kernel is convolved with each tile 624 of the intermediate tensor 620, to generate a corresponding tile 644 of an output tensor 646. During the convolution 640, a padding of 0 is used (e.g., individual tiles 624 are not padded during the convolution). Also, a 3×3 kernel and a stride of 1 are used. Accordingly, referring to equations 1, 2 and FIG. 6B, a width of each tile 644 of the output tensor 646 is given by (18−3+0)/1+1=16, and similarly a height of each tile 644 of the output tensor 646 is also 16, as illustrated in FIG. 6B. Thus, individual 16×16 tiles 644 form the output tensor 646 of size 32×32. There is no overlap among the tiles in the output tensor 646.

Thus, in FIGS. 6A and 6B, the padding logic 280 applies cumulative input padding 604 that confines the padding 604 to the input tensor 602, e.g., along a periphery or edge of the input tensor 602. Accordingly, the cumulative input padding 604 pads the input tensor 602 into the padded input tensor 606. Subsequently, "post-padding tiling" is applied, where the padded input tensor 606 is tiled into multiple tiles 614a, . . . , 614d. The term "post-padding tiling" implies that the tiling is performed after applying the padding to the input tensor 602. The post-padding tiling, thus, tiles the padded input tensor 606 into a set of pre-padded input tiles 614a, . . . , 614d. Thus, the pre-padded input tiles 614a, . . . , 614d are padded prior to the convolution operation at processing node 618, and each of the pre-padded input tiles 614a, . . . , 614d have a same tile size (e.g., 20×20 size in the example of FIG. 6B). The intermediate tensor 620 is again tiled into the set of intermediate tiles 624a, 624b, 624c, 624d with a same tile size. The intermediate tiles 624a, 624b, 624c, 624d are further convolved, to generate the final output tensor 646 having non-overlapping tiles 644a, 644b, 644c, and 644d, each having the same tile size.

Furthermore, the padding increases an effective size of the tiles 614, thereby compensating for dimensionality reduction due to the convolution process. For example, in FIGS. 6A and 6B, both the input tensor 602 and the output tensor 646 are 32×32, e.g., of the same size. Typically, in a two-stage convolution process, the tensor size is progressively or linearly decreased (e.g., as seen in equations 1 and 2), depending on padding, stride, and kernel size. However, padding the image increases the input tensor size prior to the convolution, to at least in part compensate for dimensionality reduction during subsequent convolution operation(s).

Figure 6C:
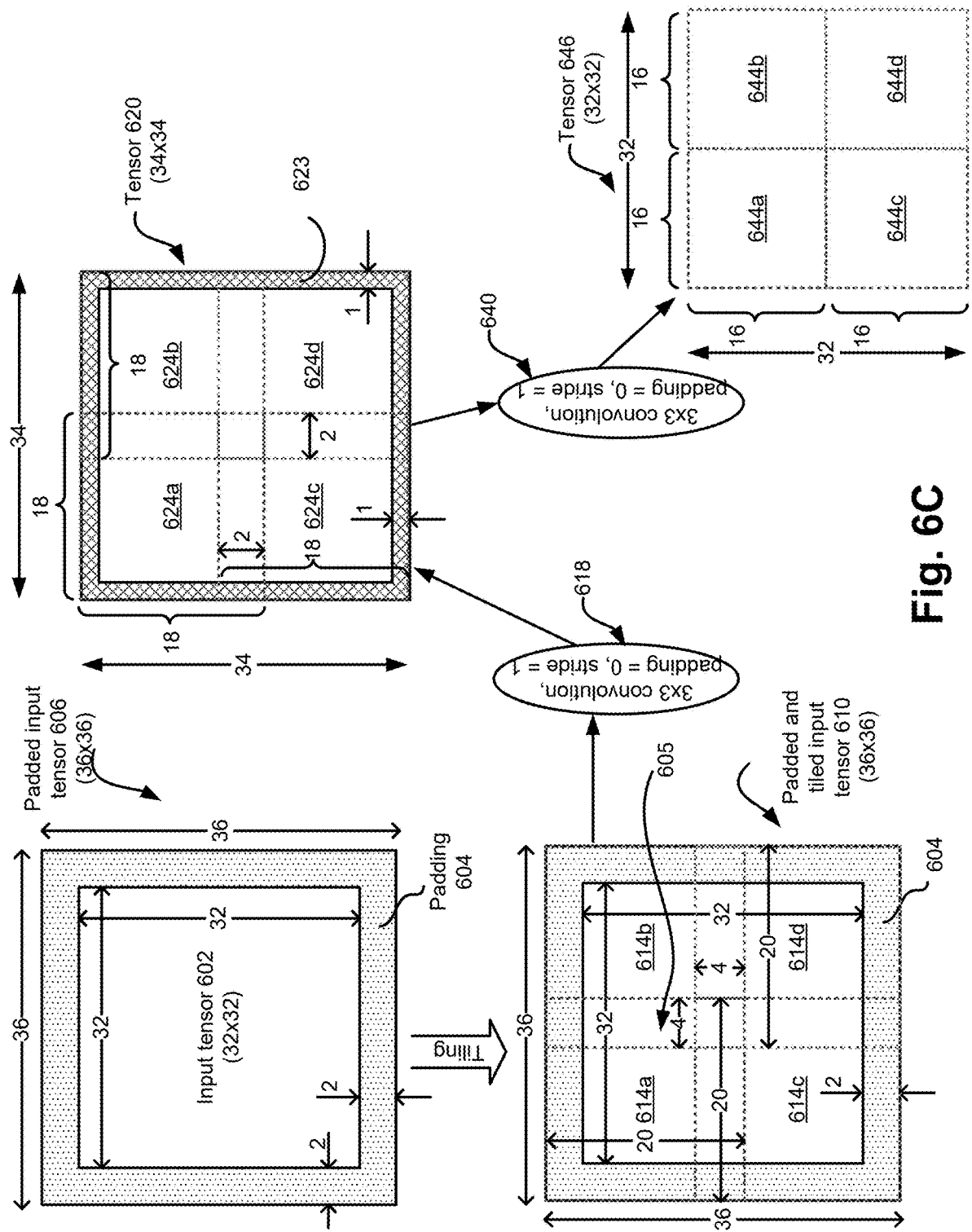
FIG. 6C illustrates the padding and tiling operations of FIGS. 6A and 6B, with one or more lines of peripheral pixels of an intermediate tensor being forced to zero.

FIG. 6C illustrates the padding and tiling of FIGS. 6A-6B, with one or more lines of peripheral pixels of the intermediate tensor 620 being forced to zero. The padding and convolution operations depicted in FIGS. 6B and 6C are the same. The intermediate tensor 620 in these figures have peripheral pixels (e.g., labelled as 623 in FIG. 6C and depicted using cross-hatchings) that have contributions from the zero-padded peripheral pixels 604 of the input tensor 602. For example, during the first convolution operation, the peripheral pixels 623 of the intermediate tensor 620 are generated based at least in part on the zero-padded pixels 604 of the input tensor 602. The peripheral pixels 623 of the intermediate tensor 620 may or may not be zero, depending on the peripheral pixels of the input tensor 602.

In an embodiment, non-zero peripheral pixels 623 of the intermediate tensor 620 are assigned zero pixel-values. That is, the non-zero peripheral pixels 623 are forced to be zero. This way, contribution of the zero-padded pixels 604 during the first convolution operation is removed from the intermediate tensor 620.

For example, assume a hypothetical scenario where the input tensor 602 is convolved twice (e.g., using the convolution parameters of the convolutions 618 and 640 of FIG. 6C), without tiling, to generate a hypothetical output tensor (e.g., assume that for such a hypothetical scenario, sufficient memory and processing capabilities are available to process the entire tensor without tiling). On the other hand, in FIG. 6C, the output tensor 646 is generated by zero-padding the input tensor using padding 604, then tiling, and then convoluting the titles of zero-padded image. To make the hypothetical output tensor and the output tensor 646 equivalent or the same, the effect of the zero-padding 604 has to be removed, which is done by assigning zero values to the non-zero pixels 623. In an example, such zero-assignment to the peripheral pixels 623 makes the output tensor 646 mathematically equivalent to the above discussed hypothetical output tensor.

As illustrated in FIG. 6C, a zero-padding of two lines of pixels are applied to the input tensor 602, to generate the padding 604. Also, the peripheral pixels 623 of the intermediate tensor 620 comprise a single line of pixels along the periphery of the intermediate tensor 620. Thus, there is a dimensionality reduction, from a 2 pixel-width zero-padded region 604 to a single pixel-width region 623 that is being forced to zero, as illustrated in FIG. 6C.

In another example, if, for example, the width of the zero-padded region 604 is higher (e.g., greater than 2, such as 4), then the width of the region 623 that is being forced to zero may also be correspondingly higher (e.g., greater than 1). As an example, if the width of the zero-padded region 604 is 4, then the width of the region 623 that is being forced to zero may be 2 (or 3), based on the implementation.

Furthermore, FIG. 6C illustrates two convolution operations, and peripheral pixels of only one intermediate tensor (e.g., output of the first convolution) is forced to zero. However, in another example, multiple (e.g., greater than 2) sequential convolution stages may be present and the zero-padding region 604 can have a width that is greater than 2 (e.g., 4, 6, 8, or even higher). Assume, for the sake of discussion, that the width of the zero-padding region 604 is 4. In such an example, outputs of a first convolution layer can have 2 lines of pixels that are being forced to zero, and output of a subsequent second convolution layer can have 1 line of pixels that are being forced to zero. Note that the widths discussed herein are merely examples, and are not intended to limit the scope of this disclosure.

In an embodiment, when a tensor is zero-padded and/or tiled, as discussed herein with respect to FIGS. 6A-7B, corresponding tiling metadata is generated. For example, a tiling metadata is associated with a corresponding pair of tensor and processing node. For example, referring to FIG. 6C, a tiling metadata describing the tiling of the intermediate tensor 620 would be associated with (i) the intermediate tensor 620 and (ii) the processing node or layer 618 of the neural network generating the intermediate tensor 620. Thus, individual (tensor, processing node) pairs would have corresponding tiling metadata.

Figure 7A:
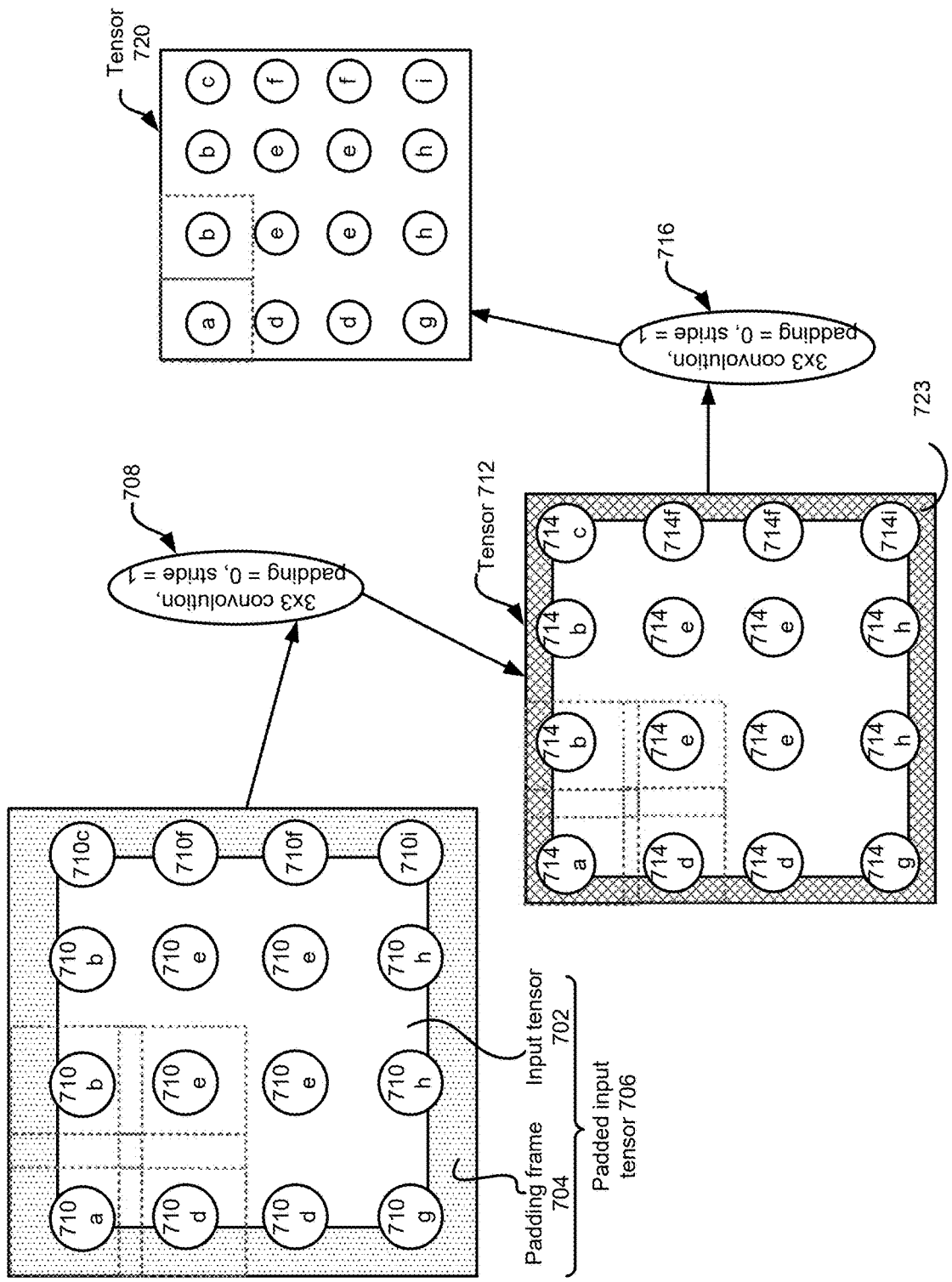
FIG. 7A illustrates padding an input tensor to form a padded input tensor, where the padded input tensor is then tiled in a plurality of tiles.

FIG. 7A illustrates padding an input tensor 702 to form a padded input tensor 706, where the padded input tensor 706 is tiled in a plurality of tiles 710a, . . . , 710i. For example, in the examples of FIG. 6C, the input tensor was padded and subsequently tiled in four partially overlapping tiles. In the example of FIG. 7A, the input tensor 702 is padded with a padding frame 704, to generate the padded input tensor 706, which is then tiled into a plurality number of tiles, such as 16 tiles in the example of FIG. 7A. Thus, the padded input tensor 706 is tiled into a higher number of tiles in FIG. 7A, compared to the example four tiles in FIG. 6C.

In FIG. 7A, the padded input tensor 706 has a cumulative padding frame 704 (also referred to herein as cumulative input padding) along a periphery, where the padding frame 704 includes one or more lines of zero-valued pixels along the periphery of the padded input tensor 706. As discussed, in an embodiment, the padding logic 280 pads the input tensor 702 with the padding frame 704, to generate the padded input tensor 706. Because the padding frame 704 has been applied to the padded input tensor 706, the padded input tensor 706 is also referred as pre-padded input.

In an embodiment, the tiling logic 282 tiles the padded input tensor 706 into a plurality of tiles 710. The tiling here is performed after applying the padding frame—hence, the tiling is also referred to herein as "post-padding tiling."

The tiles 710 in the padded input tensor 706 are labelled based on a location of each tile relative to the padding frame 704. For example, a single top-left tile is labelled as 710a, and sections of the padding frame 704 are disposed on a top edge and a left edge of the tile 710a. Two top tiles are labelled as 710b, and each tile 710b has a corresponding section of the padding frame 704 disposed on a top edge of the corresponding tile 710b. Similarly, a single top-right tile is labelled as 710c, and corresponding sections of the padding frame 710 are disposed on top and right edges of the tile 710c. Two left tiles are labelled as 710d, and each tile 710d has a corresponding section of the padding frame 704 disposed on a left edge of the corresponding tile 710d. Two right tiles are labelled as 710f, and each tile 710f has a corresponding section of the padding frame 704 disposed on a right edge of the corresponding tile 710f. A single bottom-left tile is labelled as 710g, and sections of the padding frame 704 are disposed on a bottom edge and a left edge of the tile 710g. There are two bottom tiles 710h with a single section of the padding frame 704 disposed on the bottom edge of each tile 710h. A single bottom-right tile is labelled as 710i, and sections of the padding frame 704 are disposed on a bottom edge and a right edge of the tile 710i.

Thus, individual ones of the tiles 710a, 710b, 710c, 710d, 710f, 710g, 710h, and 710i has corresponding sections of the padding frame disposed on one or more edges of the corresponding tiles. For example, individual ones of the tiles 710a, 710b, 710c, 710d, 710f, 710g, 710h, and 710i has corresponding sections of the padding frame disposed on (left or right breadth) and/or (top or bottom length) of the corresponding tile. As these tiles are at least partially padded, these tiles are also referred to herein as partially padded input tiles.

The padded input tensor 706 also includes multiple (e.g., four in the example of FIG. 7A) middle tiles, which are labelled as tiles 710e, and sections of the padding frame 704 are not disposed on any section of the tiles 710e. For example, each middle tile 710e is completely surrounded by other tiles, and hence, the padding frame 704 is not disposed on any section of the middle tiles 710e. Thus, these tiles are unpadded input tiles.

In an embodiment, each of the tiles 710a, . . . , 710i has the same size (e.g., same length and breadth), as discussed with respect to FIGS. 6A-6C. Neighboring tiles overlap with each other. In FIG. 7A, tile boundary of four example tiles 710a, 710b, 710d, 710e are illustrated. As seen, the boundaries of these tiles overlap, as discussed with respect to FIGS. 6A-6C.

Individual ones of the tiles 710a, . . . , 710i of the padded input tensor 706 is convolved by a processing node 708, to generate corresponding tiles 714a, . . . , 714i, respectively, of an intermediate tensor 712. For example, pre-padded input tile 710a is convolved to generate a corresponding tile 714a of the intermediate tensor 712, each of the two pre-padded input tiles 710b is convolved to generate a corresponding one of the two tiles 714b of the intermediate tensor 712, and so on. During the convolution 708, a 3×3 kernel, a stride of 1, and a padding of 0 is used. As a padding of 0 is used, the input tiles 710 are not further padded during the convolution operation at the processing node 708.

The intermediate tensor 712 has peripheral pixels 723 (depicted using cross-hatchings) that have contributions from the zero-valued padding frame 704 of the padded input tensor 706. Accordingly, similar to FIG. 6C, in FIG. 7A, the peripheral pixels 723 in FIG. 7A are assigned zero pixel-values. That is, the non-zero peripheral pixels 723 of the intermediate tensor 712 are forced to be zero.

Note that the peripheral pixels 723, which are forced to zero, are along one or more sides of only some tiles, and not all tiles, of the intermediate tensor 712. For example, tiles that are on periphery of the intermediate tensor 712 are referred to as peripheral tiles, and tiles that are completely surrounded by other tiles are referred to as central tiles. The peripheral pixels 723 (which are forced to zero) are along top and left edges of the top-left peripheral tile 714a, along top edges of the top peripheral tiles 714b, along top and right edges of the top-right peripheral tile 714c, along left edges of the left peripheral tiles 714d, along right edges of the right peripheral tiles 714f, along bottom and left edges of the bottom-left peripheral tile 714g, along bottom edges of the bottom peripheral tile 714h, and along bottom and right edges of the bottom-right peripheral tile 714i, as illustrated. The middle or central tiles 714e do not have the peripheral pixels 723 disposed thereon, as the central tiles 714e are completely surrounded by other peripheral tiles in the intermediate tensor 712.

In an embodiment, each of the tiles 714a, . . . , 714i has the same size (e.g., same length and breadth), as discussed with respect to FIGS. 6A-6C. Neighboring tiles overlap with each other. In FIG. 7A, tile boundary of four example tiles 714a, 714b, 714d, 714e are illustrated. As seen, the boundaries of these tiles overlap, as discussed with respect to FIGS. 6A-6C. The previously discussed color coding (e.g., red, green, blue, and orange) are used for the boundary of the four example tiles 714a, 714b, 714d, 714e.

Individual tiles 714 of the intermediate tensor 712 are convolved in the processing node 716, to generate corresponding tiles a, . . . , i of the output tensor 720. For example, tile 714a is convolved to generate a corresponding tile "a" of the output tensor 720, each of the two tiles 714b is convolved to generate a corresponding one of the two tiles "b" of the output tensor 720, and so on. During the convolution 716, a 3×3 kernel, a stride of 1, and a padding of 0 is used (e.g., the tiles 714 are not further padded during the convolution operation 716). In an example, the tiles a, . . . , i in the output tensor 720 are non-overlapping and of the same size, as discussed with respect to FIG. 6C.

Figure 7B:
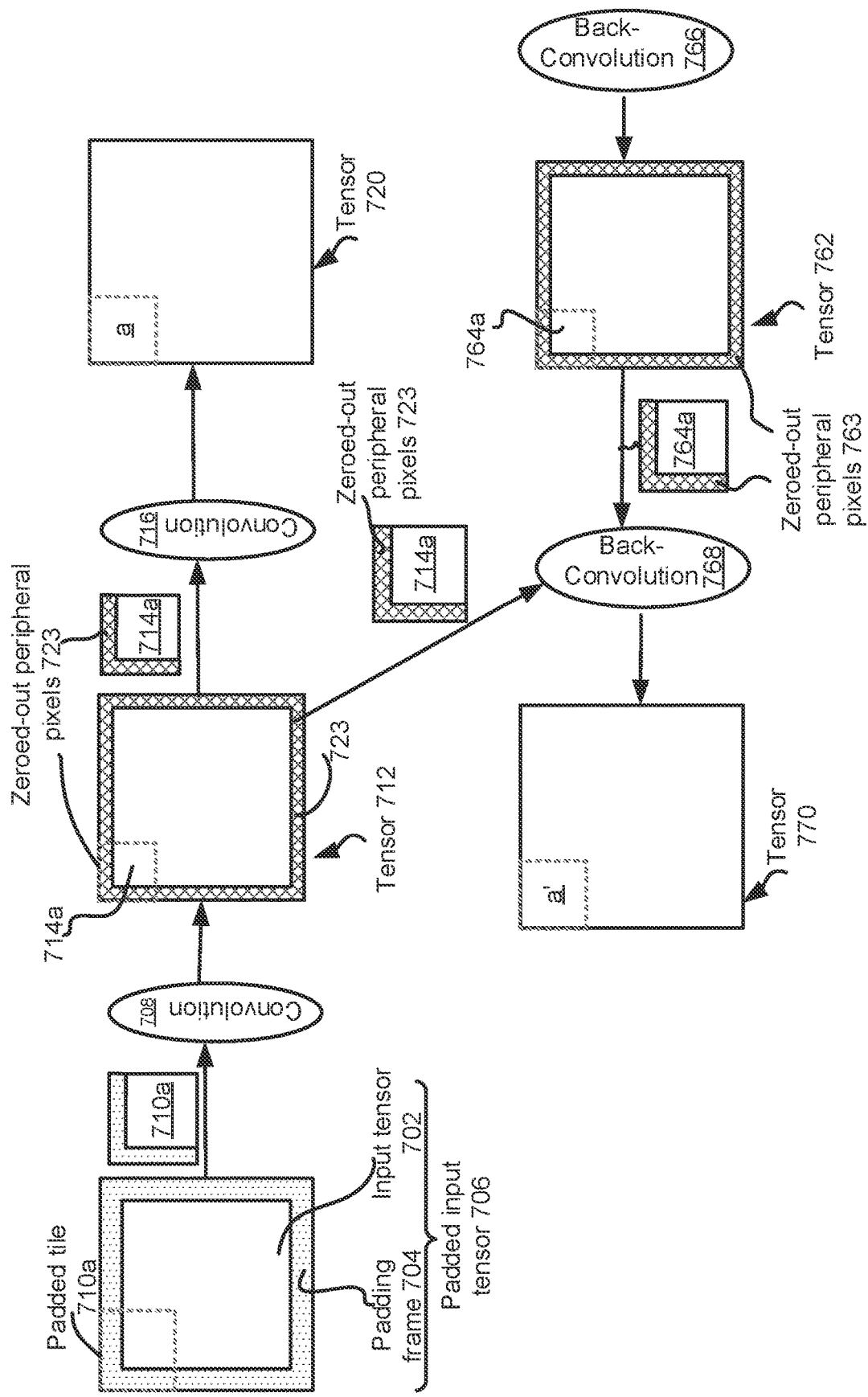
FIG. 7B illustrates forcing peripheral pixels of intermediate tensors of both forward and back-propagation path of a neural network to zero.

The padding and subsequent tiling of an input tensor, and then forcing peripheral pixels of an intermediate tensor to become zero, as discussed with respect to FIGS. 6C and 7A, can be applied to both a forward path and a back-propagation path of a neural network, such as a CNN. FIG. 7B illustrates forcing peripheral pixels of intermediate tensors of both forward and back-propagation path of a neural network to zero. For example, the forward path illustrated in FIG. 7B includes the input tensor 702 with padding frame 704, as also discussed with respect to FIG. 7A. In FIG. 7B, merely a single tile of each tensor is illustrated. Accordingly, the padded tile 710a of the padded input tensor 706 is illustrated in FIG. 7B. As also discussed with respect to FIG. 7A, the padded tile 710a is convolved by a processing node 708, to generate an intermediate tile 714a of the intermediate tensor 712, where peripheral pixels 723 of the intermediate tile 714a are forced to zero. Subsequently, the intermediate tile 714a of the intermediate tensor 712 is further convolved by a processing node 716, to generate an output tile "a" of the output tensor 720. The tensors 706, 712, and 720 are generated in a forward path of the neural network.

In the back-propagation path of the neural network, an intermediate tensor 762 is generated via a back-convolution or transpose convolution in a processing node 766. The intermediate tensor 762 is representative of error gradient, as will be discussed herein. Although not illustrated, the intermediate tensor 762 is generated from an input tensor (e.g., which may or may not be zero-padded). The intermediate tensor 762 comprises peripheral pixels 763, which are forced to zero by the padding logic 280. In FIG. 7B, an example tile 764a is illustrated, which comprises peripheral pixels 763 (that are forced to zero) along two edges of the tile. An output tensor 770 is also generated in the back-propagation path. For example, based on convolution of tile 764a in the processing node 768, a corresponding tile a' of the output tensor 770 is generated.

Materialization of Tiles

Materialization of information, as used herein, is referred to a process of storing the information in an external memory. For example, referring to FIGS. 2 and 6C, the array of units 190 includes processors and local memory 128. The convolution operations discussed with respect to FIG. 6C are performed by the processors of the array 190, and intermediate results of a convolution operation are stored internally in the local memory units 128 within the array 190. The final product of the convolution operation, which is a tensor, is then stored in the memory 140 that is external to the data processor 110. Points in a data flow graph, where a tensor is materialized and stored in the memory 140, is also referred to as a checkpoint. Thus, at a checkpoint, a corresponding tensor is materialized and stored in the memory 140. For example, referring to FIG. 6C, the intermediate tensor 620 and the output tensor 646 are materialized and stored in the memory 140, while the intermediate products of the convolution operations at processing nodes 618 and 640 are stored internally in the local memory units 128 within the array 190.

FIGS. 8A and 8B respectively illustrate materialization of a first example tensor 820 and a second example tensor 810, where during the materialization, the two example tensors are stored in the memory 140 that is external to the data processor 110. Specifically, FIGS. 8A, 8B illustrate example formats in which the example tensors are stored in the memory 140.

Referring to FIG. 8A, illustrated is a tensor 820, which, for example, corresponds to the intermediate tensor 620 of FIG. 6C. In the example where the tensor 820 of FIG. 8A corresponds to the intermediate tensor 620 of FIG. 6C, the tensor 820 has peripheral pixels (such as peripheral pixels 623 of FIG. 6C) that are forced to zero, although such peripheral pixels are not illustrated in FIG. 8A for purposes of illustrative clarity.

A left section of FIG. 8A illustrates actual dimensions and configuration of the tensor 820. A middle section of FIG. 8A illustrates dimensions and configuration of the tensor 820, when the tensor 820 is stored in the memory 140. A right section of FIG. 8A illustrates notations used for the tensor 820, where the notations provide information regarding various dimensions and configuration of the tensor 820.

For example, referring to the left section of FIG. 8A, the tensor 820 is a 34×34 tensor having four 18×18 overlapping tiles 834a, 834b, 834c, 834d. Thus, any two neighboring tiles in the tensor 820 have an overlap region, such as the overlap region 835 between the tiles 834a and 834b. A size of the overlap region 835 is 18×2. Thus, the overlap region 835 between the tiles 834a and 834b has a width of 2. Similarly, an overlap region between the tiles 834a and 834c has a height of 2. For purposes of ease of discussion, the tiles 834 of the tensor 820 are assumed to have an overlap of 2×2 (i.e., a height or a width of an overlap region is at least 2).

Now referring to the middle section of FIG. 8A, illustrated is a manner in which the tensor 820 is stored in the memory 140. For example, individual tiles 834 of the tensor 820 are materialized and stored in the memory 140 in a non-overlapping manner. Thus, for example, the overlap region 835 between the tiles 834a and 834b is stored twice—once as a part of the tile 834a, and once more as a part of the tile 834b. Thus, the middle section of FIG. 8A illustrates two instances of the overlap region 835 being stored in the memory 140. Thus, the overlap region 835 is "redundantly" stored or localized in the memory 140.

Because the overlapping 18×18 tiles 834a, . . . , 834d of the 34×34 tensor 820 are stored in a non-overlapping manner in the memory 140, the tensor 820 occupies 36×36 storage space in the memory 140, e.g., 18×18 space for each tile 834. Thus, although the dimension of the actual tensor 820 is 34×34, the tensor 820 occupies a larger storage space in the memory 140. This marginal increase in storage space in the memory 140 is well compensated by an increase in performance and speed of the overall system, however. For example, materializing and storing tiles of a tensor individually (e.g., in a non-overlapping manner) in the memory 140, rather than storing a corresponding tensor with the overlapping tiles, results in faster fetching of individual tiles form the memory during subsequent operations of the tiles. Thus, when the array 190 needs to operate on the individual tiles 834a, 834b, 834c, 834d, the array 190 can immediately fetch these tiles from the memory. If, however, the tensor 820 was stored with overlapping tiles in the memory 140 instead, the memory 140 (or a processing component) had to calculate or keep in account the overlapping region 835, when fetching the tiles 834a and 834a, possibly resulting in latency or delay in the tile fetch operation. Thus, materializing and storing individual tiles in the memory 140 in a non-overlapping manner, instead of storing the corresponding tensor with the overlapping tiles, results in faster fetching of individual tiles from the memory.

The right side of FIG. 8A illustrates a notation which describes the manner in which the tensor 820 is materialized. The notation includes several sizes, each size followed by a corresponding alphabet in parenthesis. For example, the notation corresponding to the tensor 820 includes a size 34×34(F), where "(F)" indicates that the tensor 820 has an actual or full size of 34×34 (as discussed with respect to the left section of FIG. 8A). The notation corresponding to the tensor 820 further includes a size 18×18(T), where "(T)" indicates that the tensor 820 has tiles of size 18×18 (as discussed with respect to the left and middle sections of FIG. 8A). The notation corresponding to the tensor 820 further includes a size 36×36(M), where "(M)" indicates that the tensor 820 has a size of 36×36, when stored as non-overlapping tiles in the memory 140, as discussed with respect to the middle section of FIG. 8A.

Referring now to FIG. 8B, illustrated is a tensor 810, which, for example, corresponds to the padded and tiled input tensor 610 of FIG. 6C. In the example where the tensor 810 of FIG. 8B corresponds to the padded and tiled input tensor 610 of FIG. 6C, the tensor 810 has zero-padded pixels along edges of individual tiles, although such zero-padded pixels are not illustrated in FIG. 8B for purposes of illustrative clarity.

Similar to FIG. 8A, a left section of FIG. 8B illustrates actual dimensions and configuration of the tensor 810. A middle section of FIG. 8B illustrates dimensions and configuration of the tensor 810, when the tensor 810 is stored in the memory 140. A right section of FIG. 8B illustrates notations used for the tensor 810, where the notations provide information regarding various dimensions and configuration of the tensor 810.

For example, referring to the left section of FIG. 8B, the tensor 810 is a 36×36 tensor having four 20×20 overlapping tiles 830a, 830b, 830c, 830d. Thus, any two neighboring tiles in the tensor 810 have an overlap region, such as the overlap region 831 between the tiles 834a and 834b. A size of the overlap region 831 is 20×4. Thus, the overlap region 831 between the tiles 830a and 830b has a width of 4. Similarly, an overlap region between the tiles 830a and 830c has a height of 4. For purposes of ease of discussion, the tiles 830 of the tensor 810 are assumed to have an overlap of 4×4 (i.e., at least a height or a width of an overlap region is 4).

Now referring to the middle section of FIG. 8B, illustrated is a manner in which the tensor 810 is stored in the memory 140. For example, unlike the tiles 834 of the tensor 820 of FIG. 8A, in FIG. 8B individual tiles 830 of the tensor 810 are materialized and stored in the memory 140 in an overlapping manner. Thus, for example, the overlap region 831 between the tiles 830a and 830b is stored merely once in the memory 140.

Thus, the left section of FIG. 8B and the middle section of FIG. 8B have same dimensions and configuration. For example, because the overlapping 20×20 tiles 830a, . . . , 830d of the 36×36 tensor 810 are stored in the overlapping manner in the memory 140, the tensor 810 occupies 36×36 storage space in the memory 140. The reasons for storing the tiles 834 of the tensor 820 of FIG. 8A in a non-overlapping manner in the memory 140, while storing the tiles 830 of the tensor 810 of FIG. 8B in an overlapping manner in the memory 140, will be discussed herein in further detail in turn.

The right section of FIG. 8B illustrates a notation which describes the manner in which the tensor 810 is materialized. For example, the notation corresponding to the tensor 810 includes a size 36×36(F), where "(F)" indicates that the tensor 810 has an actual or full size of 36×36 (as discussed with respect to the left section of FIG. 8B). The notation corresponding to the tensor 810 further includes a size 20×20(T), which indicates that the tensor 810 has tiles of size 20×20. The notation corresponding to the tensor 810 further includes a size 36×36(M), which indicates that the tensor 810 has a size of 36×36 when stored in the memory 140, as discussed with respect to the middle section of FIG. 8B. The size indicated by notation (M) (e.g., which indicates the size of a tensor, when the tensor is stored in the memory 140) is also referred to herein as a region size.

The notation corresponding to the tensor 810 further includes a size 4×4(MO), where "MO" indicates a size of overlap among the tiles, when the tiles are stored in the memory 140. For the tensor 810, this "MO" size is 4×4, as indicated in FIG. 8B. It may be noted that in contrast to FIG. 8B, the tiles 834 of the tensor 820 of FIG. 8A are stored in a non-overlapping manner in the memory 140—hence, the "MO" size for the tensor 820 of FIG. 8A is 0×0, and hence, the right section of FIG. 8A does not include such a "MO"

size. A presence of a non-zero "MO" size in a notation of a tensor indicates that the tiles of the tensor are stored in an overlapping manner in the memory 140, where the "MO" provides an indication of the overlap in the tiles stored in the memory 140.

Sectioning of Graph

Figure 9A:
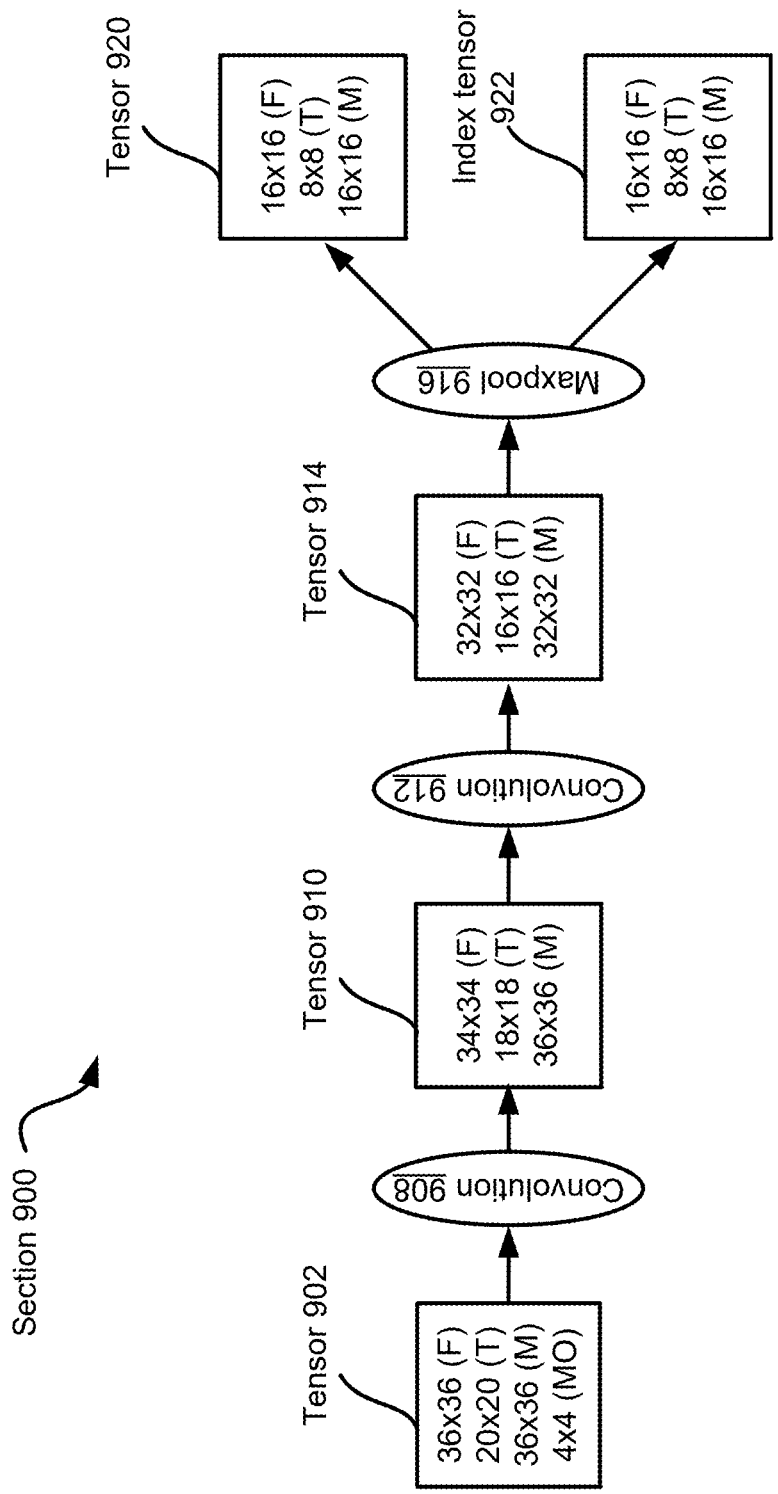
FIG. 9A illustrates an example section of a processing graph comprising two processing nodes implementing convolution operations, and one processing node implementing max-pooling operation.

The system 100 of FIG. 1 receives a processing graph of an application, where the processing graph comprises one or more sections. The processing graph is used to implement a neural network, such as a CNN, a FCNN, an RNN, a LSTM network, an autoencoder, a deep belief network, a GAN, and/or the like. FIG. 9A illustrates one example section 900 of a processing graph comprising processing nodes 908, 912 implementing convolution operations, and processing node 916 implementing max-pooling operation. The section 900 of the processing graph comprises a sequence of processing nodes or layers. Individual processing nodes or layers perform a corresponding operation. For example, the layers in the sequence of layers include one or more of convolution layers, max pooling layers, min pooling layers, average pooling layers, non-linearity layers, normalization layers, dropout layers, concatenation layers, transpose convolution layers, fully connected layers, softmax layers, and/or loss layers. The example section 900 of FIG. 9A includes two example types of layers, such as convolution layers and a max-pool layer. The terms "layer" implementing an operation and "processing node" implementing an operation are used interchangeably.

For example, the sequence of processing nodes includes an input processing node 908 configured to receive an input tensor 902. The input tensor 902 is labelled with notations that are discussed with respect to FIGS. 8A and 8B herein. In the example use case of FIG. 9A, the input tensor 902 is similar to the tensor 810 of FIG. 8B and is labeled similar to the tensor 810 of FIG. 8B. For example, as illustrated in FIG. 9A, the input tensor 902 has a size 36×36(F), where "(F)" indicates that the tensor 902 has an actual or full size of 36×36 (as discussed with respect to the left section of FIG. 8B). The tensor 902 comprises multiple tiles, each having a size of 20×20, as indicated by the notation (T) within the tensor 902 in FIG. 9A. The tensor 902 further includes a size 36×36(M), which indicates that the tensor 902 has a size of 36×36 when stored in the memory 140. For the tensor 902, the "MO" size is 4×4, implying that neighboring tiles of the tensor 140 stored in the memory 140 has a 4×4 overlap. Although not illustrated, the input tensor 902 is padded and then tiled, as discussed with respect to FIGS. 6A-6C herein previously.

The input processing node 908 of the section 900 convolves the input tensor 902 with a kernel (not illustrated), to generate an intermediate tensor 910. In the example use case of FIG. 9A, the intermediate tensor 910 is similar to the tensor 820 of FIG. 8A and is labeled similar to the tensor 820 of FIG. 8A. For example, as illustrated in FIG. 9A, the tensor 910 has a size 34×34(F), where "(F)" indicates that the tensor 910 has an actual or full size of 34×34 (as discussed with respect to the left section of FIG. 8A). The tensor 910 comprises multiple tiles, each of which is generated from a corresponding tile of the tensor 902. Each tile of the tensor 910 has a size of 18×18, as indicated by the notation (T) within the tensor 910 in FIG. 9A. The tensor 910 further includes a size 36×36(M), which indicates that the tensor 910 has a size of 36×36 when stored in the memory 140. Thus, the tiles of the tensor 910 are materialized and stored in a non-overlapping manner, as also discussed with respect to FIG. 8A. Although not illustrated in FIG. 9A, peripheral pixels of the tensor 910 are forced to zero, as discussed with respect to FIG. 6C herein previously.

An intermediate processing node 912 of the section 900 convolves the intermediate tensor 910 with another kernel (not illustrated), to generate another intermediate tensor 914. In the example use case of FIG. 9A, the intermediate tensor 914 is similar to the tensor 646 of FIG. 6C. For example, as illustrated in FIG. 9A, the tensor 914 has a size 32×32(F), where "(F)" indicates that the tensor 914 has an actual or full size of 32×32. The tensor 914 comprises multiple tiles, each of which is generated from a corresponding tile of the tensor 910. Each tile of the tensor 914 has a size of 16×16, as indicated by the notation (T) within the tensor 914 in FIG. 9A. The tensor 910 further includes a size 32×32(M), which indicates that the tensor 914 has a size of 32×32 when materialized and stored in the memory 140. It may be noted that the tile size is 16×16, and the actual tensor size is 32×32. Accordingly, the tiles are non-overlapping in the tensor 914 (e.g., as seen in the tensor 646 of FIG. 6C), and stored in such a non-overlapping manner in the memory 140. Accordingly, the "MO" size is zero for the tensor 914, as illustrated in FIG. 9A.

An output processing node 916 of the section 900 performs a pooling operation (such as a max-pooling operation) on the intermediate tensor 914, to generate an output tensor 920 and an index tensor 922. For example, the output processing node 916 performs the max-pooling operation, by implementing a sample-based discretization process. The objective is to down-sample a representation of the tensor 914, by reducing its dimensionality. For example, the tensor 914 is divided into multiple groups, each group comprising corresponding four adjacent pixels (e.g., 2×2 pixels in each group), and a maximum pixel value of a pixel group is selected and output as a corresponding pixel in the tensor 920. The index label 922 provides an indication or location of a selected pixel within each group of 2×2 pixels. For example, assume a 2×2 pixel group having four pixels having example pixel locations (1,1), (1,2), (2,1), and (2,2). Assume that the pixel (2,2) has a maximum pixel value among these four pixels. Then the output tensor 920 will include the pixel value of the pixel (2,2), and the index tensor 922 will provide a location information of the pixel relative to other pixels in the group. For example, the index tensor 922 will include the pixel location (2,2), to indicate the pixel value of this pixel among the 2×2 pixel group is included in the output tensor 920.

In the example use case of FIG. 9A, each of the output tensor 920 and the index tensor has a size 16×16(F), where "(F)" indicates that these tensors have an actual or full size of 16×16. Each of the tensors 920 and 922 comprises multiple tiles, each of which is generated from a corresponding tile of the tensor 914. Each tile of each of these tensors 920, 922 has a size of 8×8, as indicated by the notation (T) within these tensors. Each of these tensors 920, 922 further includes a size 16×16(M), which indicates that each of these tensors has a size of 16×16 when materialized and stored in the memory 140. It may be noted that the tile size is 8×8, and the actual tensor size is 16×16. Accordingly, the tiles are non-overlapping in the image (e.g., as seen in the tensor 646 of FIG. 6C), and stored in such a non-overlapping manner in the memory 140. Accordingly, the "MO" size is zero for these tensors.

It may be noted that the example section 900 of the processing graph illustrated in FIG. 9A is merely an example, and is not intended to limit the scope of this disclosure. For example, although the section 900 is illustrated to include three processing nodes, in another example, the section 900 can include a greater (or smaller) number of processing nodes. For example, the section 900 can include a higher number of convolution layers. Furthermore, although only convolution and max-pooling layers are illustrated in the section 900 of the processing graph, other types of layers may also be included, such as layers implementing ReLU, average pooling, fully connected layers, and/or the like. Also, the dimensions of various tensors illustrated in FIG. 9A are elsewhere herein are mere examples, and are not intended to limit the scope of this disclosure.

Figure 9B:
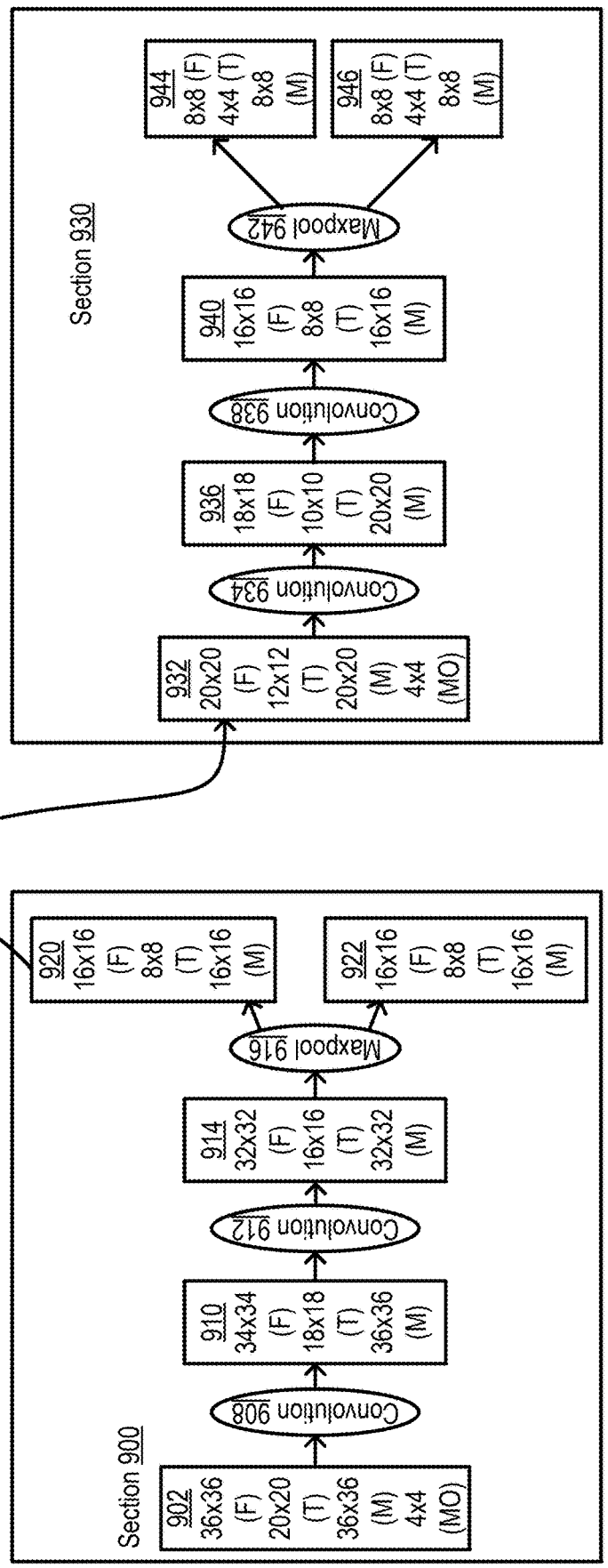
FIG. 9B illustrates two example sections of a forward path of a processing graph.

FIG. 9A illustrated a single section of a processing graph of an application. However, a processing graph of an application can include multiple such sections. For example, FIG. 9B illustrates a processing graph that comprises two forward path sections 900 and 930. The processing graph is used to implement a neural network, such as a CNN, a FCNN, an RNN, a LSTM network, an autoencoder, a deep belief network, a GAN, and/or the like. Each of the sections 900, 930 comprises a sequence of processing nodes or layers, such as convolution layers and max-pooling layers, as discussed with respect to FIG. 9A. In an example, the runtime logic may configure one or more reconfigurable processors (such as PCUs, FIG. 14A) to a corresponding section 900 or 930. Thus, first one or more reconfigurable processors may execute the section 900, and second one or more reconfigurable processors may execute the section 930.

The section 900 of FIG. 9B has been discussed with respect to FIG. 9A. Section 930 of FIG. 9B has layers that are at least in part similar to the corresponding layers of section 900. For example, section 930 comprises a plurality of processing nodes 934, 938, 942, which includes an input processing node 934 configured to receive an input tensor 932, and convolve the input tensor 932 to generate an intermediate tensor 936. An intermediate processing node 938 is configured to receive the intermediate tensor 936, and convolve the intermediate tensor 936 to generate another intermediate tensor 940. An output processing node 942 is configured to perform a max-pooling operation of the intermediate tensor 940, to generate an output tensor 944 and an index tensor 946, as discussed with respect to FIG. 9A. The dimensions of tensors 932, 936, 940, 944, and 946 are illustrated in FIG. 9B, and these dimensions will be apparent based on the discussion of tensor dimensions with respect to FIG. 9A.

As illustrated in FIG. 9B, the section 900 outputs a set of non-overlapping output tiles of the output tensor 920, where the output tensor 920 has an actual dimension of 16×16, has tile size of 8×8, and a dimension of 16×16 when materialized and stored in the memory 140 (with no tile overlap when stored in the memory 140). Thus, the tiles of the output tensor 920 are in a target tiling configuration of the section 900. In contrast, the input tensor 932 of the section 930 has an actual dimension of 20×20, has tile size of 12×12, and a dimension of 20×20 when stored in the memory 140 (with a 4×4 tile overlap, when stored in the memory 140). Thus, the tiles of the input tensor 932 are in an input tiling configuration of the section 930.

As illustrated, the target tiling configuration of the output tensor 920 of the section 900 is different from the input tiling configuration of input tensor 932 of the section 930. Thus, the output tensor 920 of the section 900 undergoes some type of transformation, which results in the change in dimensionality and the generation of the input tensor 932 from the output tensor 920. As will be discussed with respect to FIG. 9C, the output tensor 920 of the section 900 is padded and re-tiled, to generate the input tensor 932 of the section 930.

Figure 9C:
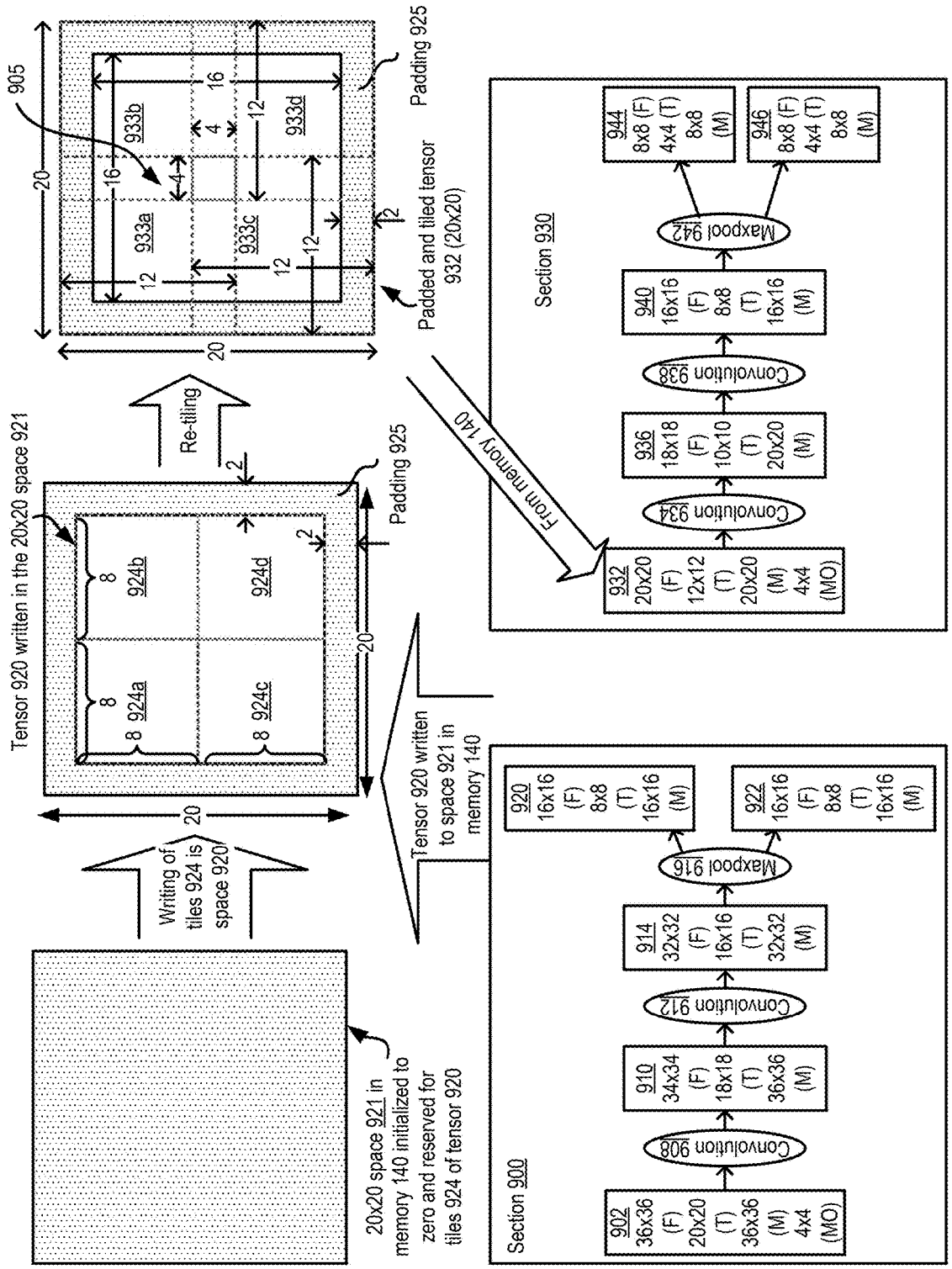
FIG. 9C illustrates transformation of an output tensor of a first section of a processing graph, to generate an input tensor of a succeeding second section of the processing graph, wherein the transformation includes zero-padding the output tensor and re-tiling the zero-padded tile.

FIG. 9C illustrates transformation of an output tensor of a first section of a processing graph, to generate an input tensor of a succeeding second section of the processing graph, wherein the transformation includes zero-padding the output tensor and re-tiling the zero-padded tile.

As illustrated in FIG. 9C, the output processing node 916 of the section 900 implements the max-pooling 916, and generates individual tiles 924a, 924b, 924c, and 924d of the output tensor 920. For example, the output processing node of the section 900 processes individual tiles of the intermediate tensor 914, to individually generate the tiles 924 of the output tensor 920. Put differently, the output processing node of the section 900 does not directly generate the output tensor 920—rather, the output processing node of the section 900 generates the tiles 924, which, in combination, define the output tensor 920.

In an embodiment, the data flow logic 286 (illustrated in FIG. 2) materializes the tiles 924, e.g., stores the tiles 924 to the memory 140, as illustrated in FIG. 9C. For example, the tiles 924 are transmitted to the memory 140 via the external I/O interface 150 and the line 145 (illustrated in FIG. 2).

In an embodiment, the data flow logic 286 causes transmission of the tiles 924a, . . . , 924d individually and independently to the memory 140 from the array 190, as and when the tiles are generated. For example, once the array 190 generates the tile 924a, the data flow logic 286 causes transmission of the tile 924a from the array 190 to the memory 140; once the array 190 generates the tile 924b, the data flow logic 286 causes transmission of the tile 924b from the array 190 to the memory 140, and so on. The tiles may be generated in parallel in the array 190 and written to the memory 140 in parallel.

In another embodiment, the data flow logic 286 causes transmission of the tiles 924a, . . . , 924d collectively to the memory 140 from the array 190. For example, the data flow logic 286 waits until all the tiles 924a, 924ab, 924c, 924d are generated. Once all the tiles 924a, 924ab, 924c, 924d are generated, the data flow logic 286 causes transmission of the tiles 924a, . . . , 924d collectively or in a batch to the memory 140 from the array 190.

Irrespective of how the tiles are transferred from the array 190 to the memory 140, in an example, once the reconfigurable processors 124 of the array 190 generate a tile, the data flow logic 286 stores (or causes to store) the tile from the reconfigurable processors 124 to one or more local memory units 128, and then transfers (or causes to transfer) the tile from the on-chip local memory units 128 to the off-chip memory 140.

In an embodiment, the data flow logic 286 logically stores the tiles 924a, . . . , 924d together, as aggregate or composite tiles (or concatenated tiles), to form the tensor 920. For example, the tiles 924a, . . . , 924d are arranged in correct logical order (e.g., tile 924a being on top left, tile 924 being on the top right, and so on, as illustrated in FIG. 9C). Arranging the tiles in such an order facilitates correct aggregation of the tiles.

Before the tiles 924a, . . . , 924d are written to the memory 140, a 20×20 space 921 in the memory 140 is initialized to zero, and reserved for or allocated to the tensor 920, as illustrated in top-left corner of FIG. 9C. When the 8×8 tiles 924a, . . . , 924d of the tensor 920 are written in the 20×20 space 921 allocated to the tensor 920, the 8×8 tiles 924a, . . . , 924d occupy a central 16×16 region of this 20×20 space 921. Put differently, the 8×8 tiles 924a, . . . , 924d of the tensor 920 are written or aggregated (or composed) in a central 16×16 section of the 20×20 space reserved for the tensor 920, such that a border or padding 925 of width 2 of the original 20×20 space is around the tiles 924a, . . . , 924d. That is, no section of the tiles 924a, . . . , 924d is written in this border or padding 925 of width 2 of the original 20×20 space. This padding 925 of width 2, which is now around a periphery of the tensor 920 comprising the tiles 924a, . . . , 924d, forms a zero-padding for the tensor 920, as discussed with respect to FIG. 6C. Thus, the tensor 920 comprising the tiles 924a, . . . , 924d is now zero-padded with the padding 925. For example, the runtime logic 110 comprises padding logic 280, which facilitates generation of the padding 925 along the edges of the tensor 920, by appropriately writing the tiles 924 in correct positions within the space 921. Thus, in essence, the padding logic 280 applies cumulative input padding 925 that confines the padding 925 to the tensor 920 along a periphery or edge of the input tensor 920, where the tensor 920 will eventually become the input tensor 932 of the section 930. Applying a padding of width 2 along all edges increases a size of the tensor 920 from 16×16 to 20×20.

Subsequently, post-padding tiling is applied, where the padded tensor 920 is re-tiled into multiple tiles 933a, 933b, 933c, 933d. The term "post-padding tiling" implies that the tiling is performed after applying the padding to the output tensor 920. The post-padding tiling, thus, tiles the padded tensor 920 into a set of pre-padded input tiles 933a, . . . , 933d of the input tensor 932.

Thus, the output tensor 920 from the section 900 is padded, and then re-tiled, to generate the input tensor 932 of the section 930. As illustrated, the tiles 933 of the tensor 932 has a size of 12×12, while the padded and tiled input tensor 932 has a size of 20×20. Thus, there is a 4×4 overlap of the tiles 933, when the tiles 933 are stored in the memory. Thus, the "MO" size of the tensor 932 is 4×4, as illustrated in FIG. 9C.

The padding and re-tiling performed on the output tensor 920, to transform the output tensor 920 to the input tensor 932, may be carried out by the host 120 and/or the reconfigurable processors 124. For example, the padding logic 280 and the tiling logic 282 can be executed by the host 120 and/or the reconfigurable processors 124, as discussed with respect to FIG. 2.

Although FIG. 9C illustrates merely two sections 900 and 930, the processing graph can have more than two sections, based on the implementation. A "section boundary" refers to a boundary between two adjacent sections of the graph, such as between sections 900 and 930. Thus, at a section boundary, the processing graph has a cut or partition, which partitions the processing graph into two subgraphs. A total number of subgraphs included in a processing graph depends on the number of such section cuts or section boundaries. For example, the single section cut in FIG. 9C partitions the processing graph into two subgraphs or sections 900 and 930.

The processing graph has a plurality of layers, and accordingly, each subgraph or section has corresponding layers, which are also referred to as processing nodes. For example, as discussed previously, the section 900 has layers depicted by labels 908, 912, and 916, and the section 930 has layers depicted by labels 934, 938, and 942. Individual layers perform corresponding one of various types of operations, such as reduction operation (e.g., convolution, pooling, etc.). For example, a layer (such as the layer 908) can perform a convolution, which in an example can be a strided convolution. In another example, a layer (such as the layer 916) can perform a pooling operation, which in an example can be a max-pooling (as illustrated in FIG. 9C) or an average pooling (although not illustrated in FIG. 9C).

At the section cut depicted in FIG. 9C, the output processing node 920 of the section 900 performs the max-pool operation 916, to generate the output tensor 920. As discussed previously, the output processing node or layer of the section 900 generates a set of tiles 924a, . . . , 924d on a tile-by-tile basis. As also discussed previously, the data flow logic 286 logically stores the tiles 924a, . . . , 924d together, as aggregate or composite tiles, to form the tensor 920 within the allocated memory space 921. The input processing node 932 of the next section 930, however, does not operate on the individual tiles 924a, . . . , 924d. Rather, the data flow logic 286, the padding logic 280, and the tiling logic 282 aggregate these tiles 924 of the output tensor 920, pads the aggregation of the tiles 924 using the padding 925, tiles the padded aggregation of the tiles 924, and then re-tiles the padded aggregate to generate overlapping tiles 933a, . . . , 933d of the input tensor 932. For example, now the input tensor 932 has an overlap region 905 between tiles 933a and 933b, and similar overlap regions between any two neighboring tiles. The input processing node 934 of the next section 930 operates on the input tensor 932, which is generated by padding and then re-tiling the aggregation of the set of output tiles 924a, . . . , 924d of the output tensor 920 of the preceding section. In an example, a batch normalization operation is performed (not illustrated in the figure), where the input tensor 932 is appropriately configured to be processed by the section 930.

Thus, in FIG. 9C, the compiler 216 is configured to section the processing graph into two sections 900 and 930. The section 900 is configured (e.g., by the compiler 216) to generate a set of output tiles 924a, . . . , 924d in a target tiling configuration of the section 900, in response to processing a set of input tiles of the input tensor 902 of the section 900. Similarly, the section 930 is configured to generate a set of output tiles of the tensor 944 in an output target tiling configuration, in response to processing the set of input tiles 933a, . . . , 933d of the input tensor 932 of the section 930. As discussed, the target tiling configuration of the section 900 (e.g., in which the output tensor 920 is tiled) is different from an input tiling configuration of the 930 (e.g., in which the input tensor 932 is tiled). Thus, the output tensor 920 in the target tiling configuration of the section 900 is transformed to generate the input tensor 932 in the input tiling configuration of the section 930.

In an embodiment, whenever the reconfigurable processors 124 are to read a tile stored in the memory 140, the tile 140 is loaded initially in the local memory units 128, from which the reconfigurable processors 124 then reads the tile. Similarly, whenever the reconfigurable processors 124 finish processing and generating a tile that is to be materialized, the tile is stored from the reconfigurable processors 124 to the local memory units 128, and then from the local memory units 128 to the memory 140. Transfer of tiles between the memory 140, local memory units 128, and/or the reconfigurable processors 124 are, in an example, controlled by the data flow logic 286.

In an embodiment, the data flow logic 286 is configured to use direct memory access (DMA) engines to read from and write into the off-chip memory 140. In an embodiment, the DMA engines are on-chip engines.

Although not illustrated in FIG. 9C, the input tensor 902 is also generated by zero-padding and tiling another input. For example, generation of the input tensor 902, by zero-padding another input tensor and then tiling the zero-padded tensor, is discussed with respect to FIG. 6A. For example, the padded and tiled input tensor 610 of FIG. 6A corresponds to the input tensor 902 of FIG. 9C.

Note that FIG. 9C illustrates a scenario where individual tensors have four tiles. However, the teachings discussed with respect to FIG. 9C can be applied for tensors having a larger number of tiles, such as the general multi-tiled tensors discussed with respect to FIG. 7A.

Note that FIG. 9C illustrates a scenario where the 20×20 space 921 is reserved in the memory 140, and the 8×8 tensors 924 are written to this space 921, thereby generating the zero-padding along the periphery of the space 921. However, in another example, (and although not illustrated in FIG. 9C), the zero-padding may also be done in parallel with writing the 8×8 tensors 924 to the memory 140. For example, when the tensors 924 are written to the memory 124, zero-padding of width 2 is added to the tensors 924 in the memory 140, thereby generating the desired zero-padding. In yet another example, the zero-padding is applied after the 8×8 tensors are written to the memory 140.

Although FIG. 9C illustrates tile materialization, zero-padding and/or tile formatting (e.g., re-tiling) being performed in the memory 140, in another example, one or more of these operations can also be performed in on-chip memory 128. For example, although not illustrated in FIG. 9C, the 20×20 space 921 illustrated in FIG. 9C can be initialized to zero in the on-chip memory 128, and the tiles 924 can be written to this memory space 921 in the on-chip memory 128, this generating the zero-padding around the tensors. Similarly, the tile formatting (i.e., re-tiling) is also done in the on-chip memory 128, similar to the discussion with respect to FIG. 9C.

Figure 9D:
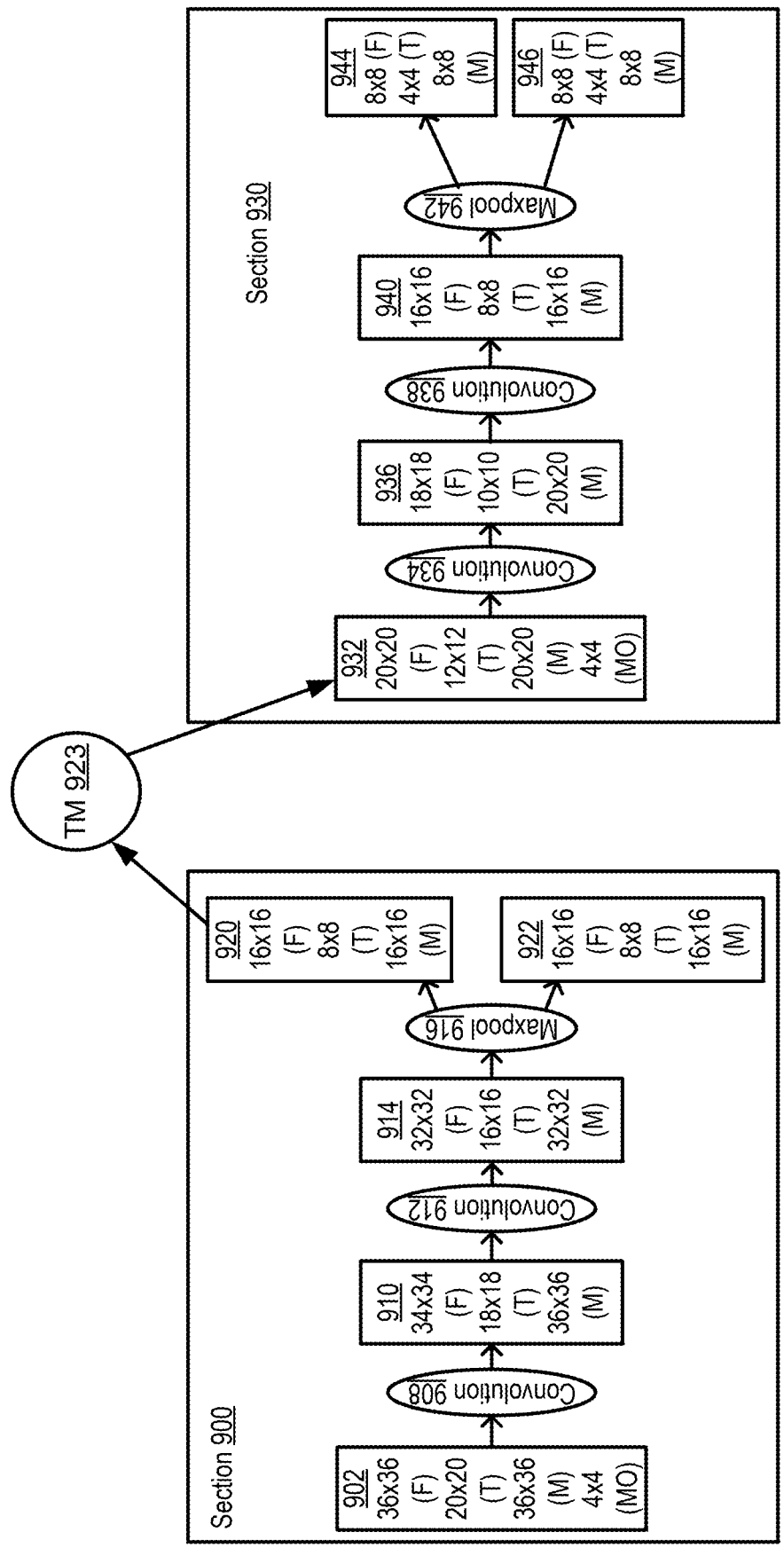
FIG. 9D illustrates a tiling materialization node between two adjacent sections and of a processing graph.

FIG. 9D illustrates a tiling materialization node 923 added between two adjacent sections 900 and 923 of a processing graph. A tiling materialization (TM) node is added at graph cuts, whenever a tensor flows from one section of the processing graph to another section of the processing graph and a tiling transformation is required. In FIG. 9D, the TM node 923 is added between sections 900 and 930.

In an embodiment, for each processing node and tensor pair, corresponding tiling metadata is generated. For example, the input processing node 908 of the section 900 has tiling metadata that is tied to the input layer 908 and the tensor 902. The tiling metadata for the (processing node 908, tensor 902) pair includes information on how the tensor 902 is tiled, and includes one or more (or all) of the size information associated with the tensor 902, e.g., includes sizes 36×36 (F), 20×20 (T), 36×36 (M), and 4×4 (MO) associated with the tensor 902.

Similarly, the tiling metadata for the (output processing node 916, output tensor 920) includes tiling information of the output tensor 920, and the tiling metadata for the (input processing node 934, input tensor 932) includes tiling information of the input tensor 932. In a section cut, as a tensor can possibly be reconfigured (e.g., zero-padded and re-tiled), the tiling metadata for (output processing node 916, output tensor 920) would be different from the tiling metadata for (input processing node 934, input tensor 932). A TM node, which is added to a corresponding section cut of the processing graph, represents a transformation from an output tile/tensor configuration in one section to an input tile/tensor configuration in an adjacent succeeding section. Thus, referring now to FIG. 9D, the TM node 923, which is added to the section cut between sections 900 and 930 of the processing graph, represents a transformation from the configuration of the output tiles 924 (see FIG. 9C) and the tensor 920 in the section 900 to the configuration of the input tiles 933 (see FIG. 9C) and the tensor 932 in the adjacent succeeding section 930. In an embodiment, the TM node 923 acts as a check-point, to materialize and save the output tile 920 from the processing node 916 in a first tiling configuration in the memory 140, and read the input tile 932 in a second tiling configuration from the memory 140 to the processing node 934, as discussed herein. Generally, a TM node is added for every (processing node, tensor) pair that crosses a section boundary when the tensor shapes on each side of the section boundary are incompatible, an example of which is illustrated in FIG. 9D.

As discussed, at a section boundary, an output tensor of a preceding section is materialized and stored in the memory 140, where the output tensor can possibly be reconfigured (as discussed with respect to FIG. 9C), and then re-loaded as an input tile for a succeeding section. The TM node associated with the section boundary tracks a first tiling metadata for the output tensor of the preceding section being stored in the memory 140, as well as tracks a second tiling metadata for the input tensor of the succeeding section being loaded from the memory 140. Thus, the first tiling metadata is associated with a store-to-memory operation, while the second tiling metadata is associated with a load-from-memory operation. The tiling metadata can be stored in the memory 140, and/or within the local memory units 128.

In the example of FIG. 9D discussed above, a TM node (such as the TM node 923) acts as a check-point, to materialize and save an output tensor from an output processing node in a first tiling configuration in the off-chip memory 140, and to read an input tensor in a second tiling configuration from the off-chip memory 140 to an input processing node, as discussed herein. Thus, in an example, the TM node is associated with saving a tensor in a first tiling configuration to the off-chip memory 140, and reading the tensor in a second tiling configuration from the off-chip memory 140. However, in another example and although not illustrated in FIG. 9D, a TM node may be fully executed on-chip, without the need to store to and load from the off-chip memory 140. In such an example, the TM node saves a tensor in a first tiling configuration to the on-chip memory 128, and reads the tensor in a second tiling configuration from the on-chip memory 128.

FIGS. 9C and 9D discussed herein above are specifically about how a tensor is materialized and processed at a section cut. FIG. 9E illustrates materialization of a tensor at a layer of a processing graph that is not immediately adjacent to a section cut. For example, FIG. 9E illustrates a manner in which the tensor 910 is materialized, where the tensor is within a section and is not an input or output tile of any section. For example, the layer 908 outputs individual tiles of the tensor 910. In an embodiment, the data flow logic 286 (illustrated in FIG. 2) materializes the tiles 834a, . . . , 834d of the tensor 910, e.g., stores the tiles 834 to the memory 140, as illustrated in FIG. 9E and as discussed with respect to FIG. 8A as well. For example, the tiles 834 are transmitted to the memory 140 via the external I/O interface 150 and the line 145 (illustrated in FIG. 2).

In an embodiment, the data flow logic 286 causes transmission of the tiles 834a, . . . , 834d individually and independently to the memory 140 from the array 190, as and when the tiles are generated. For example, once the array 190 generates the tile 834a, the data flow logic 286 causes transmission of the tile 834a from the array 190 to the memory 140; then once the array 190 generates the tile 834b, the data flow logic 286 causes transmission of the tile 834b from the array 190 to the memory 140, and so on.

In another embodiment, the data flow logic 286 causes transmission of the tiles 834a, . . . , 834d collectively to the memory 140 from the array 190. For example, the data flow logic 286 waits until all the tiles 834a, 834b, 834c, 834d are generated. Once all the tiles 834a, 834b, 834c, 834d are generated, the data flow logic 286 causes transmission of the tiles 834a, . . . , 834d collectively or in a batch to the memory 140 from the array 190.

As discussed with respect to FIG. 8A, although the tiles 834 are overlapping tiles, the tiles 834 are stored in a non-overlapping manner in the memory 140. Accordingly, the overlap region 835 between the tiles 834a and 834b are written twice in the memory (e.g., once as a part of the tile 834a and once more as a part of the tile 834b), as discussed with respect to FIG. 8A.

The tiles 834a, 834b, 834c, 834d are read back from the memory 140 by the array 190, during the convolution operation at the processing node 912. In an embodiment, peripheral pixels 911 of the tensor 910 are forced to zero, as discussed with respect to FIG. 6C herein previously, prior to the read-back of the tiles during the convolution operation at the processing node 912.

Figure 9F:
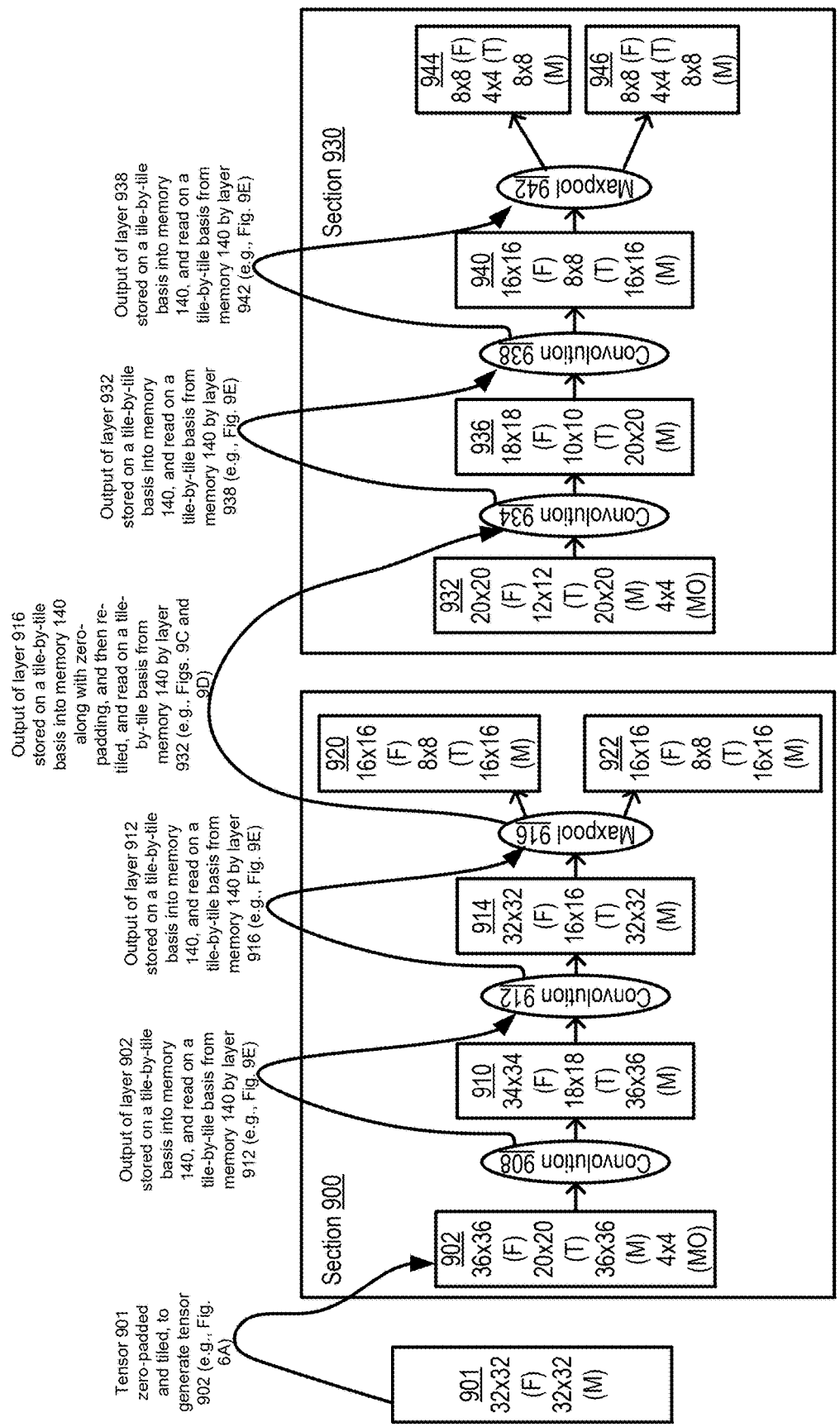
FIG. 9F illustrates processing and/or materialization of tensors at two sections of forward pass of a processing graph.

FIG. 9F illustrates processing and/or materialization of tensors at two sections of the forward pass of a processing graph. FIG. 9F, in essence, summarizes various discussion with respect to FIGS. 6A-6C and 9B-9E. For example, the various processing nodes or layers in individual ones of the sections 900 and 930, as illustrated in FIG. 9F, are also discussed with respect to FIGS. 9B-9E. For example, tensor 901 (e.g., which can be an input image 901 comprising a plurality of pixels) is zero-padded and tiled, to generate the input tensor 902 of the section 900. Generation of the tensor 902 from the tensor 901 has been discussed with respect to FIGS. 6A-6C. As illustrated, the tensor 901 is an input image with a size of 32×32, and occupies 32×32 space in the memory 140. The tensor 902 is a 36×36 tensor having 20×20 tiles, and is stored as a 36×36 tensor in the memory 140, with a 4×4 overlap, as illustrated in FIGS. 6A and 9F.

The layer 908 processes the input tensor 902, to generate the intermediate tensor 910. As illustrated, the output of the layer 902 (e.g., the tensor 910) is stored on a tile-by-tile basis into the memory 140, and read on a tile-by-tile basis from memory 140 by the next layer 912, as also discussed with respect to FIG. 9E. Similarly, the output of the layer 912 (e.g., the tensor 914) is also stored on a tile-by-tile basis into the memory 140, and read on a tile-by-tile basis from memory 140 by the next layer 916, similar to the discussion with respect to FIG. 9E.

The output of layer 916 is stored on a tile-by-tile basis into memory 140 and aggregated or composed into tensor 920 (where zero-padding occurs while storing the tiles, as discussed with respect to FIG. 9C) and then re-tiled, and read on a tile-by-tile basis from memory 140 by the layer 932, as discussed in further detail with respect to FIGS. 9C and 9D. Outputs of layers 934 and 938 are also processed similar to the outputs of layers 908 and 912, respectively, in an example, as illustrated in FIG. 9F.

Graph Sections Including Single Forward Section and Single Backward Section

Figure 10A:
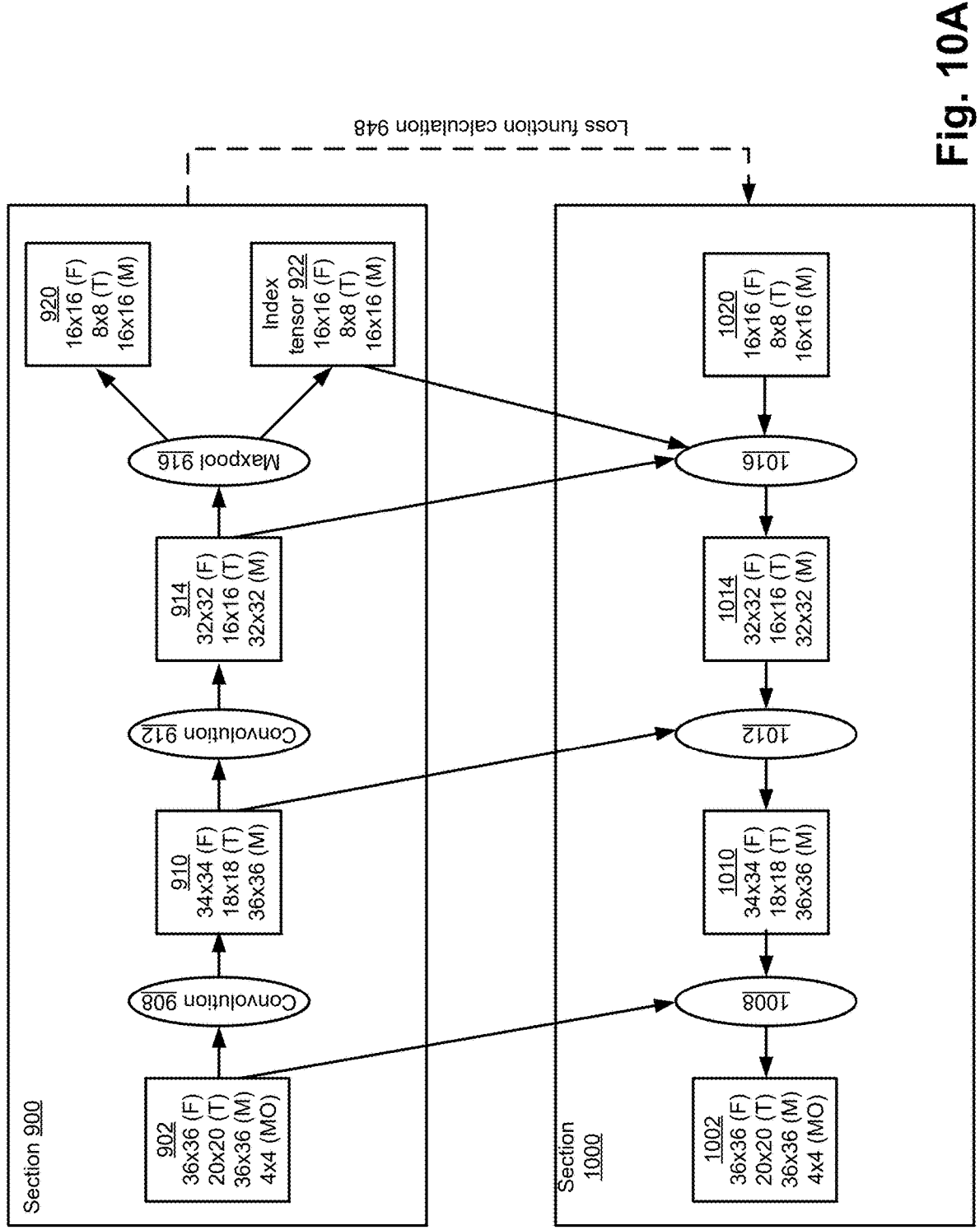
FIG. 10A illustrates a processing graph comprising one forward section and one backward section.

FIG. 10A illustrates a processing graph comprising one forward section 900 and one backward section 1000. The processing graph is used to implement a neural network, such as a CNN, a FCNN, an RNN, a LSTM network, an autoencoder, a deep belief network, a GAN, and/or the like. The forward section 900 implements a forward subgraph, and the backward section 1000 implements a backward subgraph.

The forward section 900 illustrated in FIG. 10A is also illustrated and discussed with respect to FIGS. 9A-9E. Each of the sections 900 and 1000 of the processing graph comprises a sequence of processing nodes or layers. Each individual processing node or layer performs a corresponding operation. For example, the layers in the sequence of layers of each of the sections 900 and 1000 can include one or more of convolution layers, max pooling layers, min pooling layers, average pooling layers, non-linearity layers, normalization layers, dropout layers, concatenation layers, transpose convolution layers, fully connected layers, softmax layers, and/or loss layers, although not all such operations are illustrated in FIG. 10A.

For example, as discussed with respect to FIGS. 9A-9F, the forward section 900 comprises a sequence of processing nodes or layers 908, 912, and 916. The layer 908 implements a convolution operation on the input tensor 902, to generate the intermediate tensor 910. The layer 912 implements a convolution operation on the intermediate tensor 910, to generate the intermediate tensor 914. The layer 912 implements a max-pool operation on the intermediate tensor 914, to generate the output tensor 920 and the index tensor 922, as also discussed with respect to FIG. 9A.

The backward section 1000 also comprises a sequence of processing nodes or layers 1016, 1012, and 1008. The layer 1016 performs backward max-pooling, and each of the layers 1012 and 1008 perform transpose convolution. In general, in a backward section, weight gradients and input gradients are calculated.

In some examples, the weight gradient dW(L) at layer L is a function of (i) loss(L+1) of the backward pass (i.e., the loss at layer (L+1)) and (ii) tensor at layer L of the forward pass. For example, a weight gradient at layer 1012 is a function of loss at layer 1016 and the tensor 910 that is input to the corresponding layer 912. The weight gradient at layer 1012 has a dimensionality that is equal to a dimensionality of the convolution kernel used at layer 912. During a training process, the weight gradient at layer 1012 is used to update weights of the convolution kernel at layer 912. For example, if a 3×3 kernel is used, the weight gradient at layer 1012 is also 3×3. Because weight gradients are relatively smaller in size compared to the tensor gradients, in an example, calculation of weight gradients may not involve tiling (e.g., weights are not tiled). Accordingly, FIG. 10A illustrating the backward section 1000 does not illustrate flow of weight gradients. Specifically, FIG. 10A illustrates flow of input gradients, and not flow of weight gradients. Determination of the weight gradient at a specific layer is done by summing or accumulating multiple tiled-weight gradients, where each tiled-weight gradient is determined based calculations performed on a corresponding tile, as will be discussed in further detail with respect to FIG. 10B.

In an example, a loss of a layer L in a backward section is a function of loss from layer (L+1) of the backward pass and weight from layer L of the forward pass. Thus, loss at layer 1012 is a function of loss from layer 1016 and the weight from layer 912.

In an embodiment, an output of the section 900 is processed to generate a loss function (labelled symbolically using dotted lines and labelled as "Loss function calculation 948" in FIG. 10A). The loss function is used in the backward section 1000, e.g., to calculate the input gradients (or tensor gradients) at various layers. For example, the representation 1020 is a gradient tensor, also referred to as input gradient. The gradient tensor 1020 has an actual size of 16×16, with 8×8 tile size, and stored in the memory 140 as 16×16 gradient tensor with zero overlap.

The layer 1016 receives the gradient tensor 1020, the index tensor 922 from the forward section 900, and the weight from the layer 916. The layer 1016 implements a backward max-pooling, to generate an intermediate loss gradient tensor 1014. For example, the intermediate gradient tensor 1014 has a size of 32×32, with non-overlapping tiles of 16×16 size. Each tile of the intermediate gradient tensor 1014 is generated based on corresponding gradient tile of the gradient tensor 1020. Although not illustrated, the layer 1014 also generates the weight gradient for the output layer 916 of the section 900.

The intermediate layer 1012 of the section 1000 receives the gradient tensor 1014 (e.g., having a size of 32×32, with tile size of 16×16). Each 16×16 tile of the tensor 1014 is transpose convolved at layer 1012 using the weight of layer 912, to generate a corresponding 18×18 tile of another intermediate gradient tensor 1010. Because of transpose convolution, the size of the gradient tensors in the backward section 1000 progressively increases, as illustrated in FIG. 10A. The intermediate gradient tensor 1010 has a size of 34×34, with 18×18 tiles that have a 2×2 overlap. However, the 18×18 tiles of the intermediate gradient tensor 1010 are stored in a non-overlapping manner in the memory 140, as a result of which the intermediate gradient tensor 1010 occupies a space of 36×36, with zero "MO" overlap between the tiles in the memory 140. Although not illustrated, the layer 1012 also generates weight gradient for the output layer 912 of the section 900.

The final layer 1008 of the section 1000 receives the gradient tensor 1010 (e.g., having a size of 34×34, with tile size of 18×18) and each 18×18 tile is transpose convolved (e.g., using weights of the layer 908), to generate corresponding 20×20 tile of a gradient tensor 1002. The gradient tensor 1002 has a size of 36×36, with 20×20 tiles that have a 4×4 overlap. The 20×20 tiles of the gradient tensor 1002 are stored in an overlapping manner in the memory 140, as a result of which the gradient tensor 1002 occupies a space of 36×36, with 4×4 "MO" overlap between the tiles in the memory 140. Thus, the gradient tensor 1002 is stored in the memory 140 with a 4×4 overlap, similar to the input tensor 902 of the section 900. Although not illustrated, the layer 1008 also generates weight gradient for the layer 908 of the section 900.

Figure 10B:
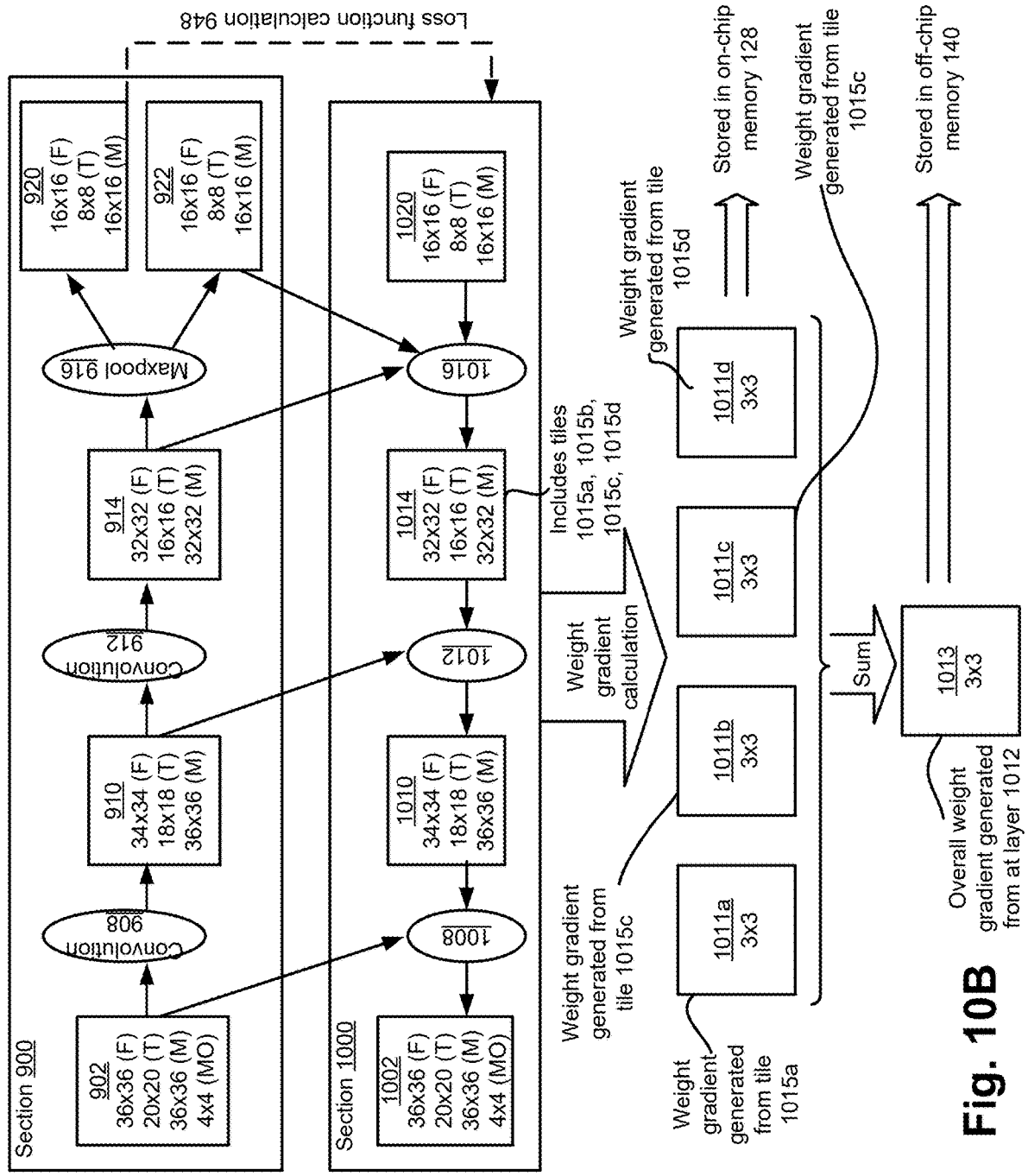
FIG. 10B illustrates tile-wise calculation of weight gradient for a layer in a backward section of a processing graph.

Weight Gradient Calculation by Summing Multiple Corresponding Tiled-Weight Gradients FIG. 10B illustrates tile-wise calculation of weight gradients for a layer in a backward section of a processing graph. The processing graph illustrated in 10B is same as the processing graph illustrated in FIG. 10A. FIG. 10B specifically illustrates calculation of the weight gradient at layer 1012 of the backward section 1000.

As illustrated in FIG. 10B, the input to the layer 1012 is the gradient tensor 1014 having four tiles, such as tiles 1015a, 1015b, 1015c, and 1015d. Assume that a weight gradient 1011a is generated based on tile 1015a, a weight gradient 1011b is generated based on tile 1015b, a weight gradient 1011c is generated based on tile 1015c, and a weight gradient 1011d is generated based on tile 1015d. For example, the weight gradient 1011a at layer 1012 is a function of loss indicated by tile 1015a of the gradient tensor 1014 and a corresponding tile of the tensor 910. Similarly, the weight gradient 1011b at layer 1012 is a function of loss indicated by tile 1015b and another corresponding tile of the tensor 910, and so on. Each of the weight gradients 1011a, 1011b, 1011c, and 1011d have a dimensionality that is identical to that of the convolution kernel used at layer 912. Merely as an example, each of the weight gradients 1011a, 1011b, 1011c, and 1011d is assumed to have a dimensionality of 3×3. In an example, the weight gradients 1011a, 1011b, 1011c, and 1011d are also referred to herein as "tiled-weight gradients" or "partial-weight gradients" 1011a, 1011b, 1011c, and 1011d, as these are specific to corresponding tiles, and do not represent the final weight gradient.

In an embodiment, an overall weight gradient 1013 for the layer 1012 is generated based on the tiled-weight gradients 1011a, 1011b, 1011c, and 1011d. For example, the weight gradient 1013 for the layer 1012 is based on a summation (or accumulation) of the tiled-weight gradients 1011a, 1011b, 1011c, and 1011d. For example, initially, the tiled-weight gradient 1011a is generated, and stored in an on-chip memory 128. Then the tiled-weight gradient 1011b is generated and added to the tiled-weight gradient 1011a, and the sum is stored in the on-chip memory 128. Then the tiled-weight gradient 1011c is generated and added to the previous sum, and the updated sum is stored in the on-chip memory 128. Finally, the tiled-weight gradient 1011d is generated and added to the previous sum, to generate the overall weight gradient 1013 for the layer 1012. In an example, the weight gradient 1013 can be normalized or averaged (e.g., divided by 4, as four tiled-weight gradients 1011a, . . . , 1011d were summed to generate the weight gradient 1013). The overall or final weight gradient 1013, in an example, is then stored in the off-chip memory 140. In an embodiment, the weight gradient 1013 is used to update the weights of the kernel used in the convolution layer 912 of the forward pass section 900. The weight gradients for various other layers are also calculated in a similar manner. Thus, in an example, the partial weight gradients 1011a, . . . , 1011d are stored in the same place in on-chip memory 128, i.e. the partial sums are accumulated in-place. Following the execution of all tiles times all batch elements (e.g., as specified by the user) and generation and accumulation of the partial weight gradients, the accumulated final weight gradient is written into the off-chip-memory 140 for consumption by the chosen optimization algorithm to perform a weight update. In another example and contrary to the illustration of FIG. 10B, the final weight gradient 1013 is calculated and stored in the on-chip memory 128 as well.

Processing Graph Including Multiple Forward and Backward Sections

Figure 10C:
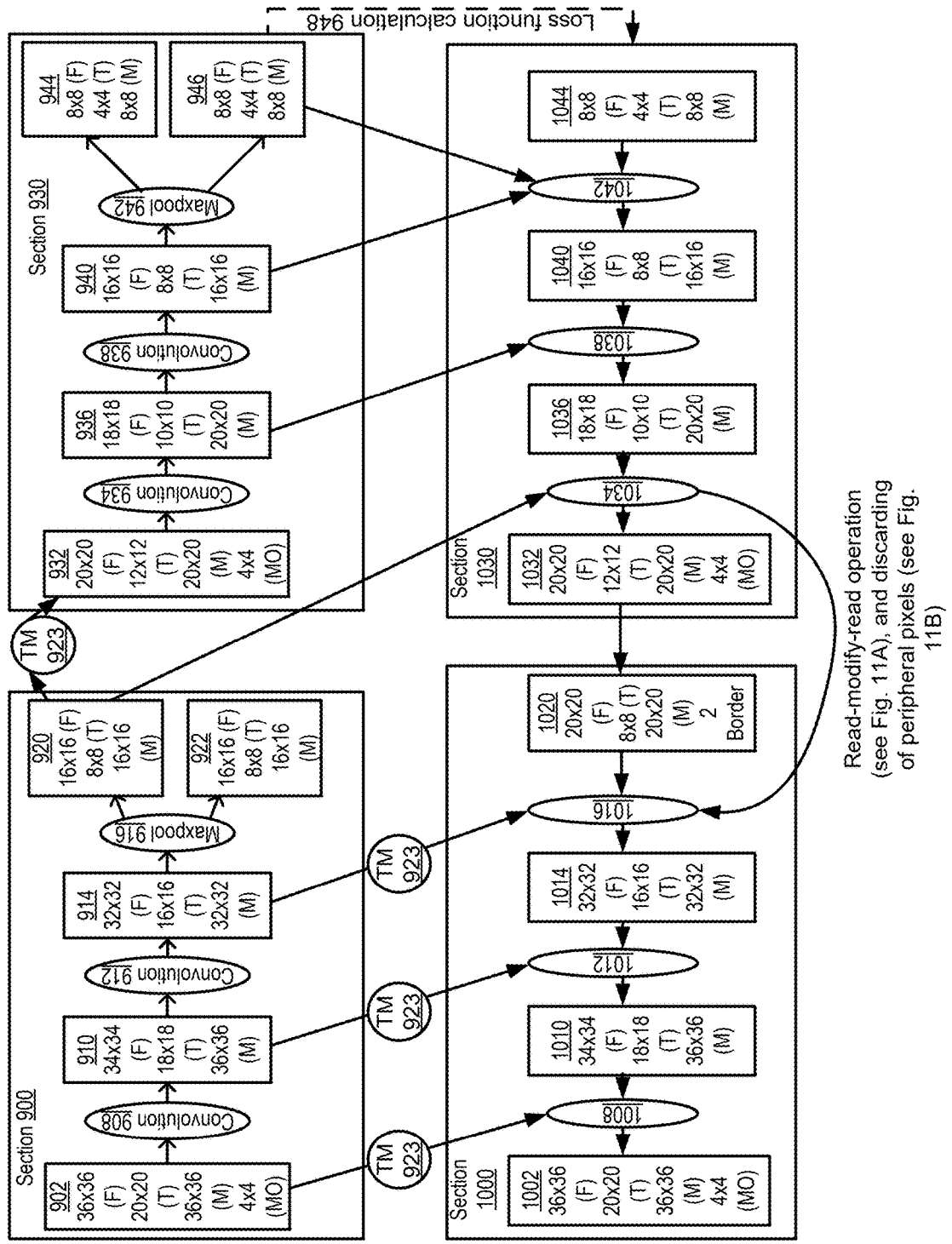
FIG. 10C illustrates a processing graph comprising multiple forward sections and multiple backward sections.

FIG. 10C illustrates a processing graph comprising multiple forward sections 900, 930, and multiple backward sections 1000, 1030. Although two forward sections and two backward sections are illustrated, the graph can include a higher number of forward and backward sections. The processing graph is used to implement a neural network, such as a CNN, a FCNN, an RNN, a LSTM network, an autoencoder, a deep belief network, a GAN, and/or the like. Each of the forward sections 900, 930 implement a corresponding forward subgraph, and each of the backward sections 1000, 1030 implements a corresponding backward subgraph. Operations of individual ones of the sections 900, 930, 1000, 1030 will be apparent to those skilled in the art, in view of discussion of various sections with respect to FIGS. 9A-10C.

Read-Modify-Write Operation Between Two Backward Sections

As illustrated in FIG. 10C, an output layer 1034 of the backward section 1030 outputs a tensor 1032, which is transformed to a tensor 1020 that is received by an input layer 1016 of the subsequent backward section 1000. Transformation of an output of the layer 1034 to form an input of the layer 1016 involves (i) "read-modify-write" operations discussed with respect to FIG. 11A and (ii) discarding peripheral pixels discussed with respect to FIG. 11B.

Figure 11A:
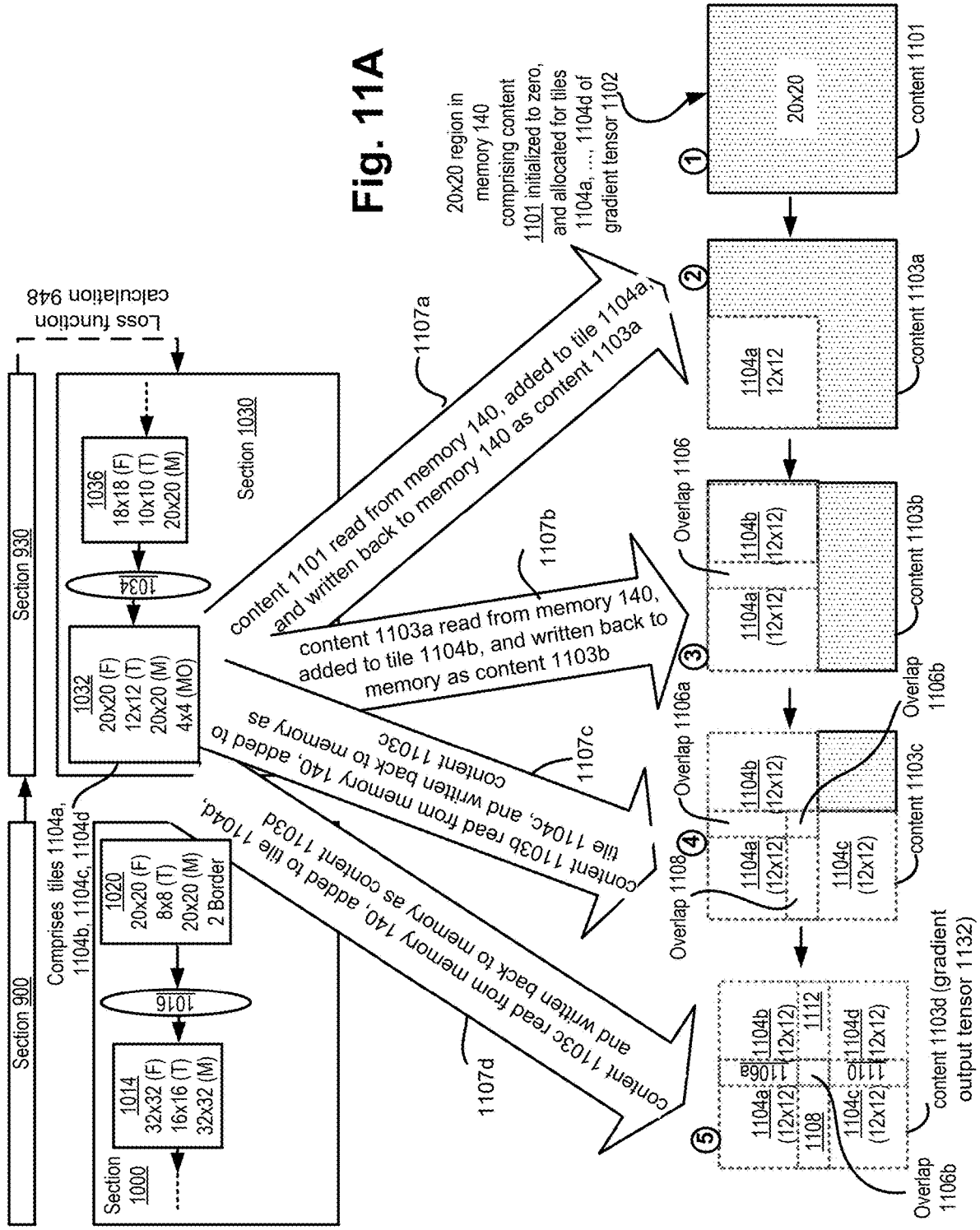
FIG. 11A illustrate a "read-modify-write" operation, to transform an output of an output layer of a backward section to an input of an input layer of a subsequent backward section.

FIG. 11A illustrates a "read-modify-write" operation, to transform an output of an output layer of a backward section to an input of an input layer of a subsequent backward section. The "read-modify-write" operation is performed at a section boundary of a backward pass.

Referring to FIG. 11A, illustrated are the sections 900 and 930 of the forward pass and sections 1000 and 1030 of the backward pass. The processing nodes of the sections 900 and 930 and some of the processing nodes of the sections 1000 and 1030 are not illustrated in FIG. 11A for purposes of illustrative clarity—however, the sections 900, 930, 1000, and 1030 illustrated in FIG. 11A are similar to the corresponding sections illustrated in FIG. 10C. Furthermore, the dimensionality of corresponding tensors in FIGS. 10C and 11A are the same.

In FIG. 11A, assume that the layer 1034 is output to four tiles 1104a, 1104b, 1104c, 1104d, which form the output tensor 1032. Individual ones of the tiles 1104a, 1104b, 1104c, 1104d have a size of 12×12, and are stored as a 20×20 tensor 1032 in the memory 140, and accordingly, have an overlap of 4×4 in the memory 140. The read-modify-write operation illustrated in FIG. 11A shows how the tiles 1104a, 1104b, 1104c, 1104d are stored in the memory 140.

In FIG. 11A, there are four arrow-shapes 1107a, . . . , 1107d, with text within each arrow, and each arrow 1107 indicates a corresponding action associated with a corresponding tile of the tiles 1104a, 1104b, 1104c, 1104d. A bottom section of the figure, from right to left, shows a manner in which the tiles 1104a, 1104b, 1104c, 1104d are written to the memory 140. Various operations are indicated by a corresponding number within an oval.

Referring to the bottom-right section of FIG. 11A, initially, at step 1, a 20×20 region comprising corresponding 20×20 content 1101 is initialized to zero, and is reserved or allocated for storing the tiles 1104a, 1104b, 1104c, 1104d of the tensor 1032. Thus, the 20×20 data or content 1101 has zero values stored in the memory 140.

At step 2, the content 1101 of the region from the memory 140 is read by the processors 124 (see FIG. 2), added to the tile 1104a by the processors 124, and written back to the memory 140 as content 1103a, as illustrated symbolically using the arrow 1107a. Thus, this is referred to as a first "read-modify-write" operation, as the content 1101 is read from memory 140, modified (e.g., by adding the tile 1104a), and written back to the memory 140 as content 1103a. Note that the contents 1101 and 1103a occupy the same space or region in the memory 140.

Note that the tile 1104a is a 12×12 tile and the content 1101 is 20×20—hence, there is a dimensionality mismatch during the addition of the content 1101 and the tile 1104a. This can be resolved by one of two possible ways: (i) the tile 1104a is added to a 12×12 section at a top-left corner of the content 1101, or (ii) the 12×12 tile 1104a is expanded to a 20×20 tile, with the top-left corner of the expanded tile comprising the original 12×12 tile 1104a, and the expanded 20×20 tile is added to the content 1101.

At step 3, the content 1103a from the memory 140 is read by the processors 124, added to the tile 1104b, and written back to the memory 140 as content 1103b, as illustrated symbolically using the arrow 1107b. Thus, this is referred to as a second "read-modify-write" operation, as the content 1103a is read from memory 140, modified (e.g., by adding the tile 1104b), and written back to the memory 140 as content 1103b. Note that the contents 1101, 1103a and 1103b occupy the same space or region in the memory 140. The difference in dimensionality between the tile 1104b and the content 1103a during the addition operation is handled in a manner similar to the discussion with respect to step 2.

Note that each of the tiles 1104a and 1104b is a 12×12 tile, and there is a 12×4 overlap 1106 between the two tiles 1104a, 1104b in the content 1103a. Thus, the 12×4 overlap 1106 is a summation of (i) a 12×4 section on a right periphery of tile 1104a and (ii) another 12×4 section on a left periphery of tile 1104b. For example, a pixel in the overlap 1106 is a summation of a corresponding pixel from the tile 1104a and another corresponding pixel from the tile 1104b.

At step 4, the content 1103b from the memory 140 is read by the processors 124, added to the tile 1104c by the processors 124, and written back to the memory 140 as content 1103c, as illustrated symbolically using the arrow 1107c. This is referred to as a third read-modify-write operation. Note that the contents 1101, 1103a, 1103b and 1103c occupy the same space or region in the memory 140. The difference in dimensionality between the tile 1104c and the content 1103b during the addition operation is handled in a manner similar to the discussion with respect to step 2.

Note that each of the tiles 1104a, 1104b, and 1104c is a 12×12 tile, and there is a 4×8 overlap 1108 between the two tiles 1104a, 1104c in the content 1103c. Also, now the overlap 1106 has two sections: an 8×4 overlap 1106a between tiles 1104a, 1104b, and a 4×4 overlap between tiles 1104a, 1104b, 1104c. Similar to the earlier discussion, the 4×8 overlap 1108 is a summation of (i) a 4×8 section on a bottom periphery of tile 1104a and (ii) another 4×8 section on a top periphery of tile 1104c. Similarly, the 4×4 overlap 1106b is a summation of 4×4 corresponding sections from each of the tiles 1104a, 1104b, 1104c.

At step 5, the content 1103c from the memory 140 is read by the processors 124, added to the tile 1104d by the processors 124, and written back to the memory 140 as content 1103d, as illustrated symbolically using the arrow 1107d. Thus, this is referred to as a fourth read-modify-write operation. Note that the contents 1101, 1103a, 1103b, 1103c and 1103d occupy the same space or region in the memory 140. The difference in dimensionality between the tile 1104d and the content 1103c during the addition operation is handled in a manner similar to the discussion with respect to step 2.

Note that each of the tiles 1104a, 1104b, 1104c, and 1104d is a 12×12 tile, and there are overlaps 1106a, 1106b, 1108, 1112, and 1110, as illustrated in FIG. 11A. Each of the overlaps 1106a, 1108, 1112, and 1110 is a summation of corresponding sections of two corresponding ones of the tiles 1104a, 1104b, 1104c, and 1104d. The 4×4 overlap 1106b is a summation of corresponding sections of all the tiles 1104a, 1104b, 1104c, and 1104d.

The content 1103d is the 20×20 output tensor 1132, with four tiles 1104a, 1104b, 1104c, and 1104d, with an overlap of width 4 in the memory 140. As discussed, the output tensor 1132 is saved in the memory 140.

Figure 11B:
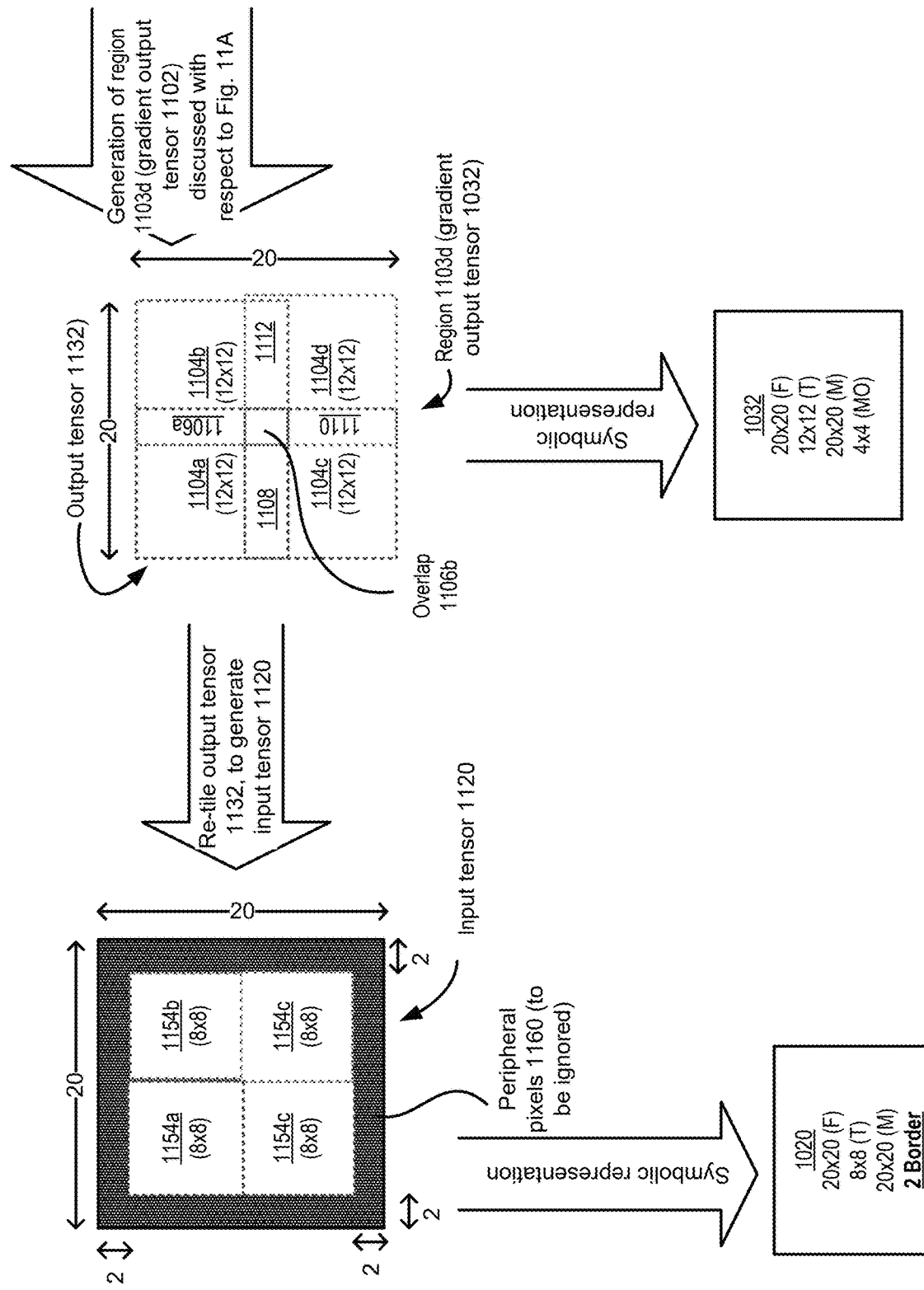
FIG. 11B illustrates reconfiguration of an output tensor, which is output by a backward section, to generate tiles of an input tensor of the subsequent backward section, where the input tensor has peripheral pixels that are ignored or discarded when generating the tiles of the input tensor.

FIG. 11B illustrates reconfiguration of the output tensor 1132, which is output by the backward section 1130 of FIGS. 10B and 11A, to generate tiles 1154a, . . . , 1154d of the input tensor 1020 of the subsequent backward section 1000, where the input tensor 1020 has peripheral pixels that are ignored or discarded when generating the tiles 1154a, . . . , 1154d of the input tensor 1020. Note that the red-modify-write operations discussed with respect to FIG. 11A occurs at output of a backward section, and is accompanied by the peripheral pixel discarding operations of FIG. 11B at the input of a subsequent backward section. Thus, operations discussed with respect to FIGS. 11A and 11B are performed at section breaks in the backward pass (and may not be performed within a section). In an example, these operations may not occur at section breaks in the forward pass.

Referring to FIG. 11B, illustrated on a top-right side of the figure is the output tensor 1032, which is the region 1103d and generation of which is discussed with respect to FIG. 11A. As discussed with respect to FIG. 11A, the output tensor 1032 has overlapping tiles 1104a, ..., 1104d. The tiling configuration of the output tensor 1032 is illustrated at a bottom-right side of the figure.

In an embodiment, the output tensor 1032 is re-tiled, to generate tiles 1154a, 1154b, 1154c, 1154d of the input tensor 1120. Each of the tiles 1154a, 1154b, 1154c, 1154d is 8×8, and the tiles 1154a, 1154b, 1154c, 1154d are non-overlapping and occupies a central space of 16×16 within the tensor 1120, while the tensor 1120 itself is 20×20. This leaves a border or peripheral region comprising peripheral pixels 1160 having a width of, for example, 2. The peripheral pixels 1160 are ignored or discarded while generating the tiles 1154a, ..., 1154d. For example, the peripheral pixels 1160 are not included in any of the tiles 1154a, ..., 1154d. Thus, the tensor 1120 has a border of 2, as illustrated in the symbolic representation of the tensor 1020, and as also illustrated within the tensor 1020 in FIG. 10C. Note that the tensor dimension does not change during the retiling—both the tensors 1132 and 1120 are 20×20.

Referring to FIGS. 9B-9D and 10C, recall that when generating the tensor 932 from the tensor 920, a zero-padding 925 was added (e.g., see FIG. 9C). Ignoring the peripheral pixels 1160 with width 2 in the backward pass of FIG. 11B compensates for the addition of zero-padding 925 of width 2 in the forward pass of FIG. 9C. For example, ignoring the peripheral pixels 1160 with width 2 in FIG. 11B generates results that are same as results generated for a scenario where the tensors were not tiled and processed as a whole.

Graph Metadata Generation and Tiling Decision

Figure 12B:
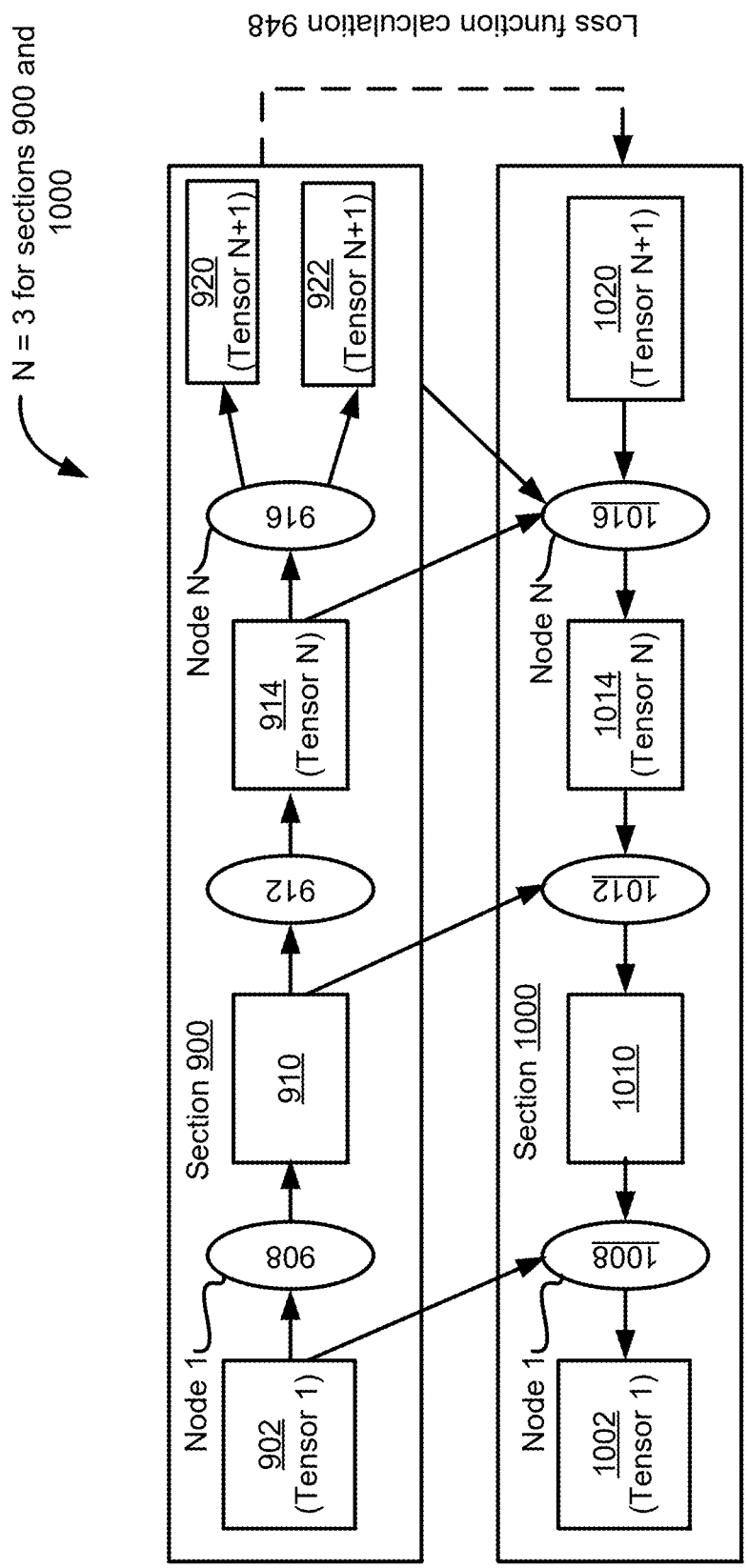
FIG. 12B illustrates example sections of a processing graph, and also illustrates notations used in discussing the method of FIG. 12A.

FIG. 12A illustrates a flowchart depicting a method 1200 for generating graph metadata that includes tiling decisions for a processing graph, and compiling the processing graph based on the tiling decisions included in the metadata. FIG. 12B illustrates example sections of a processing graph, and also illustrates notations used in discussing the method 1200 of FIG. 12A.

At 1204 of the method 1200, a processing graph is received, such as any processing graph discussed herein (such as the processing illustrated in FIG. 12B, or any other figure of this disclosure). In an example, the processing graph comprises a plurality of sections, where each section comprises a sequence of processing nodes 1, N, where N is a positive integer greater than 1.

Note that in an embodiment, each section of the processing graph has the same number of processing nodes N. However, in another embodiment, different sections of the processing graph can include different number of processing nodes. For example, in such a scenario, the method 1200 has to be revised accordingly. For example, assume that a section S1 has N1 number of processing nodes, a section S2 has N2 number of processing nodes, a section S3 has N3 number of processing nodes, and so on. The numbers N1, N2, N3 are positive integers greater than 1, and individual ones of the numbers N1, N2, N3 can be same or different. Merely as an example, N1 can be equal to N2, each of which can be different from N3.

The method 1200 illustrated in FIG. 12A assumes that each section of the processing graph has the same number of processing nodes N. However, in case different sections have different number of processing nodes (e.g., number N1, N2, N3 of processing nodes), the method 1200 can be appropriately modified, as will be appreciated by those skilled in the art. For example, blocks 1208-1224 are repeated for each section, and block 1204 is also executed for each section. Thus, for example, when executing the blocks 1204-1224 of the method 1200 for section S1, the number N can be changed to N1; for section S2, the number N can be changed to N2; and so on.

As discussed herein earlier, the plurality of sections comprises one or more forward sections (e.g., sections in the forward path of the processing graph) and one or more backward sections (e.g., sections in the backward path of the processing graph). For example, in the example graph illustrated in FIG. 12B, section 900 is a forward section, and section 1000 is a backward section. Note that the graph in FIG. 12B is similar to that in FIG. 10A, and various components in both the graphs in FIGS. 10A and 12B are labeled using same labels.

The processing nodes 1, N are labelled differently for forward sections and backward sections. For example, as illustrated in block 1204 of the method 1200, for individual sections in the forward path, a corresponding input node forms a corresponding $1^{st}$ processing node (or processing node 1) of the section. For example, referring to FIG. 12B, the input processing node 908 of the forward section 900 forms the processing node 1 of the section 900. Similarly, referring to FIG. 9B, the processing node 934 forms the processing node 1 of the section 930.

Similarly, the output node of individual forward section is labelled as processing node N. For example, for the forward section 900 of FIG. 12B, the output node 916 is the processing node N. Similarly, referring to FIG. 9B, the processing node 942 forms the processing node N of the section 930. Intermediate processing nodes, between processing nodes 1 and N, are progressively labelled as processing nodes 2, ..., (N−1). In the example of FIGS. 9B and 12B, N=3 for both forward and backward passes.

The tensors of individual forward sections are also labelled as 1, ..., (N+1) corresponding to the N number of processing nodes. For example, as illustrated in FIG. 12B, for a forward section, processing node 1 receives tensor 1 and outputs tensor 2, processing node 2 receives tensor 2 and outputs tensor 3, processing node N receives tensor N and outputs tensor (N+1), and so on.

As also illustrated in block 1204 of the method 1200, for individual sections in the backward path, a corresponding input node forms a corresponding $N^{th}$ processing node (or processing node N) of the section. For example, referring to FIG. 12B, the input processing node 1016 of the backward section 1000 forms the processing node N of the section 1000. Similarly, referring to FIG. 10C, the processing node 1042 forms the processing node N of the section 1030. Similarly, the output node of individual backward section is labelled as processing node 1. For example, for the backward section 1000 of FIG. 12B, the output node 1008 is the processing node 1, and intermediate processing nodes, between processing nodes 1 and N, are progressively labelled as processing nodes 2, ..., (N−1).

The tensors of individual backward sections are also labelled as 1, ..., (N+1) corresponding to the N number of processing nodes in the backward sections. For example, as illustrated in FIG. 12B, processing node N receives tensor (N+1) and outputs tensor N, processing node (N−1) receives tensor N and outputs tensor (N−1), processing node 1 receives tensor 2 and outputs tensor 1, and so on.

The method 1200 then proceeds from 1204 to 1208. It is to be noted that operations depicted in blocks 1208-1224 of the method 1200 are performed for each section (e.g., each forward and backward section) of the processing graph. The tiling decisions associated with individual sections are generated individually and independently.

At 1208, the graph metadata generation logic 109 (e.g., see FIG. 1) determines a $(N+1)^{th}$ tiling configuration comprising a set of non-overlapping tiles for a $(N+1)^{th}$ tensor. As discussed above, for a forward section, $(N+1)^{th}$ tensor is the output tensor; and for a backward section, $(N+1)^{th}$ tensor is the input tensor. Thus, initially, the graph metadata generation logic 109 determines tiling configuration of output tensors of individual forward sections, and tiling configuration of input tensors of individual backward sections. Merely as an example, referring to FIG. 9B, at 1208, the tiling configuration of output tensors 920 and 944 of forward sections 900 and 930, respectively, are determined at 1208, where the tiling configuration comprises non-overlapping tiles. Similarly, referring to FIG. 10C, at 1208, the tiling configuration of input tensors 1044 and 1020 of backward sections 1030 and 1000, respectively, are determined at 1208, where the tiling configuration comprises non-overlapping tiles.

The determination at 1208 are for tiling configurations of output tensors for forward sections, and tiling configurations of input tensors for backward sections. The $(N+1)^{th}$ tiling configurations for tensors for various sections determined at 1208 are also referred to as target tiling configurations, as the tiling decisions are made to satisfy the target tiling configurations. A $(N+1)^{th}$ tiling configuration determined for a specific section can be based on a variety of factors. For example, the $(N+1)^{th}$ tiling configuration determined for a specific section is based on a number of processing nodes in the corresponding section, and respective processing logics or functions (such as convolution, pooling, etc.) implemented by respective processing nodes in the corresponding section. For example, if there are a number of processing nodes implementing convolution operation, there might be some dimension reduction during the convolution operation, and the $(N+1)^{th}$ tiling configuration is determined taking into account such factors.

In an embodiment, the tiling decision at 1208 is made based on a size of the tensor (N+1). For example, referring to FIG. 9B, the output tensor 920 is 16×16, and this tensor is to be tiled into non-overlapping tiles. Choices of tiling decisions can include tiles having size 8×8, 4×4, or 2×2. That is, the tensor size is divisible by the tile size, as the tiles here are non-overlapping. The decision to, for example, select 8×8 over 4×4 and 2×2 is implementation specific, and can be based on factors such as memory storage capacity of the local memory unit 128 and/or the off-chip memory 140.

In an embodiment, the tiling decision at 1208 is made based on a size of the tensor 1. For example, referring to FIG. 9B, a size of the input tensor 902 dictates the size of the output tensor 920, and the size of the tiles of the output tensor 920 is based on the size of the output tensor 920. Thus, the size of the tiles of the output tensor 920 (e.g., which is the $(N+1)^{th}$ tiling configuration for the section 900) is based on a size of the input tensor 902.

The output tensor 920 is 16×16, and this tensor is to be tiled into non-overlapping tiles. Choices of tiling decisions can include tiles having size 8×8, 4×4, or 2×2. That is, the tensor size is divisible by the tile size, as the tiles here are non-overlapping. The decision to choose 8×8 over 4×4 and 2×2 is implementation specific, and can be based on factors such as memory storage capacity of the local memory unit 128 and/or the off-chip memory 140.

In an embodiment, the $(N+1)^{th}$ tiling configurations for tensors for various sections are pre-specified in the processing graph. In such a use case, the determination step at 1208 comprises accessing the processing graph received at 1204, and simply reading the $(N+1)^{th}$ tiling configurations from the processing graph received at 1204.

After the tiling configuration of the $(N+1)^{th}$ tensor is determined, the tiling configuration of the $(N+1)^{th}$ tensor is added to the graph metadata. Subsequently, the tiling configuration of remaining tensors N, (N−1), . . . , 1 are successively determined at blocks 1212-1224. For example, the method 1200 proceeds from block 1208 to 1212, where a tensor index i is initialized to have the value of "N".

The method then 1200 proceeds from block 1212 to 1216, where the graph metadata generation logic 109 determines an $i^{th}$ tiling configuration comprising a set of overlapping tiles for an $i^{th}$ tensor, based on a previously determined tiling configuration for the $(i+1)^{th}$ tensor, and adds the $i^{th}$ tiling configuration to the graph metadata. For example, during a first iteration of the method 1200 (where i=N), for each section, an $N^{th}$ tiling configuration for the $N^{th}$ tensor is determined from the $(N+1)^{th}$ tiling configuration of the $(N+1)^{th}$ tensor. Similarly, during a second iteration of the method 1200 (where i would now be (N−1)), for each section, an $(N-1)^{th}$ tiling configuration for the $(N-1)^{th}$ tensor is determined from the $N^{th}$ tiling configuration of the $N^{th}$ tensor. Similarly, during a last iteration of the method 1200, for each section, a $1^{st}$ tiling configuration for the $1^{st}$ tensor is determined from the $2^{nd}$ tiling configuration of the $2^{nd}$ tensor.

Merely as an example, referring to FIG. 9B, once the tiling configuration of the output tensor 920 is determined, the tiling configuration of the intermediate tensor 914 can be determined, based (i) the tiling configuration of the output tensor 920, (ii) a padding, a kernel size, and a stride used during the convolution in the processing node 916, and (iii) equation 1 and 2, or a variation of these equations.

For example, equations 1 and 2 are usable to calculate size of an output tile, based on a size of an input tile. In contrast, for a section in the forward pass, the tiling decision is made in a direction that is opposite or reverse of the direction of data flow. For example, for a section in the forward pass, a tile in a tensor i+1 is generated from a corresponding tile in tensor i, and the method 1200 has to generate tiling configuration of tensor i from tiling configuration of tensor (i+1). Thus, for a forward section, an inverse of equations 1 and 2 can be used, as follows:

$$W_i=(W_o-1)*S_w+K_w-P_w \quad \text{Equation 3}$$

$$H_i=(H_o-1)*S_h+K_h-P_h \quad \text{Equation 4}$$

Equations 3 and 4 and usable for the determination at 1216 for individual forward sections, where $W_o$ and $H_o$ are width and height of tiles of tensor (i+1), $W_i$ and $H_i$ are width and height of tiles of tensor i, and $S_w$, $K_w$, $P_w$, $S_h$, $K_h$, $P_h$ are convolution parameters discussed with respect to equations 1 and 2 and are for the processing node i. As discussed herein previously, for both the forward and backward sections, except for the tensor (N+1), other tensors have overlapping tiles.

It is to be noted that the tiling configuration of a tensor not only specifies the tile sizes of a tensor, but also specifies padding size (if applicable) applied to the tensor, as well as overlap among the tiles. For example, if a tensor is to be zero-padded (as discussed with respect to FIGS. 6A-6C and 7A), the tiling configuration will include the size of such zero-padding. Similarly, if peripheral pixels of a tensor are to be forced to zero (as discussed with respect to FIG. 6C), the tiling configuration will include such information for the corresponding tensor. In an embodiment, the tiling configuration of a tensor includes the sizes denoted by "F", "T", "M", and "MO" for the tensor, as discussed with respect to FIG. 9A. In some embodiments, information associated with zero-padding and/or zero-forcing of peripheral pixels are stored in the graph metadata, and maybe possibly be stored separately from the tiling configuration.

In an embodiment, the graph metadata includes various convolution parameters associated with convolution operations performed by one or more processing nodes. For example, the parameters $S_w$, $K_w$, $P_w$, $S_h$, $K_h$, $P_h$ discussed with respect to equations 1~4 are stored for those processing nodes that perform the convolution operations.

Thus, for example, for the processing node 908 of section 900 of FIG. 9B, the graph metadata stores the tiling configuration of the tensors 902 and/or 910 (including sizes denoted by "F", "T", "M", and "MO" for these tensor), and also stores convolution parameters Sw, Kw, Pw, Sh, Kh, Ph for the convolution to be performed by the processing node 908. The graph metadata stores similar information for various other processing nodes of various other sections.

The method 1200 proceeds from 1216 to 1220, where a determination is made as to whether tiling configurations for all tensor in individual sections have been considered. For example, at 1220, a determination is made as to whether tensor index i=1.

If the tensor index i is not equal to 1 (e.g., if "No" at 1220), this implies that not all tensors have been considered yet. In such a scenario, the method 1200 proceeds from 1220 to 1224, where the tensor index i is decremented by one. The method 1200 then loops back from block 1224 to block 1216. Thus, operations at blocks 1216, 1220, and 1224 are repeated for N number of times, where tiling configuration for tensor N is determined during the $1^{st}$ iteration, where tiling configuration for tensor (N−1) is determined during the $2^{nd}$ iteration, and so on, and finally, tiling configuration for tensor 1 is determined during the $N^{th}$ iteration.

Thus, after the $N^{th}$ iteration of blocks 1216, 1220, and 1224, tiling decisions for all the tensors for all the sections have been determined, and have updated within the graph metadata. Finally, during the $N^{th}$ iteration of block 1220, index i is equal to 1 (e.g., "Yes" at 1220), and this implies that all tensors in individual sections have been considered and corresponding tiling configurations have been determined. Accordingly, the method 1200 proceeds from 1220 to 1228. At 1228, the compiler 106 compiles the processing graph, based on the graph metadata, to generate a configuration file that is configured in accordance with the $1^{st}$, ..., $N^{th}$ tiling configuration for each section. During compilation, the processing graph is modified, and the tiling configurations of various tensors within the processing graph are updated based on the graph metadata.

Thus, the method 1200 discusses generating tiling configurations for various forward and backward sections of a processing graph, and compiling the processing graph based on such tiling configurations. For example, a first section of the processing graph has a first topology of tiling configurations and a second section of the processing graph has a second topology of tiling configurations. As seen in various figures (e.g., FIGS. 9B-10B), the first topology of tiling configurations and the second topology of tiling configurations are different, as tensors of the first and second sections are tiled differently.

In an example, tiling dependencies between successive sections in the sequence of the plurality of sections are decoupled, and tiling dependencies between successive layers are confined to layers within a section.

Once the configuration file corresponding to the processing graph is generated, the runtime logic 110 executes the application associated with the processing graph, e.g., using the configuration files generated during the compilation process at 1228.

Example Reconfigurable Processor

Figure 13:
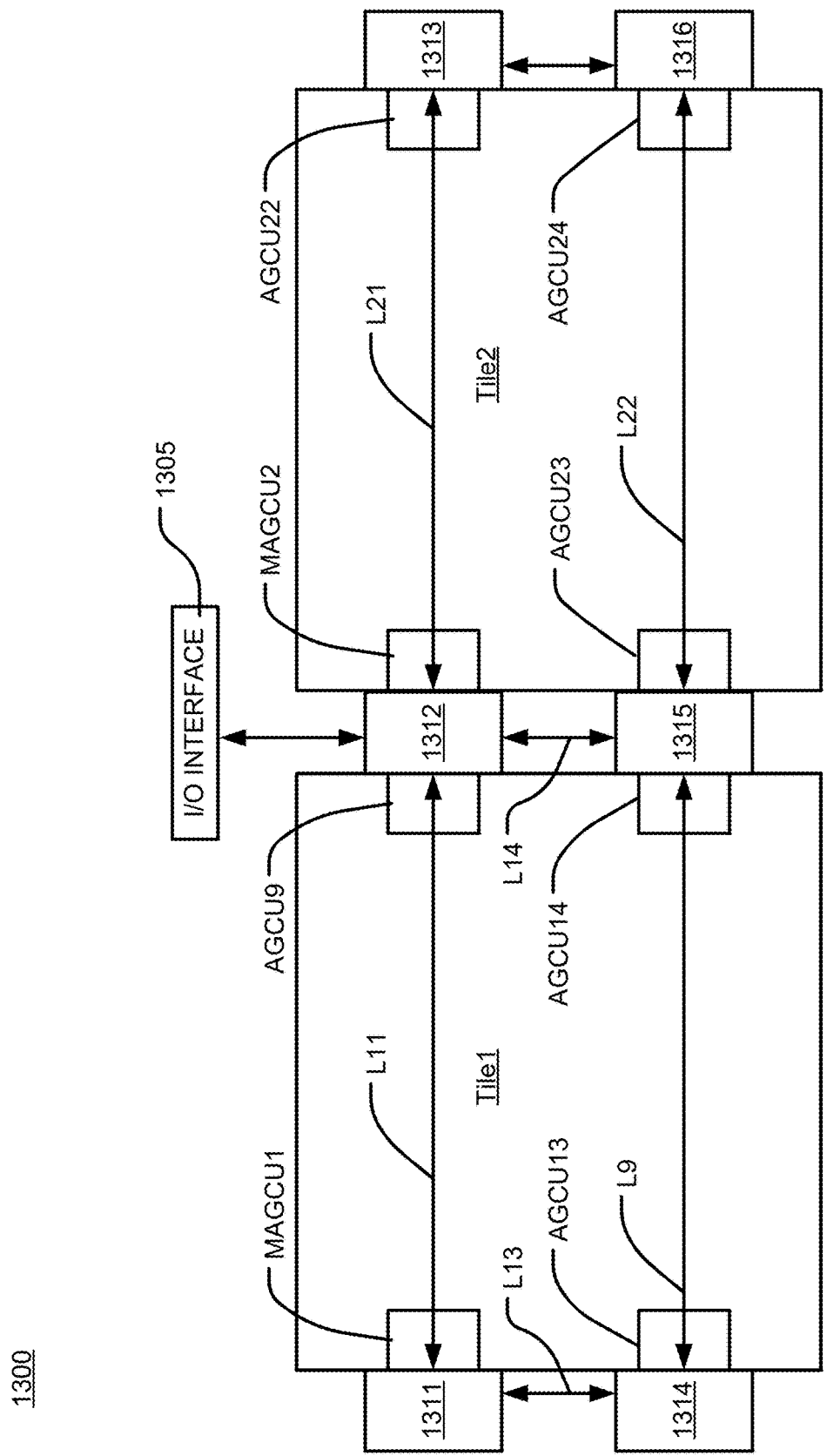
FIG. 13 is a simplified block diagram of components of a CGRA (Coarse-Grained Reconfigurable Architecture) processor.

FIG. 13 is a simplified block diagram 1300 of components of a CGRA (Coarse-Grained Reconfigurable Architecture) processor, such as the data processor 110 of FIG. 1. In this example, the CGRA processor has two tiles (Tile1, Tile2). The tile comprises an array of configurable units connected to a bus system, including array level networks in this example. An array of configurable units the tile includes computation units in hardware or by configuration of reconfigurable components. The bus system includes a top-level network connecting the tiles to external I/O interface 1305 (or any number of interfaces). In other embodiments, different bus system configurations may be utilized. The configurable units in each tile are nodes on the array level network in this embodiment.

Each of the tiles has four AGCUs (Address Generation and Coalescing Units) (e.g., MAGCU1, AGCU9, AGCU13, AGCU14, and MAGCU2, AGCU22, AGCU23, AGCU24). The AGCUs are nodes on the top-level network and nodes on the array level networks and include resources for routing data among nodes on the top-level network and nodes on the array level network in each tile.

Nodes on the top-level network in this example include one or more external I/Os, including interface 1305. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU (MAGCU), which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top-level network and the array level network or networks.

The top-level network is constructed using top-level switches (1311, 1313, 1314, and 1316) connecting to each other as well as to other nodes on the top-level network, including the AGCUs, and I/O interface 2805. The top-level network includes links (e.g., L11, L9, L21, L22) connecting the top-level switches. Data travels in packets between the top-level switches on the links, and from the switches to the nodes on the network connected to the switches. For example, top-level switches 1311 and 1312 are connected by a link L14, top-level switches 1314 and 1315 are connected by a link L9, top-level switches 1311 and 1314 are connected by a link L13, and top-level switches 1312 and 1313 are connected by a link L21. The links can include one or more buses and supporting control lines, including for example a chunk-wide bus (vector bus). For example, the top-level network can include data, request and response channels operable in coordination for transfer of data in a manner analogous to an AXI compatible protocol. See, AMBA® AXI and ACE Protocol Specification, ARM.

Top-level switches can be connected to AGCUs. For example, top-level switches 1311, 1312, 1314, and 1315 are connected to MAGCU1, AGCU9, AGCU13 and AGCU14 in the tile Tile1, respectively. Top-level switches 1312, 1313, 1315, and 1316 are connected to MAGCU2, AGCU22, AGCU23 and AGCU24 in the tile Tile2, respectively.

Top-level switches can be connected to one or more external I/O interfaces (e.g., interface 1305).

Figure 14B:
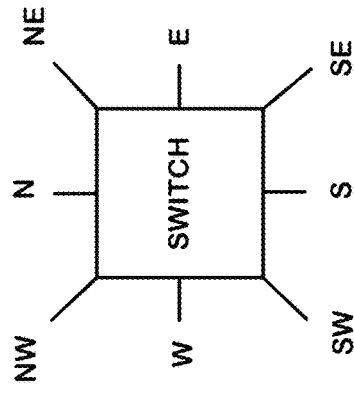
FIG. 14B illustrates an example switch unit connecting elements in an array level network.
Figure 14A:
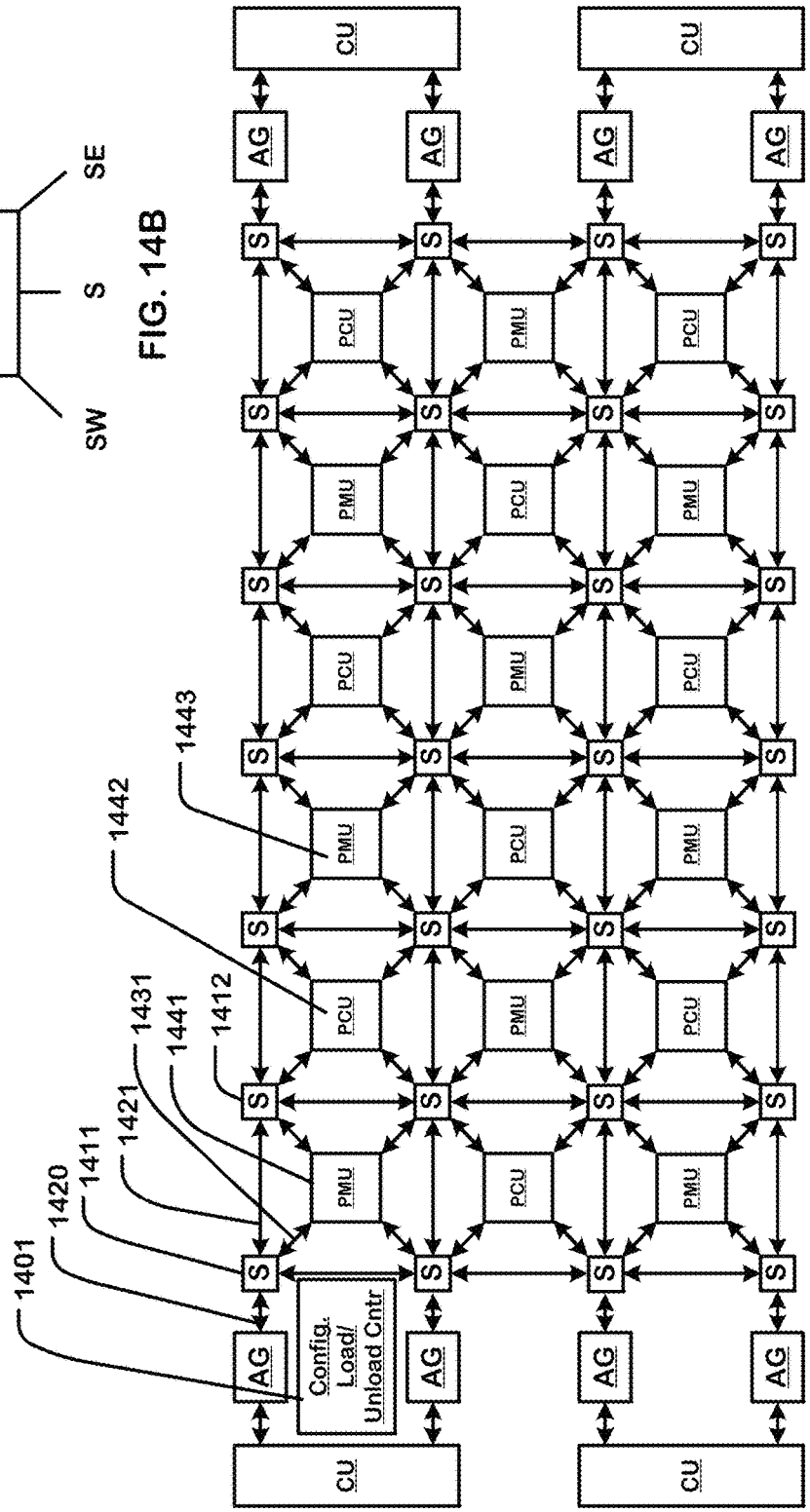
FIG. 14A is a simplified diagram of a tile and an array level network usable in the configuration of FIG. 13, where the configurable units in the array are nodes on the array level network and are configurable to implement the processing graphs and various processing nodes of various sections discussed herein.

FIG. 14A is a simplified diagram of a tile and an array level network usable in the configuration of FIG. 13, where the configurable units in the array are nodes on the array level network and are configurable to implement the processing graphs and various processing nodes of various sections discussed herein.

In this example, the array of configurable units 1400 includes a plurality of types of configurable units, which are to execute the various processing nodes of various sections of processing graphs discussed herein. The types of configurable units in this example, include Pattern Compute Units (PCUs), Pattern Memory Units (PMUs), Switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns," ISCA '17, Jun. 24-28, 2017, Toronto, ON, Canada, which is incorporated by reference as if fully set forth herein. In this example, the PCUs (e.g., 1442) and PMUs (e.g., 1443) in the array of configurable units 1400 can include resources configurable for embodiment of a computation unit, an example configuration of which is described herein. Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration files to configure the configurable units are generated using method 1200 discussed herein. A configuration file in the configuration store contains a bit-stream representing the initial configuration, or starting state, of each of the components that execute the program. This bit-stream is referred to as a bit file.

The array level network includes links interconnecting configurable units in the array. The links in the array level network include one or more and, in this case, three kinds of physical buses: a chunk-level vector bus (e.g., one hundred and twenty-eight bits of data), a word-level scalar bus (e.g., thirty-two bits of data), and a multiple bit-level control bus. For instance, interconnect 1421 between switch units 1411 and 1412 includes a vector bus interconnect with a vector bus width of one hundred and twenty-eight bits, a scalar bus interconnect with a scalar bus width of thirty-two bits, and a control bus interconnect.

The three kinds of physical buses differ in the granularity of data being transferred. In one embodiment, the vector bus can carry a chunk that includes sixteen-bytes (=one hundred and twenty-eight bits) of data as its payload. The scalar bus can have a thirty-two-bit payload and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing thirty-two bits per value and BF16 using sixteen bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/unload controller can generate a header for each chunk of configuration data of one hundred and twenty-eight bits. The header is transmitted on a header bus to each configurable unit in the array of configurable unit.

FIG. 14B illustrates an example switch unit connecting elements in an array level network. As shown in the example of FIG. 14B, a switch unit can have eight interfaces. The North, South, East and West interfaces of a switch unit are used for connections between switch units. The Northeast, Southeast, Northwest and Southwest interfaces of a switch unit are each used to make connections to PCU or PMU instances. A set of two switch units in each tile quadrant have connections to an Address Generation and Coalescing Unit (AGCU) that include multiple Address Generation (AG) units and a Coalescing Unit (CU) connected to the multiple address generation units. The Coalescing Unit (CU) arbitrates between the AGs and processes memory requests. Each of the eight interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 2941 can be sent from the configuration load/unload controller 1401 to the PMU 1441, via a link 1420 between the configuration load/unload controller 1401 and the West (W) vector interface of the switch unit 1411, the switch unit 1411, and a link 1431 between the Southeast (SE) vector interface of the switch unit 1411 and the PMU 1441.

In this example, one of the AGCUs is configured to be a master AGCU, which includes a configuration load/unload controller (e.g., 1401). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus. The commands include a program reset command to reset configurable units in an array of configurable units in a tile, and a program load command to load a configuration file to the configurable units.

Other Implementations

A first example of accelerated deep learning is using a deep learning accelerator to train a neural network. A second example of accelerated deep learning is using a deep learning accelerator to operate a trained neural network to perform inferences. A third example of accelerated deep learning is using a deep learning accelerator to train a neural network and subsequently perform inference with any one or more of the trained neural networks, information from same, and a variant of same.

Examples of neural networks include Fully Connected Neural Networks (FCNNs), Recurrent Neural Networks (RNNs), Convolutional Neural Networks (CNNs), Long Short-Term Memory (LSTM) networks, autoencoders, deep belief networks, and Generative Adversarial Networks (GANs).

An example of training a neural network is determining one or more weights associated with the neural network, such as by hardware acceleration via a deep learning accelerator. An example of making an inference is using a trained neural network to compute results by processing input data based on weights associated with the trained neural network. As used herein, the term 'weight' is an example of a 'parameter' as used in various forms of neural network processing. For example, some neural network learning is directed to determining parameters that are then usable for performing neural network inferences using the parameters.

A neural network processes data according to a dataflow graph comprising layers of neurons. Stimuli (e.g., input data) are received by an input layer of neurons and the computed results of the dataflow graph (e.g., output data) are provided by an output layer of neurons. Example layers of neurons include input layers, output layers, rectified linear unit layers, fully connected layers, recurrent layers, long short-term memory layers, convolutional layers, kernel layers, dropout layers, and pooling layers. A neural network is conditionally and/or selectively trained, subject to hardware acceleration. After being trained, a neural network is conditionally and/or selectively used for inference, subject to hardware acceleration.

An example of a deep learning accelerator is one or more relatively specialized hardware elements operating in conjunction with one or more software elements to train a neural network and/or perform inference with a neural network relatively more efficiently than using relatively less specialized hardware elements. Some implementations of the relatively specialized hardware elements include one or more hardware logic circuitry elements such as transistors, resistors, inductors, capacitors, wire interconnects, combinatorial logic (e.g., NAND, NOR) gates, latches, register files, memory arrays, tags for memory arrays, content-addressable memories, flash, ROM, DRAM, SRAM, Serializer/Deserializer (SerDes), I/O drivers, and the like, such as implemented via custom logic, synthesized logic, ASICs, and/or FPGAs. Some of the relatively less specialized hardware elements include conventional CPUs and conventional GPUs.

An example of storage is one or more elements enabled to retain state information, e.g., any one or more of: a flip-flop, a latch or an array of latches, a register or an array of registers, a register file, a memory, a memory array, a magnetic storage device, an optical storage device, SRAM, DRAM, flash, and ROM. In various embodiments storage is volatile (e.g., SRAM or DRAM) and/or non-volatile (e.g., flash or ROM).

An example of an Integrated Circuit (IC) is a collection of circuitry implemented on one or more portions of semiconductor material, such as a single die or a plurality of dice. An example of 3D-stacking of dice is providing mechanical connectivity and/or electrical connectivity between the dice, e.g., in a dimension orthogonal to a major surface of the dice, to form a unit. The mechanical connectivity and/or the electrical connectivity are variously implemented, e.g., via one or more of solder balls, microbumps, and through-silicon vias. An example of 2.5D stacking of dice is providing mechanical connectivity and/or electrical connectivity between the dice via a common element (e.g., a silicon interposer) to form a unit, wherein the mechanical connectivity and/or electrical connectivity between each die and the common substrate is in a dimension orthogonal to a major surface of the die. The mechanical connectivity and/or the electrical connectivity are variously implemented, e.g., via one or more of solder balls, microbumps, and through-silicon vias. An example of an Application-Specific Integrated Circuit (ASIC) is an IC designed for a particular use.

An example of a package is an element enabled to mechanically retain and/or contain one or more electronic circuits and/or to electrically interconnect one or more electronic circuits. Example electronic circuits are any one or more of one or more portions of semiconductor material, one or more dice, one or more interposers, and one or more substrates. Particular examples of packages include a BGA package and variants thereof. Some ICs comprise a package. An example of a substrate is an element to mechanically retain and/or electrically interconnect one or more dice and/or one or more packages. A particular example of a substrate is a PCB to, e.g., retain and interconnect packages. Another particular example of a substrate is a silicon interposer to, e.g., couple one or more 3D-stacked or 2.5-stacked dice. Another particular example of a substrate is a package, e.g., retaining a plurality of dice.

A SmartNIC is a network interface card, or network adapter that operates directly on data packets independent of host kernel resources and running an operating system networking stack resulting in less contention for the host processing resources, less network latency, and increases in network data packet throughput. The SmartNIC accomplishes this by offloading network stack processing tasks from the system host CPU, acting as a coprocessor of sorts.

In the present context, a SmartNIC is a NIC equipped with a fully programmable hardware implementation, supporting an operating system configured for network processing tasks. The hardware implementation may comprise System-on-Chip (SoC), FPGAs, ASICs, CGRAs, or other programmable processor circuits such as the ARM family. A SmartNIC may support sets of specialized hardware functionalities accelerates a specific class of functions (e.g., Open vSwitch data-plane) or to perform generic packet and flow-filtering, packet inspection, flow table processing, encryption, RDMA, VXLAN overlays and NVMe-oF functionality.

A SmartNIC includes a host kernel-bypass logic for sending and receiving packets to/from nodes and additional hosts. The SmartNIC may accomplish this by providing a set of physical addresses comprising a shared memory for inputs and outputs. In one aspect, the reprogrammable processor may directly access sets of SmartNIC FIFO buffers using a combination of head and tail pointers as described supra to push and pull data, thus bypassing the host kernel and reducing at least one hop. A host may also interface directly to the SmartNIC by writing to a physical address without requiring drivers to control the network flow, further increasing theoretical throughput.

In one aspect, the SmartNIC may provide a configuration interface to specify the physical addresses of a plurality of I/O shared memory buffers comprising FIFO queues and mapping tables for memory regions containing packet buffers. In an additional aspect, the SmartNIC may couple nodes, reprogrammable processors (RPs) and hosts to retrieve packet buffers from shared memory buffers and to transmit packet buffers from host, node, or RP DRAM to the SmartNIC shared memory buffers over a network.

The network fabric is an interface to a plurality of nodes and hosts. The SmartNIC provides connectivity between either a host and the network or between a node and the network. A node comprises a plurality of reprogrammable processors (RPs) and bypasses the host when interfacing to the SmartNIC. A SmartNIC may connect to a first physical/link connection over the network, coupling the SmartNIC with a host, node, or RP. The SmartNIC connects to a second physical/link connection, coupling the SmartNIC to the network. The physical/link connections to the network fabric interface may each be of any type, for instance, Ethernet, Fibre Channel, InfiniBand, PCIe, etc. A physical/link connection may also be a wireless medium. A SmartNIC includes Media Access Controllers (MACs) to interface with the physical/link connections to route data packets to the RPs and hosts.

An example SmartNIC may use an FPGA to implement the communications protocols, e.g., Transport Control Protocol ("TCP"), used to perform internet routing and may comprise PCIe high-speed network interfaces, shared physical memory and an FPGA. The FPGA may implement the SmartNIC controller as the bridge between a host, node, RP, and the network at the "physical layer" to integrate directly into the data path. The SmartNIC may further implement the Open System Interconnection ("OSI") model, which is a conceptual model that characterizes and standardizes the internal functions of a communication system by partitioning it into abstraction layers. A physical abstraction layer defines electrical and physical specifications between a device and a transmission medium, such as a copper or fiber optical cable. This includes the layout of pins, voltages, line impedance, cable specifications, signal timing, hubs, repeaters, network adapters, host bus adapters and more. The major functions and services performed by the physical layer include: (1) establishment and termination of a connection to a communications medium; (2) contention resolution; (3) flow control; and (4) modulation to convert digital data in user equipment to the corresponding signals transmitted over a communications channel. These are the signals operating over the physical cabling (such as copper and optical fiber) or over a radio link.

The network flows can be Transmission Control Protocol/Internet Protocol (TCP/IP) flows, for example. The SmartNICs may exchange network packets with the nodes or hosts via a network/fabric comprising media/physical links and can exchange network packets with their respective nodes or hosts via host-facing media/physical links to the host NICs. Network flows used by applications to exchange data may pass through the SmartNIC as follows. A host-based application may have application-layer data to convey, for instance, a remote call invocation. The host remote call invocation may comprise a command or data for passing through an operating system Application Programming Interface (API) (e.g., a stream or socket) as a write to a physical address on the SmartNIC where it enters the network stack, The API writes the command or data into the physical address of the shared memory FIFO and placed in one or more transport packets (e.g., TCP/IP packets). Next, encapsulation of transport packets to network packets (e.g., TCP/IP packets with the host's Internet Protocol (IP) address as the sender). and then loaded into one or more payloads of physical layer frames (e.g., Ethernet frames). The frames then pass through to the first physical/link connection of the network fabric. On a second SmartNIC, the above process is reversed where the network packets require decapsulation and data eventually arrives at a physical address for the host, node, or RP.

The applications execute on the reconfigurable processors in a distributed fashion by programming the individual compute and memory components and may asynchronously receive, process, and send data and control information. In the reconfigurable processors, computation may execute as deep, nested dataflow pipelines that exploit nested parallelism and data locality efficiently. These dataflow pipelines contain several stages of computation, where each stage reads data from one or more input buffers with an irregular memory access pattern, performs computations on the data while using one or more internal buffers to store and retrieve intermediate results, and produces outputs that are written to one or more output buffers. The structure of these pipelines depends on the control and dataflow graph representing the application. Pipelines may arbitrarily nest and loop within each other.

The applications comprise high-level programs. A high-level program is source code written in programming languages like C, C++, Java, JavaScript, Python, and Spatial, for example, using deep learning frameworks like PyTorch, TensorFlow, ONNX, Caffe, and Keras. The high-level program can implement computing structures and algorithms of machine learning models like AlexNet, VGGNet, GoogLeNet, ResNet, ResNeXt, RCNN, YOLO, SqueezeNet, SegNet, GAN, BERT, ELMo, USE, Transformer, and Transformer-XL. In one example, the high-level program can implement a convolutional neural network with several processing layers, such that each processing layer can include one or more nested loops. The high-level program can execute irregular memory operations that involve accessing inputs and weights and performing matrix multiplications between the inputs and the weights. The high-level program can include nested loops with high iteration count and loop bodies that load and multiply input values from a preceding processing layer with weights of a succeeding processing layer to produce an output for the succeeding processing layer. The high-level program can have loop-level parallelism of the outermost loop body, which can be exploited using coarse-grained pipelining. The high-level program can have instruction-level parallelism of the innermost loop body, which can be exploited using loop unrolling, SIMD vectorization, and pipelining.

Regarding loops in the high-level programs of the applications, loops directly nested in a loop body are termed the child loops of the outer parent loop. A loop is called an innermost loop if it does not have any children, i.e., there are no nested loops within its body. A loop is an outermost loop if it does not have a parent, i.e., it is not nested within another loop's body. An imperfectly nested loop has a body with a mix of non-looping statements (e.g., primitive arithmetic, logical, and relational operations) and one or more child loops. Parallelism in the imperfectly nested loops can be exploited at any or all loop levels, and in the operations that comprise loop bodies. Parallelism can occur in multiple forms such as fine-grained and coarse-grained pipeline parallelism, data parallelism, and task parallelism.

In some implementations, a Software Development Kit (SDK) (or dataflow graph generator) generates dataflow graphs of the high-level programs of the applications. The SDK transforms the input behavioral description of the high-level programs into an intermediate representation such as the dataflow graphs. This may include code optimization steps like false data dependency elimination, dead-code elimination, and constant folding. The dataflow graphs encode the data and control dependencies of the high-level programs.

The dataflow graphs comprise nodes and edges. The nodes can represent compute operations and memory allocations. The edges can represent data flow and control flow. In some implementations, each loop in the high-level programs can be represented as a controller in the dataflow graphs. The dataflow graphs support branches, loops, function calls, and other variations of control dependencies. In some implementations, after the dataflow graphs are generated, additional analyses or optimizations focused on loop transformations can be performed, such as loop unrolling, loop pipelining, loop fission/fusion, and loop tiling.

The SDK also supports programming the reconfigurable processors in the pool of reconfigurable dataflow resources at multiple levels, for example, from the high-level deep learning frameworks to C++ and assembly language. In some implementations, the SDK allows programmers to develop code that runs directly on the reconfigurable processors. In other implementations, the SDK provides libraries that contain pre-defined functions like linear algebra operations, element-wise tensor operations, non-linearities, and reductions required for creating, executing, and profiling the dataflow graphs on the reconfigurable processors. The SDK communicates with the deep learning frameworks via Application Programming Interfaces (APIs).

The nodes in a dataflow graph represent operation units may configure to be producers to produce tensors for execution of an application, and to be consumers to consume the tensors for execution of the application. The producers and consumers asynchronously transmit data along data connections. A tensor includes one or more vectors.

A "compiler" transforms the dataflow graphs into a hardware-specific configuration, and specifies the configuration in an execution file generated by the compiler 106. In one implementation, the compiler partitions the dataflow graphs into memory allocations and execution fragments, where these partitions are specified in the execution file. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as needed by the program. Different ones of the execution fragments can contain different amounts of computation. Execution fragments can represent parallel patterns or portions of parallel patterns and are executable asynchronously.

In some implementations, the partitioning of the dataflow graphs into the execution fragments includes treating calculations within at least one innermost loop of a nested loop of the dataflow graphs as a separate execution fragment. In other implementations, the partitioning of the dataflow graphs into the execution fragments includes treating calculations of an outer loop around the innermost loop of the dataflow graphs as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data required to implement the dataflow graphs, and these memory allocations are specified in the execution file. Memory allocations define the type and the number of hardware resources (functional units, storage, or connectivity components). Main memory (e.g., DRAM) is off-chip memory for providing memory allocations. Scratchpad memory (e.g., SRAM) is on-chip memory for providing memory allocations. Other memory types for which the memory allocations can be made for various access patterns and layouts include read-only Look-Up Tables (LUTs), fixed size queues (e.g., FIFOs), and register files.

The compiler binds memory allocations to virtual memory units and binds execution fragments to virtual compute units, and these bindings are specified in the execution file. In some implementations, the compiler partitions execution fragments into memory fragments and compute fragments, and these partitions are specified in the execution file. A memory fragment comprises address calculations leading up to a memory access. A compute fragment comprises all other operations in the parent execution fragment. In one implementation, each execution fragment is broken up into a plurality of memory fragments and exactly one compute fragment. In one implementation, the compiler performs the partitioning using reverse dataflow analysis such that inputs to an address used in a memory access recursively flag until the compiler reaches either constant values or (bound) loop/pattern iterators. A single execution fragment can produce one or more memory fragments, depending on how many memory accesses exist in the original loop body. In cases where the same memory addressing logic is shared across multiple memory accesses, address calculation may be duplicated to create multiple memory fragments from the same execution fragment.

The memory fragments of the execution fragments are configured to index into data structures. At least one of the memory fragments indexes into a data structure in the logical memory spaces of one of the memory allocations. Each compute and memory fragment preserves information about all loops whose loop bodies directly contain the operations in the corresponding execution fragment. In one implementation, this corresponds to replicating the calculation of the loop iterators of each loop into each compute and memory fragment. This replication allows each fragment to preserve the same iterative behavior as the original program, while also allowing distributed calculation of loop iterators.

The compiler translates the applications developed with commonly used open-source packages such as Keras and PyTorch into reconfigurable processor specifications. The compiler generates the configuration files with configuration data for the placed positions and the routed data and control networks. In one implementation, this includes assigning coordinates and communication resources of the physical memory and compute units by placing and routing units onto the array of the processor while maximizing bandwidth and minimizing latency.

Clauses

A technology is described which uses buffers to efficiently stream data between processors on a same processing node and on different processing nodes, which can be particularly applied to processors such as Central Processing Unit (CPUs), Graphics Processing Units (GPUs), Field Programmable Gate Arrays (FPGAs), Coarse-Grained Reconfigurable Architectures (CGRAs), Application-Specific Integrated Circuits (ASICs), Application Specific Instruction-set Processor (ASIP), and Digital Signal Processors (DSPs). The technology disclosed implements efficient distributed computing by allowing accelerators (e.g., reconfigurable processors) attached to separate hosts to directly communicate with each other via buffers.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

Clause Set 1 (Tiling Configuration Calculation in Reverse Order and Adaptive Tiling)

1A. A data processing system, comprising:
compile time logic configured to
section a graph into a sequence of sections,
configure each section of the sequence of sections such that an input layer of a section processes an input, one or more intermediate layers of the corresponding section processes corresponding one or more intermediate outputs, and a final layer of the corresponding section generates a final output,
wherein the final output has a non-overlapping final tiling configuration, the one or more intermediate outputs have corresponding one or more overlapping intermediate tiling configurations, and the input has an overlapping input tiling configuration,
determine the various tiling configurations by starting from the final layer and reverse traversing through the one or more intermediate layers, and ending with the input layer.

2A. The data processing system of claim 1, wherein to determine the various tiling configurations, the compile time logic is to:
determine the non-overlapping final tiling configuration of the final output;
based on the non-overlapping final tiling configuration of the final output, determine the one or more overlapping intermediate tiling configurations of the one or more intermediate outputs; and
based on the one or more overlapping intermediate tiling configurations of the one or more intermediate outputs, determine the overlapping input tiling configuration of the input.

3A. The data processing system of claim 1, wherein the compile time logic is to determine the non-overlapping final tiling configuration of the final output, based on one or more of (i) a size of the input, (ii) a size of the final output, (iii) a number of layers in the corresponding section, and/or (iv) respective processing logics implemented by respective layers in the corresponding section.

4A. The data processing system of claim 1, wherein the compile time logic is to determine the various tiling configurations of a first section independent of determining various tiling configurations of an adjacent second section.

5A. The data processing system of claim 1, wherein an overlapping intermediate tiling configuration of an intermediate output indicates a size of individual intermediate tiles of a plurality of intermediate tiles in the intermediate output, and an amount of overlap between neighboring intermediate tiles in the plurality of intermediate tiles.

6A. The data processing system of claim 1, wherein the overlapping input tiling configuration of the input indicates a size of individual input tiles of a plurality of input tiles in the input, and an amount of overlap between neighboring input tiles in the plurality of input tiles.

7A. The data processing system of claim 1, wherein the non-overlapping final tiling configuration of the final output indicates a size of individual final output tiles of a plurality of final output tiles in the final output.

1. A data processing system, comprising:
compile time logic configured to
section a graph into a sequence of sections, the sequence of sections including at least a first section and a second section,
configure the first section with a first topology of tiling configurations in which to tile inputs, intermediate outputs, and final outputs of the first section, and
configure the second section with a second topology of tiling configurations in which to tile inputs, intermediate outputs, and final outputs of the second section,
wherein the first topology of tiling configurations is different from the second
topology of tiling configurations; and
runtime logic configured with the compile time logic to
execute the first section to generate the inputs, intermediate outputs, and final outputs of the first section in the first topology of tiling configurations, and
execute the second section to generate the inputs, intermediate outputs, and final outputs of the second section in the second topology of tiling configurations.

2. The data processing system of claim 1, wherein the first topology of tiling configurations is determined based on a number of processing nodes in the first section.

3. The data processing system of claim 1, wherein the first topology of tiling configurations is determined based on respective processing logics implemented by respective processing nodes in the first section.

4. The data processing system of claim 1, wherein the first topology of tiling configurations is determined based on a size of the inputs of the first section.

5. The data processing system of claim 1, wherein the first topology of tiling configurations is determined based on a size of the final outputs of the first section.

6. The data processing system of claim 1, wherein the second topology of tiling configurations is determined based on a number of processing nodes in the second section.

7. The data processing system of claim 1, wherein the second topology of tiling configurations is determined based on respective processing logics implemented by respective processing nodes in the second section.

8. The data processing system of claim 1, wherein the second topology of tiling configurations is determined based on a size of the inputs of the second section.

9. The data processing system of claim 1, wherein the second topology of tiling configurations is determined based on a size of the final outputs of the second section.

10. The data processing system of claim 1, wherein the sequence of sections includes at least a third section,
wherein the compile time logic is further configured to
configure the third section with a third topology of tiling configurations in which to tile inputs, intermediate outputs, and final outputs of the third section,
wherein the third topology of tiling configurations is different from the first topology of tiling configurations and the second topology of tiling configurations; and
wherein the runtime logic is further configured to
execute the third section to generate the inputs, intermediate outputs, and final outputs of the third section in the third topology of tiling configurations.

11. The data processing system of claim 1, wherein the third topology of tiling configurations is determined based on a number of processing nodes in the third section.

12. The data processing system of claim 1, wherein the third topology of tiling configurations is determined based on respective processing logics implemented by respective processing nodes in the third section.

13. The data processing system of claim 1, wherein the third topology of tiling configurations is determined based on a size of the inputs of the third section.

14. The data processing system of claim 1, wherein the third topology of tiling configurations is determined based on a size of the final outputs of the third section.

15. The data processing system of claim 1, wherein the first topology of tiling configurations includes respective tiling configurations for the inputs, intermediate outputs, and final outputs of the first section.

16. The data processing system of claim 1, wherein the second topology of tiling configurations includes respective tiling configurations for the inputs, intermediate outputs, and final outputs of the second section.

17. The data processing system of claim 1, wherein the third topology of tiling configurations includes respective tiling configurations for the inputs, intermediate outputs, and final outputs of the third section.

18. The data processing system of claim 1, wherein the graph is a convolutional neural network, sections in the sequence of sections are forward pass subgraphs, wherein the sections are backward pass subgraphs, wherein the inputs, intermediate outputs, and final outputs of the first section are image data, wherein the inputs, intermediate outputs, and final outputs of the second section are image data.

18A. The data processing system of claim 1, wherein the graph is a convolutional neural network, wherein sections in the sequence of sections are backward pass subgraphs, wherein the inputs, intermediate outputs, and final outputs of the first section are input gradients, and wherein the inputs, intermediate outputs, and final outputs of the second section are input gradients.

19. A data processing system, comprising:
compile time logic configured to
section a graph into a sequence of sections, the sequence of sections including a first section followed by a second section,
configure the first section to generate a first output in a first target configuration in response to processing an input in a first input configuration, and
configure the second section to generate a second output in a second target configuration in response to processing the first output in a second input configuration,
wherein the first target configuration is different from the second target configuration; and
runtime logic configured with the compile time logic to
execute the configured first section and the configured second section.

20. The data processing system of claim 19, wherein the first target configuration tiles the first output into a first set of non-overlapping tiles, wherein the first input configuration tiles the input into a first set of input overlapping tiles, and wherein the first set of non-overlapping tiles is generated by using tiles in the first set of input overlapping tiles as effective receptive fields.

21. The data processing system of claim 20, wherein the compile time logic is further configured to reverse traverse the first section to determine the first input configuration as the effective receptive fields of tiles in the first set of non-overlapping tiles that satisfy the first target configuration.

22. The data processing system of claim 21, wherein the first target configuration is determined based on a number of processing nodes in the first section.

23. The data processing system of claim 22, wherein the first target configuration is determined based on respective processing logics implemented by respective processing nodes in the first section.

24. The data processing system of claim 23, wherein the first target configuration is determined based on a size of the input.

25. The data processing system of claim 24, wherein the first target configuration is determined based on a size of the first output.

26. The data processing system of claim 19, wherein the compile time logic is further configured to configure the first section to generate the first output in the first target configuration in response to processing the input in the first input configuration and a first intermediate output in a first intermediate configuration.

27. The data processing system of claim 26, wherein the first intermediate configuration tiles the first intermediate output into a first set of intermediate overlapping tiles, wherein the first set of intermediate overlapping tiles is generated by using the tiles in the first set of input overlapping tiles as effective receptive fields, and wherein the first set of non-overlapping tiles is generated by using tiles in the first set of intermediate overlapping tiles as effective receptive fields.

28. The data processing system of claim 27, wherein the compile time logic is further configured to reverse traverse the first section to determine the first intermediate configuration as the effective receptive fields of the tiles in the first set of non-overlapping tiles that satisfy the first target configuration.

29. The data processing system of claim 28, wherein the compile time logic is further configured to configure the first section to pad the input in a first input padding configuration, wherein the first input padding configuration cumulatively pads the input into a first padded input and leaves the first intermediate representation unpadded.

30. The data processing system of claim 19, wherein the second target configuration tiles the second output into a second set of non-overlapping tiles, wherein the second input configuration tiles the first output into a second set of input overlapping tiles, and wherein the second set of non-overlapping tiles is generated by using tiles in the second set of input overlapping tiles as effective receptive fields.

31. The data processing system of claim 30, wherein the compile time logic is further configured to reverse traverse the second section to determine the second input configuration as the effective receptive fields of tiles in the second set of non-overlapping tiles that satisfy the second target configuration.

32. The data processing system of claim 31, wherein the second target configuration is determined based on a number of processing nodes in the second section.

33. The data processing system of claim 32, wherein the second target configuration is determined based on respective processing logics implemented by respective processing nodes in the second section.

34. The data processing system of claim 33, wherein the second target configuration is determined based on a size of the second set of input overlapping tiles.

35. The data processing system of claim 35, wherein the second target configuration is determined based on a size of the second output.

36. The data processing system of claim 19, wherein the compile time logic is further configured to configure the second section to generate the second output in the second target configuration in response to processing the first output in the second input configuration and a second intermediate output in a second intermediate configuration.

37. The data processing system of claim 36, wherein the second intermediate configuration tiles the second intermediate output into a second set of intermediate overlapping tiles, wherein the second set of intermediate overlapping tiles is generated by using the tiles in the second set of input overlapping tiles as effective receptive fields, and wherein the second set of non-overlapping tiles is generated by using tiles in the second set of intermediate overlapping tiles as effective receptive fields.

38. The data processing system of claim 37, wherein the compile time logic is further configured to reverse traverse the second section to determine the second intermediate configuration as the effective receptive fields of the tiles in the second set of non-overlapping tiles that satisfy the second target configuration.

39. The data processing system of claim 38, wherein the compile time logic is further configured to configure the second section to pad the second set of input overlapping tiles in a second input padding configuration, wherein the second input padding configuration cumulatively pads the second set of input overlapping tiles into a second padded input and leaves the second intermediate representation unpadded, and wherein cumulative padding in the second padded input compensates for no padding in the second intermediate representation.

40. The data processing system of claim 19, wherein sections in the sequence of sections are subgraphs.

41. The data processing system of claim 1, wherein the graph is a convolutional neural network, sections in the sequence of sections are forward pass subgraphs, wherein the first output, the input, and the second output are image data.

42. The data processing system of claim 1, wherein the graph is a convolutional neural network, wherein the sections are backward pass subgraphs, wherein the first output, the input, and the second output are input gradients.

43. A method comprising:
sectioning a graph into a sequence of sections, the sequence of sections including at least a first section followed by a second section;
configuring the first section to generate a first output in a first target tiling configuration in response to processing a first input in a first input tiling configuration; and
configuring the graph to reconfigure the first output in the first target tiling configuration to a second input in a second input tiling configuration; and
configuring the second section to generate a second output in a second target tiling configuration in response to processing the second input in the second input tiling configuration.

44. The method of claim 43, further comprising:
executing the configured first section and the configured second section.

45. The method of claim 43, wherein the first target tiling configuration tiles the first output into a first set of non-overlapping tiles, wherein the first input tiling configuration tiles the first input into a first set of input overlapping tiles, and wherein the first set of non-overlapping tiles is generated by using tiles in the first set of input overlapping tiles as effective receptive fields.

Clause Set 2 (Resetting Overlap Factor to Zero at Section Boundaries)

1. A data processing system configured to receive a graph that includes a sequence of layers, wherein the sequence of layers starts with an input layer and ends with an output layer and includes intermediate layers between the input layer and the output layer, wherein one or more layers in the sequence of layers is configured to generate tiles with overlapping regions, comprising:

compile time logic configured to reconfigure the graph and generate a reconfigured graph,
wherein the reconfigured graph is partitioned into a sequence of subgraphs,
wherein each subgraph in the sequence of subgraphs includes a sub-sequence of layers in the sequence of layers,
wherein respective subgraphs in the sequence of subgraphs are configured with respective tiling configurations, and
wherein the subgraphs are configured to reset overlapping of tiles to zero at each subgraph output; and
runtime logic configured with the compile time logic to execute the reconfigured graph.

2. The data processing system of claim 1, further configured to compose non-overlapping output tiles generated by a preceding subgraph in the sequence of subgraphs and generate a composed input for a succeeding subgraph, wherein each output tile in the non-overlapping output tiles has a first tile size, and wherein the composed input is stored in memory.

3. The data processing system of claim 2, further configured to provide overlapping input tiles from the composed input to the successive graph in the sequence of subgraphs that succeeds the preceding subgraph, wherein each input tile in the overlapping input tiles has a second tile size that is different from the first tile size.

4. The data processing system of claim 2, wherein the non-overlapping output tiles are image data.

5. The data processing system of claim 2, wherein the non-overlapping output tiles are input gradients.

6. The data processing system of claim 2, wherein the non-overlapping output tiles are weight gradients.

7. The data processing system of claim 1, wherein the graph is a convolutional neural network.

8. The data processing system of claim 1, wherein layers in the sequence of layers include convolution layers, max pooling layers, min pooling layers, average pooling layers, non-linearity layers, normalization layers, dropout layers, concatenation layers, transpose convolution layers, fully connected layers, softmax layers, and/or loss layers.

9. The data processing system of claim 1, wherein the subgraphs are forward pass graphs.

10. The data processing system of claim 1, wherein the subgraphs are backward pass graphs.

11. The data processing system of claim 1, wherein respective subgraphs in the sequence of subgraphs are configured with respective tiling configurations to decouple the tiling dependencies between successive subgraphs in the sequence of subgraphs and to confine the tiling dependencies to successive layers within the subgraphs.

12. A method comprising:
compiling a processing graph to generate a reconfigured graph, the reconfigured graph comprising a plurality of sequential sections,
wherein each section comprises (i) an input layer, (ii) an output layer, and (iii) one or more intermediate layers between the input and output layers,
wherein for each section, an input tensor to the input layer has overlapping tiles, an output tensor output by the output layer has non-overlapping tiles, and at least one intermediate tensor output by at least one of the intermediate layers has overlapping tiles; and
executing the reconfigured graph in a reconfigurable processor.

13. The method of claim 12, wherein for at least one section, at least another intermediate tensor output by at least another of the intermediate layers has non-overlapping tiles.

14. The method of claim 12, further comprising:
compiling the processing graph such that in the reconfigured graph, an output tensor of a preceding section comprising non-overlapping tiles is recomposed into an input tensor of a succeeding section comprising overlapping tiles.

15. The method of claim 12, wherein the non-overlapping output tiles are image data.

16. The method of claim 12, wherein the non-overlapping output tiles are input gradients.

17. The method of claim 12, wherein the non-overlapping output tiles are weight gradients.

18. The method of claim 12, wherein the processing graph is a convolutional neural network.

19. The method of claim 12, wherein individual layers in individual sections include convolution layers, max pooling layers, min pooling layers, average pooling layers, non-linearity layers, normalization layers, dropout layers, concatenation layers, transpose convolution layers, fully connected layers, softmax layers, and/or loss layers.

20. The method of claim 12, wherein the sections are forward pass sections.

21. The method of claim 12, wherein the sections are backward pass sections.

Clause Set 3 (Data Flow Logic)

1. A data processing system, comprising:
a host processor operatively coupled to host memory;
one or more reconfigurable processors, operatively coupled to processor memory and the host processor, configured to execute a sequence of subgraphs of a graph,
wherein successive subgraphs in the sequence of subgraphs include a preceding subgraph and a succeeding subgraph,
wherein the preceding subgraph generates outputs that contribute to inputs processed by the succeeding subgraph; and
data flow logic, operatively coupled to the reconfigurable processors and the processor memory, configured to
store tiled outputs of the preceding subgraph as a composed input in the processor memory, and
make available parts of the composed input for processing by the succeeding subgraph.

2. The data processing system of claim 1, wherein the tiled outputs have a first tiling configuration, wherein the parts have a second tiling configuration, and wherein the first tiling configuration is different from the second tiling configuration.

3. The data processing system of claim 2, wherein the first tiling configuration configures tiles in the tiled outputs to be non-overlapping.

4. The data processing system of claim 3, wherein the second tiling configuration configures the parts to be overlapping.

5. The data processing system of claim 1, wherein the composed input includes padding.

6. The data processing system of claim 5, wherein only those edges of the parts are padded that coincide with padded edges of the composed input.

7. The data processing system of claim 1, wherein the graph is a convolutional neural network, wherein the subgraphs are forward pass subgraphs, wherein the subgraphs are backward pass subgraphs, wherein the outputs, the inputs, the tiled outputs, and the composed input are feature maps, wherein the outputs, the inputs, the tiled outputs, and the composed input are input gradients.

8. A data processing system, comprising:
runtime logic configured to
pad a first input into a first padded input, read a first set of input tiles from the first padded input in a first input tiling configuration, process the first set of input tiles through a first section of a graph to generate a first set of output tiles in a first target tiling configuration, and pad the first set of output tiles to generate first set of padded output tiles; and
arrange tiles in the first set of padded output tiles into a second input, read a second set of input tiles from the second input in a second input tiling configuration, and process the second set of input tiles through a second section of the graph to generate a second set of output tiles in a second target tiling configuration, and
wherein the first target tiling configuration is different from the second input tiling configuration.

9. The data processor of claim 8, wherein the runtime logic is further configured to:
pad the second set of output tiles to generate second set of padded output tiles; and
arrange tiles in the second set of padded output tiles into a third input, read a third set of input tiles from the third input in a third input tiling configuration, and process the third set of input tiles through a third section of the graph to generate a third set of output tiles in a third target tiling configuration that is different from the first target tiling configuration and/or the second input tiling configuration.

10. A data processing system, comprising:
data flow logic configured to
write an input to memory;
read a first set of overlapping tiles from the input, wherein the first set of overlapping tiles is processed to generate a first set of non-overlapping tiles;
write a composed input in the memory, wherein the composed input is constructed by composing non-overlapping tiles in the first set of non-overlapping tiles; and
read a second set of overlapping tiles from the composed input, wherein the second set of overlapping tiles is processed to generate a second set of non-overlapping tiles.

11. A data processing system, comprising:
data flow logic configured to
write an input in memory, wherein all edges of the input are padded; and
read a first set of tiles from the input, wherein tiles in the first set of tiles have padding on only those edges that coincide with padded edges of the input.

12. A data processing system, comprising:
data flow logic configured to
write a composed input in memory, wherein the composed input is constructed by composing tiles in a first of set of tiles, wherein the tiles in the first of set of tiles have a first tiling configuration; and
read a second set of tiles from the composed input, wherein tiles in the second set of tiles have a second tiling configuration, and
wherein the first tiling configuration is different from the second tiling configuration.

13. The data processing system of claim 12, wherein the first tiling configuration configures each of the tiles in the first of set of tiles to be non-overlapping and to have a first tile size.

14. The data processing system of claim 12, wherein the second tiling configuration configures each of the tiles in the second set of tiles to be overlapping and to have a second tile size.

15. A data processing system, comprising:
runtime logic configured to
cause a first section of a graph to generate a first plurality of tiles of a tensor, wherein a combination of the first plurality of tiles has a first size;
initialize a memory area having a second size to zeros, where the second size is larger than the first size;
write the first plurality of tiles in the zero-initialized memory area, such that a zero padding is formed around edges of the first plurality of tiles written to the zero-initialized memory area, wherein a total width of the zero padding is based on a width difference between the second and first sizes;
subsequent to writing the first plurality of tiles, retile the combination of the first plurality of tiles and the zero padding, to generate a second plurality of tiles; and
cause a second section of the graph to process the second plurality of tiles.

16. The data processing system of claim 15, wherein the first plurality of tiles comprises a plurality of non-overlapping tiles.

17. The data processing system of claim 15, wherein the second plurality of tiles comprises a plurality of overlapping tiles.

18. The data processing system of claim 15, wherein a tile size of each tile of the second plurality of tiles is larger than a tiles size of each tile of the first plurality of tiles.

19. The data processing system of claim 15, wherein:
the tensor comprising the first plurality of tiles is a first tensor;
the second plurality of tiles form a second tensor that is larger in size than the first tensor.

20. The data processing system of claim 15, wherein the runtime logic is configured to write the first plurality of tiles in the zero-initialized memory area by serially writing individual tiles of the first plurality of tiles in the zero-initialized memory area.

Clause Set 4 (Section Boundaries)
1. A data processing system, comprising:
compile time logic configured to
section a graph into a sequence of sections, the sequence of sections including at least a first section and a second section,
configure the first section to generate a first set of output tiles in a first target tiling configuration in response to processing a first set of input tiles in a first input tiling configuration, and
configure the second section to generate a second set of output tiles in a second target tiling configuration in response to processing the first set of output tiles in a second input tiling configuration,
wherein the first target tiling configuration is different from the second input tiling configuration; and runtime logic configured with the compile time logic to
pad a first input into a first padded input, read the first set of input tiles from the first padded input in the first input tiling configuration, and process the first set of input tiles through the first section to generate the first set of output tiles in the first target tiling configuration, and arrange tiles in the first set of output tiles into a second padded input, read a second set of input tiles from the second padded input in the second input tiling configuration, and process the second set of input tiles through the second section to generate the second set of output tiles in the second target tiling configuration.

2. The data processing system of claim 1, wherein the first input tiling configuration configures each of the tiles in the first set of input tiles to be overlapping and to have a first tile size.

3. The data processing system of claim 2, wherein the first target tiling configuration configures each of the tiles in the first set of output tiles to be non-overlapping and to have a second tile size.

4. The data processing system of claim 1, wherein the second input tiling configuration configures each of the tiles in the first set of output tiles to be overlapping.

5. The data processing system of claim 1, wherein the second target tiling configuration configures each of the tiles in the second set of output tiles to be non-overlapping.

6. The data processing system of claim 1, wherein the first input tiling configuration configures tiles in the first set of input tiles to have padding on only those edges that coincide with edges of the first padded input.

7. The data processing system of claim 1, wherein the second input tiling configuration configures tiles in the second set of input tiles to have padding on only those edges that coincide with edges of the second padded input.

8. The data processing system of claim 1, further comprising:
data flow logic,
wherein to arrange tiles in the first set of output tiles into the second padded input, the runtime logic is configured to:
cause the data flow logic to write the first set of output tiles, with padding around a periphery of the first set of output tiles, and
rearrange the first set of output tiles and the padding to generate the second padded input.

9. The data processing system of claim 1, wherein to arrange tiles in the first set of output tiles into the second padded input, the runtime logic is configured to:
initialize an area of a memory with zeros, wherein the area of the memory has (i) a first section and (ii) a second section around the first section;
cause a data flow logic of the data processing system to write the first set of output tiles in the first section of the zero-initialized memory, such that the zeros in the second section form a zero-padding around the first section in which the first set of output tiles are written; and
retile the combination of the first set of output tiles in the first section and the zeros in the second section, to generate the second set of input tiles of the second padded input.

9A. The data processing system of claim 1, wherein the runtime logic is configured to concatenate the tiles in the first set of output tiles, when writing the tiles in the first set of output tiles in the first section of the zero-initialized memory.

10. The data processing system of claim 9, wherein the second set of input tiles have zero-padding on only those edges that coincide with edges of the second padded input.

11. The data processing system of claim 9, wherein:
the runtime logic is further configured to use on-chip processing elements to process the first set of input tiles through the first section to generate the first set of output tiles; and
the memory is in a chip that also includes the on-chip processing elements.

12. The data processing system of claim 9, wherein:
the runtime logic is further configured to use on-chip processing elements to process the first set of input tiles through the first section to generate the first set of output tiles; and
the memory is in a first chip that is different from a second chip including the on-chip processing elements.

13. The data processing system of claim 1, wherein processing nodes in individual sections include convolution nodes, max pooling nodes, min pooling nodes, average pooling nodes, non-linearity nodes, normalization nodes, dropout nodes, concatenation nodes, transpose convolution nodes, fully connected nodes, softmax nodes, and/or loss nodes.

13a. The data processing system of claim 9, wherein to write the first set of output tiles in the first section of the zero-initialized memory, the data flow logic is configured to:
read individual ones of the first set of output tiles from an on-chip processing element and write individual ones of the first set of output tiles into an on-chip memory; and
read individual ones of the first set of output tiles from the on-chip memory and write individual ones of the first set of output tiles into the memory having the area initialized to zero, wherein the memory is an off-chip memory.

14. The data processing system of claim 9, wherein to write the first set of output tiles in the first section of the zero-initialized memory, the data flow logic is configured to:
read individual ones of the first set of output tiles from an on-chip processing element and write individual ones of the first set of output tiles into the memory having the area initialized to zero, wherein the memory is an off-chip memory.

15. The data processing system of claim 9, wherein to write the first set of output tiles in the first section of the zero-initialized memory, the data flow logic is configured to:
parallelly write tiles of the first set of output tiles to the memory.

16. The data processing system of claim 9, wherein to write the first set of output tiles in the first section of the zero-initialized memory, the data flow logic is configured to:
serially write tiles of the first set of output tiles to the memory.

17. The data processing system of claim 1, further comprising:
data flow logic configured to
read the second set of input tiles of the second padded input in the second input tiling configuration from an off-chip memory,
write the second set of input tiles of the second padded input in the second input tiling configuration to an on-chip memory, read the second set of input tiles of the second padded input in the second input tiling configuration from the on-chip memory, write the second set of input tiles of the second padded input in the second input tiling configuration to an on-chip processing element configured to at least in part process the second set of input tiles.

18. The data processing system of claim 1, further comprising:
data flow logic configured to
read the first set of output tiles from an on-chip processing element and write the first set of output tiles to an on-chip memory; and
read the first set of output tiles from the on-chip memory and write the first set of output tiles to an off-chip memory.

19. The data processing system of claim 18, wherein the data flow logic is configured to use direct memory access (DMA) engines to read from and write into the off-chip memory.

20. The data processing system of claim 19, wherein the DMA engines are on-chip engines.

21. The data processing system of claim 18, wherein the off-chip memory is dynamic random access memory (DRAM) and/or random access memory (RAM).

22. The data processing system of claim 18, wherein the on-chip memory is static random access memory (SRAM), block random access memory (BRAM), and/or dynamic random access memory (DRAM).

23. The data processing system of claim 1, wherein the runtime logic is further configured to access the second set of input tiles in a row-major form.

24. The data processing system of claim 1, wherein the runtime logic is further configured to access the second set of input tiles in a column-major form.

25. The data processing system of claim 1, wherein sections in the sequence of sections are subgraphs partitioned from the graph.

26. The data processing system of claim 25, wherein the sections are processing layers of a subgraph.

27. The data processing system of claim 26, wherein the sections are processing nodes of a processing layer.

28. The data processing system of claim 1, wherein the graph is a convolutional neural network.

29. The data processing system of claim 28, wherein processing nodes in the convolutional neural network include convolution nodes, max pooling nodes, min pooling nodes, average pooling nodes, non-linearity nodes, normalization nodes, dropout nodes, concatenation nodes, transpose convolution nodes, fully connected nodes, softmax nodes, and/or loss nodes.

30. The data processing system of claim 1, wherein the sections are forward pass subgraphs.

31. The data processing system of claim 1, wherein the first set of output tiles, the first set of input tiles, the second set of output tiles, the first padded input, the second input, the second padded input, the second set of input tiles, and the second set of output tiles are image data.

32. A non-transitory computer readable storage medium impressed with computer program instructions, the instructions, when executed on a processor, implement a method comprising:
generating by an output processing node of a first section of a processing graph, a plurality of output tiles of an output tensor;
writing the plurality of output tiles of the output tensor in a memory, wherein the writing comprises zero-padding the plurality of output tiles of the output tensor in the memory;
tiling the zero-padded plurality of output tiles of the output tensor to generate a plurality of input tiles of an input tensor; and
processing the plurality of input tiles of the input tensor in a second section of the processing graph.

33. The non-transitory computer readable storage medium of claim 32, further comprising:
initializing a plurality of memory locations to zero, the plurality of memory locations including (i) a first subset of memory locations, and (ii) a second subset of memory locations surrounding the first subset of memory locations,
wherein writing the plurality of output tiles comprises writing the plurality of output tiles of the output tensor in the first subset of memory locations in the memory, wherein the plurality of output tiles in the first subset of memory locations is surrounded by zeros in the second subset of memory locations.

34. The non-transitory computer readable storage medium of claim 33, wherein tiling the zero-padded plurality of output tiles of the output tensor comprises:
tiling a combination of (i) the plurality of output tiles of the output tensor in the first subset of memory locations and (ii) the zeros in the second subset of memory locations surrounding the plurality of output tiles of the output tensor.

35. The non-transitory computer readable storage medium of claim 32, wherein:
one or more first input tiles of the plurality of input tiles of the input tensor have zero padding along one or more edges, and one or more second input tiles of the plurality of input tiles of the input tensor do not have zero padding along any edge.

36. The non-transitory computer readable storage medium of claim 35, wherein:
the one or more first input tiles of the plurality of input tiles of the input tensor have zero padding along those edges that coincide with edges of the input tensor.

37. The non-transitory computer readable storage medium of claim 32, wherein:
the plurality of output tiles of the output tensor is non-overlapping tiles; and
the plurality of input tiles of the input tensor is overlapping tiles.

38. A computer implemented method comprising:
compiling a processing graph, wherein compiling the processing graph comprises:
sectioning the processing graph into a sequence of sections, the sequence of sections including at least a first section and a second section,
configuring the first section to generate a first set of output tiles in a first target tiling configuration in response to processing a first set of input tiles in a first input tiling configuration, and
configuring the second section to generate a second set of output tiles in a second target tiling configuration in response to processing a second set of input tiles in a second input tiling configuration; and
executing the compiled processing graph, comprising:
generating the second set of input tiles in the second input tiling configuration from the first set of output tiles in the first target tiling configuration, the second input tiling configuration different from the first target tiling configuration.

40. The method of claim 38, wherein generating the second set of input tiles from the first set of output tiles comprises:
zero-padding the first set of output tiles; and
tiling the zero-padded first set of output tiles, to generate the second set of input tiles in the second input tiling configuration.

Clause Set 5 (Section Cuts)

1. A data processing system configured to receive a graph that includes a sequence of layers, comprising:
compile time logic configured to execute graph cuts to partition the graph into a sequence of subgraphs,
wherein each subgraph in the sequence of subgraphs includes a sub-sequence of layers in the sequence of layers, and
wherein a graph cut is executed between a preceding layer (l) in the graph and a succeeding layer (l+1) in the graph that succeeds the preceding layer,
wherein the preceding layer is configured to generate a set of tiles on a tile-by-tile basis, and
wherein the succeeding layer is configured to process as an aggregate information that spans multiple tiles in the set of tiles; and
runtime logic configured with the compile time logic to execute the sequence of subgraphs.

2. The data processing system of claim 1, wherein the succeeding layer implements a batch normalization operation.

3. The data processing system of claim 1, wherein the succeeding layer implements a reduction operation.

4. The data processing system of claim 3, wherein the reduction operation is a pooling operation.

5. The data processing system of claim 3, wherein the reduction operation is a convolution.

6. The data processing system of claim 1, wherein tiles in the set of tiles are images tiles, wherein the information is pixels.

7. The data processing system of claim 6, further configured to compose the image tiles into a composed image, and store the composed image.

8. The data processing system of claim 7, further configured to provide the pixels from the composed image to the succeeding layer.

9. The data processing system of claim 7, wherein the composed image is stored in off-chip memory attached to a chip.

10. The data processing system of claim 7, wherein the composed image is stored in on-chip memory.

11. The data processing system of claim 7, wherein the composed image includes padding.

12. The data processing system of claim 11, wherein only those edges of the information are padded that coincide with padded edges of the composed image.

13. The data processing system of claim 1, wherein the tiles are feature map tiles, wherein the information is features.

14. The data processing system of claim 13, further configured to compose the feature map tiles into a composed feature map, and store the composed feature map.

15. The data processing system of claim 14, further configured to provide the features from the composed feature map to the succeeding layer.

16. The data processing system of claim 14, wherein the composed feature map is stored in off-chip memory attached to a chip.

17. The data processing system of claim 14, wherein the composed feature map is stored in on-chip memory.

18. The data processing system of claim 14, wherein the composed feature map includes padding.

19. The data processing system of claim 18, wherein only those edges of the information are padded that coincide with padded edges of the composed feature map.

20. The data processing system of claim 1, wherein the tiles are gradient map tiles, wherein the information is gradients.

21. The data processing system of claim 20, wherein the gradients are input gradients.

22. The data processing system of claim 20, further configured to compose the gradient map tiles into a composed gradient map, and store the composed gradient map.

23. The data processing system of claim 23, further configured to provide the gradients from the composed gradient map to the succeeding layer.

25. The data processing system of claim 23, wherein the composed gradient map is stored in off-chip memory attached to a chip.

26. The data processing system of claim 21, wherein the composed gradient map is stored in on-chip memory.

27. The data processing system of claim 23, wherein the composed gradient map includes padding.

28. The data processing system of claim 27, wherein only those edges of the information are padded that coincide with padded edges of the composed gradient map.

29. The data processing system of claim 1, wherein the preceding layer is configured as a final layer of a preceding subgraph in the sequence of subgraphs.

30. The data processing system of claim 29, wherein the succeeding layer is configured as a first layer of a succeeding subgraph in the sequence of subgraphs that succeeds the preceding subgraph.

31. The data processing system of claim 1, wherein the graph is a convolutional neural network.

32. The data processing system of claim 1, wherein the subgraphs are forward pass subgraphs.

33. The data processing system of claim 1, wherein the subgraphs are backward pass subgraphs.

34. The data processing system of claim 1, wherein layers in the sequence of layers include convolution layers, max pooling layers, min pooling layers, average pooling layers, non-linearity layers, normalization layers, dropout layers, concatenation layers, transpose convolution layers, fully connected layers, softmax layers, and/or loss layers.

Clause Set 6 (Read-Modify-Write in Backward Pass)

1. A data processing system, comprising:
compile time logic configured to
section a graph into a sequence of subgraphs, the sequence of subgraphs including at least a first subgraph, and
configure the first subgraph to generate a plurality of output tiles of an output tensor; and
runtime logic configured with the compile time logic to execute the sequence of subgraphs to
generate, at the output of the first subgraph, the plurality of output tiles of the output tensor, and
write the plurality of output tiles in a memory in an overlapping configuration, wherein an overlapping region between any two neighboring output tiles of the plurality of output tiles comprises a summation of a corresponding region of a first neighboring output tile and a corresponding region of a second neighboring output tile.

2. The data processing system of claim 1, wherein to write the plurality of output tiles in the memory in the overlapping configuration, the first subgraph is to:
   initialize an area of the memory to first data that comprises all zeros;
   generate a first output tile of the plurality of output tiles, read the first data comprising all zeros from the area of the memory, add the first output tile to a first section of the first data to generate second data, and write the second data to the area of the memory; and
   generate a second output tile of the plurality of output tiles, read the second data from the area of the memory, add the second output tile to a second section of the second data to generate third data, and write the third data to the memory,
   wherein the first section and the second section have a first overlapping region that includes data from both the first output tile and the second output tile.

3. The data processing system of claim 2, wherein first overlapping region is a summation of a first portion of the first output tile and a second portion of the second output tile.

4. The data processing system of claim 2, wherein to write the plurality of output tiles in the memory in the overlapping configuration, the first subgraph is further to:
   generate a third output tile of the plurality of output tiles, read the third data from the area of the memory, add the third output tile to a third section of the third data to generate fourth data, and write the fourth data to the area of the memory,
   wherein the first section and the third section have a second overlapping region that includes data from both the first output tile and the third output tile.

5. The data processing system of claim 4, wherein the first section, the second section, and the third section have a third overlapping region that includes data from each of the first output tile, the second output tile, and the third output tile.

6. The data processing system of claim 5, the third overlapping region is a summation of a portion of the first output tile, a portion of the second output tile, and a portion of the third output tile.

7. The data processing system of claim 1, wherein:
   the corresponding region of the first neighboring output tile is a first portion, and not an entirety, of the first neighboring output tile that overlaps with a first portion of the second neighboring output tile; and
   the corresponding region of the second neighboring output tile is the first portion, and not an entirety, of the second neighboring output that overlaps with the first portion of the first neighboring output tile.

8. The data processing system of claim 7, wherein:
   a second portion of the first neighboring output tile, which does not overlap with any other neighboring output tile, is stored without being summed with any neighboring output tile; and
   a second portion of the second neighboring output, which does not overlap with any other neighboring output tile, is stored without being summed with any neighboring output tile.

9. The data processing system of claim 1, wherein an overlapping region between any three neighboring output tiles of the plurality of output tiles comprises a summation of the corresponding region of the first neighboring output tile, the corresponding region of the second neighboring output tile, and a corresponding region of a third neighboring output tile.

10. The data processing system of claim 1, wherein an overlapping region between any four neighboring output tiles of the plurality of output tiles comprises a summation of the corresponding region of the first neighboring output tile, the corresponding region of the second neighboring output tile, a corresponding region of a third neighboring output tile, and a corresponding region of a fourth neighboring output tile.

11. The data processing system of claim 1, wherein the subgraphs are backward pass subgraphs.

12. The data processing system of claim 1, wherein the sequence of subgraphs includes a second subgraph that is immediate adjacent to the first subgraph, and wherein the runtime logic configured with the compile time logic is to execute the sequence of subgraphs to:
   retile the plurality of output tiles in the memory to generate a plurality of non-overlapping input tiles of an input tensor; and
   execute the second subgraph to receive and process the plurality of non-overlapping input tiles of the input tensor.

13. The data processing system of claim 12, wherein:
   the output tensor comprises (i) a central region and (ii) peripheral region surrounding the central region and forming a border around the central region; and
   the central region of the output tensor is tiled to generate the plurality of non-overlapping input tiles of the input tensor, and the peripheral region of the output tensor is not included in the plurality of non-overlapping input tiles of the input tensor.

14. A computer implemented method comprising:
   writing, in a memory and in an overlapping configuration, a plurality of output tiles of an output tensor generated by a first subgraph of a processing graph, wherein an overlapping region between any two neighboring output tiles of the plurality of output tiles comprises an aggregate of a corresponding region of a first neighboring output tile and a corresponding region of a second neighboring output tile;
   tiling at least a section of the output tensor to generate a plurality of non-overlapping input tiles of an input tensor; and
   processing the plurality of non-overlapping input tiles of the input tensor by a second subgraph of the processing graph.

15. The method of claim 14, wherein the output tensor has (i) a central region and (ii) a peripheral region surrounding the central region, and wherein tiling the output tensor comprises:
   tiling the central region of the output tensor to generate the plurality of non-overlapping input tiles of the input tensor, wherein the peripheral region of the output tensor is not included in the plurality of non-overlapping input tiles of the input tensor.

16. The method of claim 15, wherein the peripheral region of the output tensor is not processed by the second subgraph of the processing graph.

17. The method of claim 14, wherein:
   a number of output tiles in the plurality of input tiles of the output tensor is same as a number of input tiles in the plurality of input tiles of the input tensor; and
   a size of each output tile in the plurality of output tiles of the output tensor is same;

a size of each input tile in the plurality of input tiles of the input tensor is same; and the size of each output tile in the plurality of output tiles of the output tensor is larger than the size of each input tile in the plurality of input tiles of the input tensor.

18. The method of claim 14, wherein the first and second subgraphs are backward pass subgraphs.

19. A non-transitory computer readable storage medium impressed with computer program instructions, the instructions, when executed on a processor, implement a method comprising:

generating, by a first subgraph of a processing graph, a plurality of overlapping output tiles of an output tensor;

tiling a first section of the output tensor to generate a plurality of non-overlapping input tiles of an input tensor, wherein a second section of the output tensor is not included in the plurality of non-overlapping input tiles of the input tensor; and processing the plurality of non-overlapping input tiles of the input tensor by a second subgraph of the processing graph.

20. The non-transitory computer readable storage medium of claim 19, wherein the second section of the output tensor forms a boundary around the first section of the output tensor.

Clause Set 7 (Full Materialization of Tensors)

1. A data processing system, comprising:
a plurality of reconfigurable processors;
processor memory operatively coupled to the plurality of reconfigurable processors; and
runtime logic, operatively coupled to the plurality of reconfigurable processors and the processor memory, configured to
configure at least one reconfigurable processor in the plurality of reconfigurable processors with a first subgraph in a sequence of subgraphs of a graph;
load an input onto the processor memory;
on a tile-by-tile basis, process a first set of input tiles from the input through the first subgraph and generate a first set of intermediate tiles, load the first set of intermediate tiles onto the processor memory, and process the first set of intermediate tiles through the first subgraph and generate a first set of output tiles;
compose output tiles in the first set of output tiles into a first composed input, and load the first composed input onto the processor memory;
configure at least one reconfigurable processor in the plurality of reconfigurable processors with a second subgraph in the sequence of subgraphs;
on the tile-by-tile basis, process a second set of input tiles from the first composed input through the second subgraph and generate a second set of intermediate tiles, load the second set of intermediate tiles onto the processor memory, and process the second set of intermediate tiles through the second subgraph and generate a second set of output tiles; and
compose output tiles in the second set of output tiles into a second composed input, and load the second composed input onto the processor memory.

2. The data processing system of claim 1, wherein the runtime logic is further configured to:

configure at least one reconfigurable processor in the plurality of reconfigurable processors with a third subgraph in the sequence of subgraphs;
on the tile-by-tile basis, process a third set of input tiles from the second composed input through the third subgraph and generate a third set of intermediate tiles, load the third set of intermediate tiles onto the processor memory, and process the third set of intermediate tiles through the third subgraph and generate a third set of output tiles; and
compose output tiles in the third set of output tiles into a third composed input, and load the third composed input onto the processor memory.

3. The data processing system of claim 2, wherein the first set of input tiles have overlapping regions, wherein the first set of intermediate tiles have overlapping regions, and wherein the first set of output tiles are non-overlapping.

4. The data processing system of claim 3, wherein tiles in the first set of intermediate tiles share overlapping regions with adjacent tiles in the first set of intermediate tiles, wherein the overlapping regions are redundantly localized in each of the tiles for storage and future tile-by-tile by processing to configure an individual tile in the first set of intermediate tiles to be read with a contained overlapping region without having to read the contained overlapping region from another adjacent tile in the first set of intermediate tiles sharing the contained overlapping region with the individual tile.

5. The data processing system of claim 4, wherein the second set of input tiles have overlapping regions, wherein the second set of intermediate tiles have overlapping regions, and wherein the second set of output tiles are non-overlapping.

6. The data processing system of claim 5, wherein tiles in the second set of intermediate tiles share overlapping regions with adjacent tiles in the second set of intermediate tiles, wherein the overlapping regions are redundantly localized in each of the tiles for storage and future tile-by-tile by processing to configure an individual tile in the second set of intermediate tiles to be read with a contained overlapping region without having to read the contained overlapping region from another adjacent tile in the second set of intermediate tiles sharing the contained overlapping region with the individual tile.

7. The data processing system of claim 1, wherein the graph is a convolutional neural network.

8. The data processing system of claim 1, wherein the subgraphs as forward pass subgraphs.

9. The data processing system of claim 1, wherein the subgraphs as backward pass subgraphs.

10. The data processing system of claim 1, wherein the input, the first set of input tiles, the first set of intermediate tiles, first set of output tiles, the first composed input, the second set of input tiles, the second set of intermediate tiles, the second set of output tiles, the second composed input, the third set of input tiles, the third set of intermediate tiles, the third set of output tiles, and the third composed input are image data.

11. The data processing system of claim 1, wherein the input, the first set of input tiles, the first set of intermediate tiles, first set of output tiles, the first composed input, the second set of input tiles, the second set of intermediate tiles, the second set of output tiles, the second composed input, the third set of input tiles, the third set of intermediate tiles, the third set of output tiles, and the third composed input are input gradients.

Clause Set 8 (Graph Metadata Generation: Tiling, Padding, and Zeroing-Out Configurations)

1. A data processing system configured to receive a processing graph of an application, the processing graph having a sequence of processing nodes, the sequence of processing nodes including an input processing node followed by at least one intermediate processing node and at least one output processing node, the input processing node configured to process an input and generate at least one intermediate representation of the input, the intermediate processing node configured to process the intermediate representation and generate at least one further intermediate representation of the input, and the output processing node configured to process the further intermediate representation and generate at least one output representation of the input, comprising:

graph metadata generation logic configured to analyze the processing graph and generate graph metadata that specifies a target tiling configuration for the output representation to tile the output representation into a set of non-overlapping tiles, a first tiling configuration for the input to tile the input into a first set of overlapping tiles, a second tiling configuration for the intermediate representation to tile the intermediate representation into a second set of overlapping tiles, and a third tiling configuration for the further intermediate representation to tile the further intermediate representation into a third set of overlapping or non-overlapping tiles;

compile time logic configured to modify the processing graph based on the graph metadata and generate a modified processing graph, wherein the modified processing graph is configured to generate the first set of overlapping tiles in the first tiling configuration, the second set of overlapping tiles in the second tiling configuration by using the first set of overlapping tiles as a first set of tile-by-tile effective receptive fields, the third set of overlapping or non-overlapping tiles in the third tiling configuration by using the second set of overlapping tiles as a second set of tile-by-tile second effective receptive fields, and the set of non-overlapping tiles in the target tiling configuration by using the third set of overlapping or non-overlapping tiles as a third set of tile-by-tile effective receptive fields; and runtime logic configured with the compile time logic to execute the modified processing graph to execute the application.

2. The data processing system of claim 1, wherein the target tiling configuration is determined based on a number of processing nodes in the sequence of processing nodes.

3. The data processing system of claim 2, wherein the target tiling configuration is determined based on respective processing logics implemented by respective processing nodes in the sequence of processing nodes.

4. The data processing system of claim 3, wherein the target tiling configuration is determined based on a size of the output representation.

4a. The data processing system of claim 1, wherein the target tiling configuration is determined based on one or more of: a number of processing nodes in the sequence of processing nodes, respective processing logics implemented by respective processing nodes in the sequence of processing nodes, and/or a size of the output representation.

5. The data processing system of claim 4, wherein the graph metadata generation logic is further configured to reverse traverse the processing graph to determine the third tiling configuration as the third set of tile-by-tile effective receptive fields of the set of non-overlapping tiles that satisfy the target tiling configuration, the second tiling configuration as the second set of tile-by-tile effective receptive fields of the third set of overlapping or non-overlapping tiles that satisfy the third tiling configuration, and the first tiling configuration as the first set of tile-by-tile effective receptive fields of the second set of overlapping tiles that satisfy the second tiling configuration.

6. The data processing system of claim 1, wherein the graph metadata further specifies a first padding configuration for the input, a second padding configuration for the intermediate representation, and a third padding configuration for the further intermediate representation.

7. The data processing system of claim 6, wherein the first padding configuration applies a cumulative padding to pad the input into a padded input, wherein the second padding configuration applies no padding to leave the intermediate representation unpadded, wherein the third padding configuration applies no padding to leave the further intermediate representation unpadded.

8. The data processing system of claim 7, wherein the graph metadata further specifies applying the first tiling configuration to the padded input after applying the first padding configuration to the input.

9. The data processing system of claim 8, wherein the first tiling configuration confines the cumulative padding to those edges of the first set of overlapping tiles that coincide with edges of the padded input.

10. The data processing system of claim 6, wherein the first tiling configuration configures tiles in the first set of overlapping tiles to have a first tile size, wherein the second tiling configuration configures tiles in the second set of overlapping tiles to have a second tile size, wherein the third tiling configuration configures tiles in the third set of overlapping tiles to have a third tile size, and wherein the target tiling configuration configures tiles in the set of non-overlapping tiles to have a fourth tile size.

11. The data processing system of claim 10, wherein the first, second, and third padding configurations configure each of the tiles in the first set of overlapping tiles to have the first tile size, each of the tiles in the second set of overlapping tiles to have the second tile size, each of the tiles in the third set of overlapping tiles to have the third tile size, and each of the tiles in the set of non-overlapping tiles to have the fourth tile size.

12. The data processing system of claim 1, wherein the graph metadata further specifies a first zeroing-out configuration to zero-out those edges of the tiles in the second set of overlapping tiles that coincide with edges of the intermediate representation.

13. The data processing system of claim 12, wherein the zeroing-out configures values in the edges to be processed as zero input values for generation of the further intermediate representation, while conserving the values non-edge sections of the intermediate representation.

14. The data processing system of claim 12, wherein the zeroing-out converts the values to zero values in the intermediate representation.

15. The data processing system of claim 1, wherein the graph metadata further specifies a second zeroing-out configuration to zero-out those edges of the tiles in the third set of overlapping or non-overlapping tiles that coincide with edges of the further intermediate representation.

16. The data processing system of claim 15, wherein the zeroing-out configures values in the edges to be processed as zero input values for generation of the output representation, while conserving the values in non-edge sections of the further intermediate representation.

17. The data processing system of claim 15, wherein the zeroing-out converts the values to zero values in the further intermediate representation.

18. The data processing system of claim 1, wherein the graph metadata further specifies a first composite image configuration for the input, a second composite image configuration for the intermediate representation, a third composite image configuration for the further intermediate representation, and a fourth composite image configuration for the output representation.

19. The data processing system of claim 18, wherein the first composite image configuration configures the first set of overlapping tiles to be stored as a first composite representation, wherein the second composite image configuration configures the second set of overlapping tiles to be stored as a second composite representation, wherein the third composite image configuration configures the third set of overlapping tiles to be stored as a third composite representation, and wherein the fourth composite image configuration configures the set of non-overlapping tiles to be stored as a fourth composite representation.

20. The data processing system of claim 19, wherein the first composite representation includes the padded input, wherein the second composite representation stores the tiles in the second set of overlapping tiles such that overlapping regions are redundantly localized in each of the tiles, and wherein the third composite representation stores the tiles in the third set of overlapping tiles such that overlapping regions are redundantly localized in each of the tiles.

21. The data processing system of claim 1, wherein the graph metadata further specifies a first tile overlap configuration for the input, a second tile overlap configuration for the intermediate representation, a third tile overlap configuration for the further intermediate representation, and a fourth tile overlap configuration for the output representation.

22. The data processing system of claim 21, wherein the first tile overlap configuration configures adjacent tiles in the first set of overlapping tiles to have a first overlap size, wherein the second tile overlap configuration configures adjacent tiles in the second set of overlapping tiles to have a second overlap size, and wherein the third tile overlap configuration configures adjacent tiles in the third set of overlapping tiles to have a third overlap size.

23. The data processing system of claim 1, wherein the graph metadata further specifies a first tensor size configuration for the input, a second tensor size configuration for the intermediate representation, a third tensor size configuration for the further intermediate representation, and a fourth tensor size configuration for the output representation.

24. The data processing system of claim 23, wherein the first tensor size configuration configures the padded input to have first spatial dimensions, wherein the second tensor size configuration configures the intermediate representation to have second spatial dimensions, wherein the third tensor size configuration configures the further intermediate representation to have third spatial dimensions, and wherein the fourth tensor size configuration configures the output representation to have fourth spatial dimensions.

25. The data processing system of claim 24, wherein the fourth tensor size is divisible by the fourth tile size.

26. The data processing system of claim 25, wherein the first tensor size is not divisible by the first tile size.

27. The data processing system of claim 1, wherein the graph metadata further specifies a first striding configuration for the input processing node, a second striding configuration for the intermediate processing node, and a third striding configuration for the output processing node.

28. The data processing system of claim 27, wherein the first striding configuration configures at least one kernel of the input processing node to have a first step size when traversing the input, wherein the second striding configuration configures at least one kernel of the intermediate processing node to have a second step size when traversing the intermediate representation, and wherein the third striding configuration configures at least one kernel of the output processing node to have a third step size when traversing the further intermediate representation.

29. The data processing system of claim 1, wherein the graph metadata further specifies a first kernel size configuration for the input processing node, a second kernel size configuration for the intermediate processing node, and a third kernel size configuration for the output processing node.

30. The data processing system of claim 29, wherein the first kernel size configuration configures at least one kernel of the input processing node to have a first local receptive field when traversing the input, wherein the second kernel size configuration configures at least one kernel of the intermediate processing node to have a second local receptive field when traversing the intermediate representation, and wherein the third kernel size configuration configures at least one kernel of the output processing node to have a third local receptive field when traversing the further intermediate representation.

31. The data processing system of claim 1, wherein the graph metadata pairs the input and the input processing node in a first pair, associates input metadata, including the first tiling configuration, the first padding configuration, the first composite image configuration, the first tile overlap configuration, the first tensor size configuration, the first striding configuration, and/or the first kernel size configuration, with the first pair, and makes the input metadata available for use by the modified processing graph.

32. The data processing system of claim 31, wherein the graph metadata pairs the intermediate representation and the intermediate processing node in a second pair, associates intermediate metadata, including the second tiling configuration, the second padding configuration, the first zeroing-out configuration, the second composite image configuration, the second tile overlap configuration, the second tensor size configuration, the second striding configuration, and/or the second kernel size configuration, with the second pair, and makes the intermediate metadata available for use by the modified processing graph.

33. The data processing system of claim 32, wherein the graph metadata pairs the further intermediate representation and the output processing node in a third pair, associates further intermediate metadata, including the third tiling configuration, the third padding configuration, the second zeroing-out configuration, the third composite image configuration, the third tile overlap configuration, the third tensor size configuration, the third striding configuration, and/or the third kernel size configuration, with the third pair, and makes the further intermediate metadata available for use by the modified processing graph.

34. The data processing system of claim 33, wherein the graph metadata associates output metadata, including the target tiling configuration, the fourth composite image configuration, and/or the fourth tensor size configuration, with the output representation, and makes the output metadata available for use by the modified processing graph.

35. The data processing system of claim 1, wherein the graph metadata inserts a first tile materialization node before the input processing node, a second tile materialization node after the input processing node, a third tile materialization node after the intermediate processing node, and a fourth tile materialization node after the output processing node.

36. The data processing system of claim 35, wherein the first tile materialization node is configured to checkpoint the first set of overlapping tiles on a tile-by-tile basis and/or the input metadata to memory, wherein the memory is external memory, on-chip memory, and/or on-chip processing elements.

37. The data processing system of claim 35, wherein the first tile materialization node is further configured to stream the first set of overlapping tiles on a tile-by-tile basis and/or the input metadata to another processing node, wherein the another processing node is in the modified processing graph and/or another modified processing graph.

38. The data processing system of claim 35, wherein the second tile materialization node is configured to checkpoint the second set of overlapping tiles on a tile-by-tile basis and/or the intermediate metadata to memory, wherein the memory is external memory, on-chip memory, and/or on-chip processing elements.

39. The data processing system of claim 35, wherein the second tile materialization node is further configured to stream the second set of overlapping tiles on a tile-by-tile basis and/or the intermediate metadata to another processing node, wherein the another processing node is in the modified processing graph and/or another modified processing graph.

40. The data processing system of claim 35, wherein the third tile materialization node is configured to checkpoint the third set of overlapping tiles on a tile-by-tile basis and/or the further intermediate metadata to memory, wherein the memory is external memory, on-chip memory, and/or on-chip processing elements.

41. The data processing system of claim 35, wherein the third tile materialization node is further configured to stream the third set of overlapping tiles on a tile-by-tile basis and/or the further intermediate metadata to another processing node (e.g., via a skip connection), wherein the another processing node is in the modified processing graph and/or another modified processing graph.

42. The data processing system of claim 35, wherein the third tile materialization node is configured to checkpoint the set of non-overlapping tiles on a tile-by-tile basis and/or the output metadata to memory, wherein the memory is external memory, on-chip memory, and/or on-chip processing elements.

43. The data processing system of claim 35, wherein the third tile materialization node is further configured to stream the set of non-overlapping tiles on a tile-by-tile basis and/or the output metadata to another processing node, wherein the another processing node is in the modified processing graph and/or another modified processing graph.

44. The data processing system of claim 1, wherein the compile time logic is further configured to generate one or more configuration files that define the modified processing graph, wherein the runtime logic is further configured to execute the application using the configuration files.

45. The data processing system of claim 1, wherein a size of the output representation is conserved from the processing graph to the modified processing graph.

46. The data processing system of claim 1, wherein the input is an array of pixels, and the tiles in the first set of overlapping tiles, the tiles in the second set of overlapping tiles, the tiles in the third set of overlapping tiles, and the tiles in the set of non-overlapping tiles are sub-arrays of the pixels.

47. The data processing system of claim 46, wherein the input, the intermediate representation, the further intermediate representation, and the output representation each have one or more channels, and the tiles in the first set of overlapping tiles, the tiles in the second set of overlapping tiles, the tiles in the third set of overlapping tiles, and the tiles in the set of non-overlapping tiles each have one or more channels.

49. The data processing system of claim 1, wherein the processing graph is a neural network.

50. The data processing system of claim 49, wherein the neural network is a convolutional neural network.

51. The data processing system of claim 50, wherein processing nodes in the sequence of processing nodes include convolution nodes, max pooling nodes, min pooling nodes, average pooling nodes, non-linearity nodes, normalization nodes, dropout nodes, concatenation nodes, transpose convolution nodes, fully connected nodes, softmax nodes, and/or loss nodes.

52. The data processing system of claim 1, wherein the compile time logic is further configured to partition the processing graph into a sequence of processing subgraphs, wherein the graph metadata generation logic is further configured to analyze respective processing subgraphs in the sequence of processing subgraphs and generate respective graph metadata for the respective processing subgraphs, wherein the compile time logic is further configured to modify the respective processing subgraphs based on the respective graph metadata and generate respective modified processing subgraphs, and wherein the runtime logic is further configured to execute the respective modified processing subgraphs to execute the application.

53. The data processing system of claim 53, wherein the runtime logic is further configured to execute the respective processing subgraphs in parallel.

54. The data processing system of claim 1, wherein the runtime logic is further configured to execute tile-by-tile processing in the processing graph in parallel.

55. The data processing system of claim 1, wherein the processing graph is a forward pass graph.

56. The data processing system of claim 1, wherein the processing graph is a backward pass graph.

57. The data processing system of claim 1, wherein processing nodes (layers) in the sequence of processing nodes (layers) include convolution nodes, max pooling nodes, min pooling nodes, average pooling nodes, non-linearity nodes, normalization nodes, dropout nodes, concatenation nodes, transpose convolution nodes, fully connected nodes, softmax nodes, and/or loss nodes.

58. A data processing system, comprising:
graph metadata generation logic configured to analyze a processing graph and generate graph metadata that specifies a target configuration for an output feature map of the processing graph, and respective configurations for an input and intermediate feature maps of the processing graph that contribute to generation of the output feature map, wherein the respective configurations progressively satisfy the target configuration;
compile time logic configured to modify the processing graph based on the graph metadata and generate a modified processing graph, wherein the modified processing graph is configured to generate the output feature map in the target configuration in response to processing the input and the intermediate feature maps in the respective configurations; and runtime logic configured with the compile time logic to execute the modified processing graph to execute the application.

59. The data processing system of claim 58, wherein the target configuration and the respective configurations specify respective tiling configurations, padding configurations, zeroing-out configurations, composite image configurations, tile overlap configurations, tensor size configurations, striding configurations, and/or kernel size configurations.

60. A data processing system, comprising:
graph metadata generation logic configured to analyze a processing graph and generate graph metadata that specifies a target configuration for an output gradient of the processing graph, and respective configurations for an input and intermediate gradients of the processing graph that contribute to generation of the output gradient, wherein the respective configurations progressively satisfy the target configuration;
compile time logic configured to modify the processing graph based on the graph metadata and generate a modified processing graph, wherein the modified processing graph is configured to generate the output gradient in the target configuration in response to processing the input and the intermediate gradients in the respective configurations; and
runtime logic configured with the compile time logic to execute the modified processing graph to execute the application.

61. The data processing system of claim 60, wherein the target configuration and the respective configurations specify respective tiling configurations, padding configurations, zeroing-out configurations, composite (aggregate/composed) image configurations, tile overlap configurations, tensor size configurations, striding configurations, and/or kernel size configurations.

62. The data processing system of claim 60, wherein the input, intermediate, and output gradients are input gradients.

Clause Set 9 (Padding Before Tiling, Location-Based Tiling, Zeroing-Out)

1. A data processing system configured to receive a processing graph of an application, the processing graph having a plurality of processing nodes configured to process an input and generate at least one intermediate representation of the input and at least one output representation of the input, the processing graph configured to apply a pre-padding tiling prior to applying an input padding and an intermediate padding, wherein the pre-padding tiling tiles the input into a set of input tiles with different tile sizes, tiles the intermediate representation into a set of intermediate tiles with different tile sizes, and tiles the output representation into a set of overlapping output tiles with different tile sizes, wherein the input padding pads input tiles in the set of input tiles into post-padded input tiles, and wherein the intermediate padding pads intermediate tiles in the set of input tiles into post-padded intermediate input tiles, comprising:
compile time logic configured to modify the processing graph and generate a modified processing graph,
the modified processing graph configured to apply a post-padding tiling after applying a cumulative input padding that confines padding to the input,
wherein the cumulative input padding pads the input into a padded input, and
wherein the post-padding tiling tiles the padded input into a set of pre-padded input tiles with a same tile size, tiles the intermediate representation into a set of intermediate tiles with a same tile size, and tiles the output representation into a set of non-overlapping output tiles with a same tile size; and
runtime logic configured with the compile time logic to execute the modified processing graph to execute the application.

2. The data processing system of claim 1, wherein pre-padded input tiles in the set of pre-padded input tiles are padded based on locations of the pre-padded input tiles in the input.

3. The data processing system of claim 2, wherein the locations include top-left [0], top [1], top-right [2], middle-left [3], middle [4], middle-right [5], bottom-left [6], bottom [7], and bottom-right [8].

4. The data processing system of claim 3, wherein a pre-padded input tile in the top-left [0] is padded only along a top edge and a left edge.

5. The data processing system of claim 3, wherein a pre-padded input tile in the top [1] is padded only along a top edge.

6. The data processing system of claim 3, wherein a pre-padded input tile in the top-right [2] is padded only along a top edge and a right edge.

7. The data processing system of claim 3, wherein a pre-padded input tile in the middle-left [3] is padded only along a left edge.

8. The data processing system of claim 3, wherein a pre-padded input tile in the middle [4] is unpadded.

9. The data processing system of claim 3, wherein a pre-padded input tile in the middle-right [5] is padded only along a right edge.

10. The data processing system of claim 3, wherein a pre-padded input tile in the bottom-left [6] is padded only along a bottom edge and a left edge.

11. The data processing system of claim 3, wherein a pre-padded input tile in the bottom [7] is padded only along a bottom edge.

12. The data processing system of claim 3, wherein a pre-padded input tile in the bottom-right [8] is padded only along a bottom edge and a right edge.

13. The data processing system of claim 2, wherein the pre-padded input tiles are padded with zero padding.

14. The data processing system of claim 1, wherein adjacent pre-padded input tiles in the set of pre-padded input tiles have overlapping regions.

15. The data processing system of claim 1, wherein adjacent intermediate tiles in the set of intermediate tiles have overlapping regions.

16. The data processing system of claim 15, wherein the modified processing graph is further configured to apply zeroing-out to those edges of intermediate tiles in the set of intermediate tiles that coincide with edges of the intermediate representation.

17. The data processing system of claim 16, wherein the zeroing-out configures values in the edges to be processed as zero input values for generation of the output representation and/or another intermediate representation, while conserving the values in non-edge sections of the intermediate representation.

18. The data processing system of claim 16, wherein the zeroing-out converts the values to zero values in the intermediate representation.

19. The data processing system of claim 16, wherein the edges are zeroed-out based on locations of the intermediate tiles in the intermediate representation.

20. The data processing system of claim 19, wherein the locations include top-left [0], top [1], top-right [2], middle-left [3], middle [4], middle-right [5], bottom-left [6], bottom [7], and bottom-right [8].

21. The data processing system of claim 20, wherein an intermediate input tile in the top-left [0] is zeroed-out only along a top edge and a left edge.

22. The data processing system of claim 20, wherein an intermediate input tile in the top [1] is zeroed-out only along a top edge.

23. The data processing system of claim 20, wherein an intermediate input tile in the top-right [2] is zeroed-out only along a top edge and a right edge.

24. The data processing system of claim 20, wherein an intermediate input tile in the middle-left [3] is zeroed-out only along a left edge.

25. The data processing system of claim 20, wherein an intermediate input tile in the middle [4] is not zeroed-out.

26. The data processing system of claim 20, wherein an intermediate input tile in the middle-right [5] is zeroed-out only along a right edge.

27. The data processing system of claim 20, wherein an intermediate input tile in the bottom-left [6] is zeroed-out only along a bottom edge and a left edge.

28. The data processing system of claim 20, wherein an intermediate input tile in the bottom [7] is zeroed-out only along a bottom edge.

29. The data processing system of claim 20, wherein an intermediate input tile in the bottom-right [8] is zeroed-out only along a bottom edge and a right edge.

30. The data processing system of claim 1, wherein non-overlapping output tiles in set of non-overlapping reduce redundant computations and redundant memory access and occupancy during execution the application.

31. The data processing system of claim 1, wherein the cumulative input padding eliminates the intermediate padding, wherein elimination of the intermediate padding reduces redundant computations and redundant memory access and occupancy during the execution of the application.

32. The data processing system of claim 1, wherein the same tile size of the pre-padded input tiles enables a corresponding processing node in the plurality of processing nodes to process the pre-padded input tiles using a same computation logic, wherein use of the same computation logic from pre-padded input tile-to-pre-padded input tile reduces redundant computation and redundant memory access and occupancy during execution the application.

33. The data processing system of claim 1, wherein the same tile size of the intermediate tiles enables a corresponding processing node in the plurality of processing nodes to process the intermediate tiles using a same computation logic, wherein use of the same computation logic from intermediate tile-to-intermediate tile reduces redundant computation and redundant memory access and occupancy during execution the application.

34. The data processing system of claim 1, wherein the same tile size of the non-overlapping output tiles enables a corresponding processing node in the plurality of processing nodes to process the non-overlapping output tiles using a same computation logic, wherein use of the same computation logic from non-overlapping output tile-to-non-overlapping output tile reduces redundant computation and redundant memory access and occupancy during execution the application.

35. The data processing system of claim 1, wherein a size of the output representation is conserved from the processing graph to the modified processing graph.

36. The data processing system of claim 1, wherein the input is an array of pixels.

37. The data processing system of claim 36, wherein the pre-padded input tiles, the intermediate tiles, and the non-overlapping output tiles are sub-arrays of the pixels.

38. The data processing system of claim 37, wherein the input, the intermediate representation, and the output representation each have one or more channels, and the pre-padded input tiles, the intermediate tiles, and the non-overlapping output tiles each have one or more channels.

40. The data processing system of claim 1, wherein the compile time logic is further configured to partition the processing graph into a sequence of processing subgraphs, wherein the compile time logic is further configured to modify the respective processing subgraphs and generate respective modified processing subgraphs that are configured to apply the post-padding tiling after applying the cumulative input padding and to apply the zeroing-out, wherein the runtime logic is further configured to execute the respective modified processing subgraphs to execute the application, wherein the runtime logic is further configured to execute the respective processing subgraphs in parallel, wherein the runtime logic is further configured to execute tile-by-tile processing in the processing graph in parallel.

41. The data processing system of claim 1, wherein the processing graph is a neural network, wherein the neural network is a convolutional neural network.

42. The data processing system of claim 41, wherein processing nodes (layers) in the plurality of processing nodes include convolution nodes, max pooling nodes, min pooling nodes, average pooling nodes, non-linearity nodes, normalization nodes, dropout nodes, concatenation nodes, transpose convolution nodes, softmax nodes, and/or loss nodes.

43. A data processing system, comprising:
padding logic configured to pad an input and generate a padded input;
tiling logic configured with the padding logic to tile the padded input into a plurality of tiles, with padding in tiles in the plurality of tiles confined to those edges of the tiles that coincide with edges of the padded input; and
processing logic configured with the tiling logic to process the tiles and generate one or more alternative representations of the input.

44. A data processing system, comprising:
tiling logic configured to tile a padded input into a plurality of tiles, with padding in tiles in the plurality of tiles confined to those edges of the tiles that coincide with edges of the padded input.

45. A data processing system, comprising:
padding logic configured to pad an input and generate a padded input;
tiling logic configured with the padding logic to tile the padded input into a plurality of tiles; and
processing logic configured with the tiling logic to process the tiles and generate one or more alternative representations of the input.

46. The data processing system of claim 45, wherein individual edges of individual tiles are selectively padded or left unpadded, based on tile locations in the input.

47. The data processing system of claim 46, wherein the tile locations include top-left [0], top [1], top-right [2], middle-left [3], middle [4], middle-right [5], bottom-left [6], bottom [7], and bottom-right [8].

48. The data processing system of claim 47, wherein a pre-padded input tile in the top-left [0] is padded only along a top edge and a left edge.

49. The data processing system of claim 47, wherein a pre-padded input tile in the top [1] is padded only along a top edge.

50. The data processing system of claim 47, wherein a pre-padded input tile in the top-right [2] is padded only along a top edge and a right edge.

51. The data processing system of claim 47, wherein a pre-padded input tile in the middle-left [3] is padded only along a left edge.

52. The data processing system of claim 47, wherein a pre-padded input tile in the middle [4] is unpadded.

53. The data processing system of claim 47, wherein a pre-padded input tile in the middle-right [5] is padded only along a right edge.

54. The data processing system of claim 47, wherein a pre-padded input tile in the bottom-left [6] is padded only along a bottom edge and a left edge.

55. The data processing system of claim 47, wherein a pre-padded input tile in the bottom [7] is padded only along a bottom edge.

56. The data processing system of claim 47, wherein a pre-padded input tile in the bottom-right [8] is padded only along a bottom edge and a right edge.

56a. The data processing system of claim 46, wherein:
the tile locations include top-left, top, top-right, middle-left, middle, middle-right, bottom-left, bottom, and bottom-right;
a pre-padded input tile in the top-left is padded only along a top edge and a left edge;
a pre-padded input tile in the top is padded only along a top edge;
a pre-padded input tile in the top-right is padded only along a top edge and a right edge;
a pre-padded input tile in the middle-left is padded only along a left edge;
a pre-padded input tile in the middle is unpadded;
a pre-padded input tile in the middle-right is padded only along a right edge;
a pre-padded input tile in the bottom-left is padded only along a bottom edge and a left edge;
a pre-padded input tile in the bottom is padded only along a bottom edge; and
a pre-padded input tile in the bottom-right is padded only along a bottom edge and a right edge.

57. The data processing system of claim 45, wherein the tiles are padded with zero padding.

58. The data processing system of claim 45, wherein adjacent tiles in the plurality of tiles have overlapping regions.

59. The data processing system of claim 45, wherein the tiles have a same tile size.

60. The data processing system of claim 45, wherein the tiling logic is further configured to tile each of the alternative representations into respective pluralities of tiles.

61. The data processing system of claim 60, wherein tiles in each plurality of tiles in the respective pluralities of tiles have a same tile size.

62. The data processing system of claim 60, wherein the alternative representations include an output representation of the input.

63. The data processing system of claim 62, wherein a plurality of tiles of the output representation has non-overlapping tiles.

64. The data processing system of claim 63, wherein respective pluralities of tiles of alternative representations other than the output representation have overlapping regions between adjacent tiles.

65. A data processing system, comprising:
padding logic configured to pad an input with a padding frame and generate a padded input;
tiling logic configured to tile the padded input into a plurality of tiles, tiles in the plurality of tiles including partially padded tiles with one or more edges disposed on the padding frame and unpadded tiles with edges disposed off the padding frame; and
processing logic configured with the tiling logic to process the tiles and generate one or more alternative representations of the input.

66. The data processing system of claim 65, wherein the edges of the partially padded tiles are formed from parts of the padding frame.

67. The data processing system of claim 65, wherein the edges of the unpadded tiles are formed from parts of the input.

68. The data processing system of claim 65, wherein the padding frame has zero padding.

69. A data processing system, comprising:
padding logic configured to cause generation of pre-padded tiles, with padding in the pre-padded tiles confined to those edges of the pre-padded tiles that coincide with edges of the padding.

70. A data processing system, comprising:
compile logic configured to receive a convolutional neural network, the convolutional neural network having a sequence of convolutions, the sequence of convolutions including a padded convolution followed by additional padded convolutions;
the compile logic configured to transform the sequence of convolutions into a sequence of unpadded convolutions, wherein the sequence of unpadded convolutions comprises zero-padding an input to the sequence and tiling the input to generate a plurality of tiles, and performing the sequence of unpadded convolutions on the plurality of tiles; and
runtime logic configured with the compile time logic to execute the convolution neural network by executing the sequence of unpadded convolutions on the plurality of tiles.

71. A data processing system configured to receive a processing graph of an application, the processing graph having a plurality of processing nodes configured to process an input and generate at least one output representation of the input, the processing graph configured to apply pre-padding tiling prior to applying an input padding and an output padding, wherein the pre-padding tiling tiles the input into a set of input tiles with different tile sizes and tiles the output representation into a set of overlapping output tiles with different tile sizes, wherein the input padding pads input tiles in the set of input tiles into post-padded input tiles, and wherein the output padding pads overlapping output tiles in the set of overlapping output tiles into post-padded overlapping output tiles, comprising:
compile time logic configured to modify the processing graph and generate a modified processing graph,
the modified processing graph configured to apply a post-padding tiling after applying a cumulative input padding that confines padding to the input and compensates for the output padding,
wherein the cumulative input padding pads the input into a padded input, and
wherein the post-padding tiling tiles the padded input into a set of pre-padded input tiles with a same tile size and tiles the output representation into a set of non-overlapping output tiles with a same tile size; and runtime logic configured with the compile time logic to execute the modified processing graph to execute the application.

72. A data processing system, comprising:
compile time logic configured to modify a processing graph and generate a modified processing graph,
the modified processing graph configured to apply a post-padding tiling after applying a cumulative input padding that confines padding to an input to the processing graph and compensates for an intermediate padding in the processing graph,
wherein the cumulative input padding pads the input into a padded input, and
wherein the post-padding tiling tiles the padded input into a set of pre-padded input tiles with a same tile size, tiles at least one intermediate representation generated by the processing graph into a set of intermediate tiles with a same tile size, and tiles at least one output representation generated by the processing graph into a set of non-overlapping output tiles with a same tile size; and
runtime logic configured with the compile time logic to execute the modified processing graph to execute the application.

73. A computer-implemented method, including:
receiving an input tensor and storing the input tensor in a memory;
padding the input tensor, by adding one or more rows and columns of padding pixels along a periphery of the input tensor, to generate a padded input tensor, wherein the padding pixels comprise zero value;
tiling the padded input tensor into a plurality of at least partially overlapping input tiles having the same dimensions,
wherein the plurality of input tiles comprises (i) a first input tile having padding pixels on exactly two edges, (ii) a second input tile having padding pixels on exactly one edge, and (iii) a third input tile that does not include any padding pixel;
processing individual input tiles of the plurality of input tiles of the padded image using a kernel, to generate corresponding intermediate tiles of a plurality of intermediate tiles of an intermediate tensor; and
storing the plurality of intermediate tiles in the memory.

74. The computer-implemented method of claim 73, wherein the first input tile, the second input tile, and the third input tile are respectively processed to generate a first intermediate tile, a second intermediate tile, and a third intermediate tile of the plurality of intermediate tiles, and wherein the method further comprises:
updating at least some of the plurality of intermediate tiles, by assigning a zero value to a plurality of peripheral pixels that are along exactly two edges of the first intermediate tile and that are along exactly one edge of the second intermediate tile, without assigning a zero value to any pixel of the third intermediate tile.

75. The computer-implemented method of claim 74, wherein:
the one or more rows and columns of the padding pixels comprise a first number of rows and columns of the padding pixels;
the plurality of peripheral pixels, to which the zero value is assigned, comprises a second number of rows and columns of peripheral pixels; and
each of the first number and the second number is a positive integer higher than zero, and the first number is higher than the second number.

76. The computer-implemented method of claim 75, wherein:
the first number is one more than the second number.

77. The computer-implemented method of claim 74, wherein processing individual input tiles of the plurality of input tiles comprises convoluting individual input tiles of the plurality of input tiles with the kernel.

78. The computer-implemented method of claim 74, wherein:
the first input tile and the second input tile are respectively processed to generate a first intermediate tile and a second intermediate tile of the plurality of intermediate tiles;
in the intermediate tensor, the first intermediate tile and the second intermediate tile overlaps to form an overlapping region between the first and second intermediate tiles; and
storing the plurality of intermediate tiles in the memory comprising storing the first and second intermediate tiles separately, such that the overlapping region is stored as a part of the first intermediate tile and as a part of the second intermediate tile.

79. The computer-implemented method of claim 74, further comprising:
processing individual intermediate tiles of the plurality of intermediate tiles using another kernel, to generate corresponding output tiles of a plurality of output tiles of an output tensor.

80. The computer-implemented method of claim 79, wherein the output tiles within the output tensor do not overlap with each other.

81. The computer-implemented method of claim 73, wherein the first input tile has padding pixels only on a left edge and a top edge, the second input tile has padding pixels only on a top edge, a fourth input tile of the plurality of input tiles has padding pixels only on a right edge and a top edge, a fifth input tile of the plurality of input tiles has padding pixels only on a left edge, a sixth input tile of the plurality of input tiles has padding pixels only on a right edge, a seventh input tile of the plurality of input tiles has padding pixels only on a left edge and a bottom edge, an eighth input tile of the plurality of input tiles has padding pixels only on a bottom edge, and a ninth input tile of the plurality of input tiles has padding pixels only on a right edge and a bottom edge.

82. The computer-implemented method of claim 73, wherein the plurality input tiles are at least partially overlapping such that:
an overlap region is formed between the first and second input tiles, such that a first section of the overlap region comprises a corresponding section of the input image, and a second section of the overlap region comprises one or more padding pixels.

83. The computer-implemented method of claim 73, further comprising:
generating input tiling metadata that comprises dimensionality and overlap information associated with the plurality of input tiles; and
storing the input tiling metadata in the memory.

84. A data processing system, comprising:
padding logic to zero-pad an input tensor by adding first number of lines of zero-valued pixels around a periphery of the input tensor, to generate a padded input tensor;
tiling logic to tile the padded input tensor into a plurality of input tiles;

one or more processors to process individual input tiles of the plurality of input tiles with a kernel, to generate a corresponding plurality of intermediate tiles of an intermediate tensor, wherein the intermediate tensor comprising plurality of intermediate tiles includes (i) a central area and (ii) a second number of lines of pixels arranged around the central area, and wherein one or more pixels within the second number of lines of pixels comprise non-zero pixel values; and a zero-assigning logic to assign zero-values to each pixel within the second number of lines of pixels within the intermediate tensor.

85. The data processing system of claim 84, wherein any two neighboring intermediate tiles within the plurality of intermediate tiles have a corresponding overlap region.

Clause Set 10 (Weight Gradient Calculation in Backward Pass)

1. A non-transitory computer readable storage medium impressed with computer program instructions, the instructions, when executed on a processor, implement a method comprising:
generating a plurality of partial weight gradients, based on processing a corresponding plurality of gradient tiles of a gradient tensor; and
generating, based on the plurality of partial weight gradients, a final weight gradient corresponding to the gradient tensor.

2. The non-transitory computer readable storage medium of claim 1, wherein generating the final weight gradient comprises:
summing the plurality of partial weight gradients, to generate the final weight gradient.

3. The non-transitory computer readable storage medium of claim 2, wherein generating the final weight gradient comprises:
averaging the sum of the plurality of partial weight gradients, to generate the final weight gradient.

4. The non-transitory computer readable storage medium of claim 1, wherein generating the plurality of partial weight gradients comprises:
generating a first partial weight gradient of the plurality of partial weight gradients, based on processing a first gradient tile of the plurality of gradient tiles; and
generating a second partial weight gradient of the plurality of partial weight gradients, based on processing a second gradient tile of the plurality of gradient tiles.

5. The non-transitory computer readable storage medium of claim 1, wherein the plurality of partial weight gradients is generated based on processing a corresponding plurality of gradient tiles of a gradient tensor and a corresponding plurality of input tiles of an input tensor.

6. The non-transitory computer readable storage medium of claim 5, wherein:
the plurality of input tiles of the input tensor is generated by an $(L)^{th}$ layer of a forward pass of a processing graph;
the plurality of gradient tiles of the gradient tensor is generated by an $(L+1)^{th}$ layer of a backward pass of the processing graph; and
plurality of partial weight gradients is generated by an $(L)^{th}$ layer of the backward pass of the processing graph.

7. The non-transitory computer readable storage medium of claim 5, wherein generating the plurality of partial weight gradients comprises:
generating a first partial weight gradient of the plurality of partial weight gradients, based on processing a first gradient tile of the plurality of gradient tiles and a first input tile of the plurality of input tiles; and
generating a second partial weight gradient of the plurality of partial weight gradients, based on processing a second gradient tile of the plurality of gradient tiles and a second input tile of the plurality of input tiles.

8. The non-transitory computer readable storage medium of claim 6, further comprising:
training weights of the $(L)^{th}$ layer of the forward pass, based on the final weight gradient generated for the $(L)^{th}$ layer of the backward pass.

9. The non-transitory computer readable storage medium of claim 1, further comprising:
generating, by one or more on-chip reconfigurable processors, the plurality of partial weight gradients;
storing, on one or more on-chip memory, the generated plurality of partial weight gradients;
generating the final weight gradient, based on the plurality of partial weight gradients stored on the one or more on-chip memory; and
writing the final weight gradient to an off-chip memory.

10. The non-transitory computer readable storage medium of claim 9, wherein one or more, or all, of the plurality of partial weight gradients is not stored in the off-chip memory.

11. The non-transitory computer readable storage medium of claim 1, further comprising:
training weights of a processing node, using the final weight gradient.

12. A data processing system, comprising:
compile time logic configured to process a processing graph to generate a modified processing graph comprising a plurality of forward processing nodes of a forward pass and a plurality of backward processing nodes of a backward pass; and
runtime logic configured with the compile time logic to execute the modified processing graph to:
generate, at a backward processing node of the plurality of backward processing nodes, a plurality of partial weight gradients, based on processing a corresponding plurality of gradient tiles of a gradient tensor, and
generate, based on the plurality of partial weight gradients, a final weight gradient corresponding to the gradient tensor.

13. A computer implemented method, comprising:
generating a plurality of partial weight gradients, based on processing a corresponding plurality of gradient tiles of a gradient tensor; and
generating, based on the plurality of partial weight gradients, a final weight gradient corresponding to the gradient tensor.

14. The method of claim 13, wherein generating the final weight gradient comprises:
summing the plurality of partial weight gradients, to generate the final weight gradient.

15. The method of claim 14, wherein generating the final weight gradient comprises:
averaging the sum of the plurality of partial weight gradients, to generate the final weight gradient.

16. The method of claim 13, wherein generating the plurality of partial weight gradients comprises:
generating a first partial weight gradient of the plurality of partial weight gradients, based on processing a first gradient tile of the plurality of gradient tiles; and
generating a second partial weight gradient of the plurality of partial weight gradients, based on processing a second gradient tile of the plurality of gradient tiles.

17. The method of claim 13, wherein the plurality of partial weight gradients is generated based on processing a corresponding plurality of gradient tiles of a gradient tensor and a corresponding plurality of input tiles of an input tensor.

18. The method of claim 17, wherein:
the plurality of input tiles of the input tensor is generated by an $(L)^{th}$ layer of a forward pass of a processing graph;
the plurality of gradient tiles of the gradient tensor is generated by an $(L+1)^{th}$ layer of a backward pass of the processing graph; and
plurality of partial weight gradients is generated by an $(L)^{th}$ layer of the backward pass of the processing graph.

19. The method of claim 18, wherein generating the plurality of partial weight gradients comprises:
generating a first partial weight gradient of the plurality of partial weight gradients, based on processing a first gradient tile of the plurality of gradient tiles and a first input tile of the plurality of input tiles; and
generating a second partial weight gradient of the plurality of partial weight gradients, based on processing a second gradient tile of the plurality of gradient tiles and a second input tile of the plurality of input tiles.

20. The method of claim 18, further comprising:
training weights of the $(L)^{th}$ layer of the forward pass, based on the final weight gradient generated for the $(L)^{th}$ layer of the backward pass.

Clause Set 11 (Backward Pass)

1. A data processing system configured to receive a graph with a sequence of layers, comprising:
a runtime logic configured to
execute a first forward subgraph in a sequence of forward subgraphs of the graph in a first forward topology of tiling configurations to forward propagate a first set of input tiles through a first input layer and generate a first set of intermediate tiles, forward propagate the first set of intermediate tiles through a first intermediate layer and generate a first set of further intermediate tiles, and forward propagate the first set of further intermediate tiles through a first output layer and generate a first set of non-overlapping output tiles; and
execute a first backward subgraph in a sequence of backward subgraphs of the graph in a first backward topology of tiling configurations to backward propagate a first set of non-overlapping input gradient tiles through a first backpropagation input layer and generate (i) a first set of intermediate gradient tiles and (ii) first input weight gradients for the first output layer, backward propagate the first set of intermediate gradient tiles through a first backpropagation intermediate layer and generate (i) a first set of further intermediate gradient tiles and (ii) first intermediate weight gradients for the first intermediate layer, and backward propagate the first set of further intermediate gradient tiles through a first backpropagation output layer and generate (i) a first set of output gradient tiles and (ii) first output weight gradients for the first input layer.

2. The data processing system of claim 1, wherein the runtime logic is further configured to:
execute a second forward subgraph in the sequence of forward subgraphs of the graph in a second forward topology of tiling configurations to forward propagate a second set of input tiles through a second input layer and generate a second set of intermediate tiles, forward propagate the second set of intermediate tiles through a second intermediate layer and generate a second set of further intermediate tiles, and forward propagate the second set of further intermediate tiles through a second output layer and generate a second set of non-overlapping output tiles; and
execute a second backward subgraph in the sequence of backward subgraphs of the graph in a second backward topology of tiling configurations to backward propagate a second set of non-overlapping input gradient tiles through a second backpropagation input layer and generate (i) a second set of intermediate gradient tiles and (ii) second input weight gradients for the second output layer, backward propagate the second set of intermediate gradient tiles through a second backpropagation intermediate layer and generate (i) a second set of further intermediate gradient tiles and (ii) second intermediate weight gradients for the second intermediate layer, and backward propagate the second set of further intermediate gradient tiles through a second backpropagation output layer and generate (i) a second set of output gradient tiles and (ii) second output weight gradients for the second input layer.

3. The data processing system of claim 2, wherein the second forward subgraph succeeds the first forward subgraph in the sequence of forward subgraphs.

4. The data processing system of claim 3, wherein the first backward subgraph succeeds the second backward subgraph in the sequence of backward subgraphs.

5. The data processing system of claim 4, wherein the runtime logic is further configured to generate the second set of non-overlapping input gradient tiles with respect to a cost function.

6. The data processing system of claim 2, wherein the second backward topology of tiling configurations is different from the first backward topology of tiling configurations.

7. The data processing system of claim 4, wherein the runtime logic is further configured to
aggregate the second set of output gradient tiles into an aggregate input stored in memory; and
read the first set of non-overlapping input gradient tiles from the aggregate input.

8. The data processing system of claim 4, wherein the runtime logic is further configured to:
generate the second set of output gradient tiles of the second backward subgraph in an overlapping tiling configuration; and
write the second set of output gradient tiles in a memory in the overlapping configuration, wherein an overlapping region between any two neighboring output gradient tiles of the second set of output gradient tiles comprises an aggregate of a corresponding region of a first neighboring output gradient tile of the second set of output gradient tiles and a corresponding region of a second neighboring output gradient tile of the second set of output gradient tiles.

9. The data processing system of claim 8, wherein the runtime logic is further configured to:
retile the second set of output gradient tiles written in the memory, to generate the first set of non-overlapping input gradient tiles.

10. The data processing system of claim 8, wherein:
the second set of output gradient tiles written in the memory comprises (i) a central region and (ii) peripheral region surrounding the central region and forming a border around the central region; and the central region is retiled to generate the first set of non-overlapping input gradient tiles.

11. The data processing system of claim 10, wherein: the peripheral region of the second set of output gradient tiles written in the memory is not included in the first set of non-overlapping input gradient tiles.

12. The data processing system of claim 11, wherein: the peripheral region of the second set of output gradient tiles is not processed by the first backward subgraph.

13. The data processing system of claim 4, wherein:
a number of output gradient tiles in the second set of output gradient tiles is same as a number of input gradient tiles in the first set of non-overlapping input gradient tiles;
a size of each output gradient tile in the second set of output gradient tiles is the same;
a size of each input gradient tile in the first set of non-overlapping input gradient tiles is the same; and
the size of each output gradient tile in the second set of output gradient tiles is larger than the size of each input gradient tile in the first set of non-overlapping input gradient tiles.

14. The data processing system of claim 1, wherein:
gradient tiles in the first set of intermediate gradient tiles share overlapping regions with adjacent gradient tiles in the first set of intermediate gradient tiles;
the runtime logic is further configured to store the gradient tiles in the first set of intermediate gradient tiles such that the overlapping regions are redundantly localized in each of the gradient tiles in the first set of intermediate gradient tiles to form a modified first set of standalone intermediate gradient tiles with no overlaps; and
the runtime logic is further configured to read the modified first set of standalone intermediate gradient tiles with no overlaps on a tile-by-tile basis to generate the first set of further intermediate gradient tiles and/or the first intermediate weight gradients.

15. The data processing system of claim 14, wherein:
tiles in the first set of intermediate tiles share overlapping regions with adjacent tiles in the first set of intermediate tiles;
the runtime logic is further configured to store the tiles in the first set of intermediate tiles such that the overlapping regions are redundantly localized in each of the tile in the first set of intermediate tiles to form a modified first set of standalone intermediate tiles with no overlaps; and
the runtime logic is further configured to read the modified first set of standalone intermediate tiles with no overlaps on a tile-by-tile basis to generate the first set of further intermediate gradient tiles and/or the first intermediate weight gradients.

16. The data processing system of claim 1, wherein:
gradient tiles in the first set of further intermediate gradient tiles share overlapping regions with adjacent gradient tiles in the first set of further intermediate gradient tiles;
the runtime logic is further configured to store the gradient tiles in the first set of further intermediate gradient tiles such that the overlapping regions are redundantly localized in each of the gradient tiles in the first set of further intermediate gradient tiles to form a first set of standalone further intermediate gradient tiles with no overlaps; and
the runtime logic is further configured to read the first set of standalone further intermediate gradient tiles on a tile-by-tile basis to generate the first set of output gradient tiles and/or the first output weight gradients.

17. The data processing system of claim 2, wherein the runtime logic is further configured to read the second set of non-overlapping output tiles on a tile-by-tile basis to generate the second set of non-overlapping input gradient tiles.

18. The data processing system of claim 1, wherein the runtime logic is further configured to read the first set of non-overlapping input gradient tiles on a tile-by-tile basis to generate the first set of intermediate gradient tiles.

19. The data processing system of claim 2, wherein a third forward graph succeeds the second forward subgraph in the sequence of forward graphs.

20. The data processing system of claim 19, wherein the second backward subgraph succeeds a third backward subgraph in the sequence of backward subgraphs.

21. The data processing system of claim 20, wherein the runtime logic is further configured to execute the third backward subgraph in a third backward topology of tiling configurations, wherein the third backward topology of tiling configurations is different from the second backward topology of tiling configurations and the first backward topology of tiling configurations.

22. The data processing system of claim 1, wherein the runtime logic is further configured to use the weight gradients to update weights of layers in the sequence of layers, and to use the layers with the updated weights for inference.

23. The data processing system of claim 22, wherein the runtime logic is further configured to update the weights on mini-batch cycle-basis.

24. The data processing system of claim 1, wherein the runtime logic is further configured to use an index tensor of non-overlapping tiles for pooling operations for the backward propagation.

25. The data processing system of claim 1, wherein the runtime logic is further configured to:
update weights of the first input layer, based at least in part on the first output weight gradients;
update weights of the first intermediate layer, based at least in part on the first intermediate weight gradients; and
update weights of the first output layer, based at least in part on the first input weight gradients.

26. The data processing system of claim 1, wherein:
the first set of intermediate gradient tiles comprises overlapping gradient tiles, such that gradient tiles in the first set of intermediate gradient tiles share overlapping regions with adjacent gradient tiles in the first set of intermediate gradient tiles.

27. The data processing system of claim 1, wherein:
the first set of further intermediate gradient tiles comprises overlapping gradient tiles, such that gradient tiles in the first set of further intermediate gradient tiles share overlapping regions with adjacent gradient tiles in the first set of further intermediate gradient tiles.

28. The data processing system of claim 1, wherein:
the first set of output gradient tiles comprises overlapping gradient tiles, such that gradient tiles in the first set of output gradient tiles share overlapping regions with adjacent gradient tiles in the first set of output gradient tiles.

29. A data processing system configured, comprising:
compile time logic configured to
partition training of a graph into a sequence of forward pass subgraphs and a sequence of backward pass subgraphs, configure forward pass subgraphs in the sequence of forward pass subgraphs to generate outputs with non-overlapping tiles, and configure backward pass subgraphs in the sequence of backward pass subgraphs to process inputs with non-overlapping tiles; and runtime logic configured with the compile time logic to execute the configured forward pass subgraphs and the configured backward pass subgraphs.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following clauses.

What is claimed is:

1. A data processing system, comprising:
    one or more reconfigurable processors, operatively coupled to a memory, configured to execute a sequence of subgraphs of a processing graph to process an input tensor for machine learning and/or inference, the processing graph including two or more processing nodes connected by one or more edges representing dataflow between the two or more processing nodes, the sequence of subgraphs including a preceding subgraph and a succeeding subgraph each comprising a subsequence of at least one processing node of the two or more processing nodes; and
    data flow logic configured to:
    store, in the memory, a composed tensor generated from output tiles of the preceding subgraph having a first tiling configuration and comprising a respective portion of the composed tensor; and
    make input tiles available for processing by the succeeding subgraph, the input tiles each generated from the composed tensor and having a second tiling configuration that is different from the first tiling configuration.

2. The data processing system of claim 1, further comprising a host system, including the memory, operatively coupled to the one or more reconfigurable processors.

3. The data processing system of claim 1, the first tiling configuration comprising non-overlapping tiles and the second tiling configuration comprising overlapping tiles, wherein a first tile of the input tiles overlaps with a second tile of the input tiles.

4. The data processing system of claim 1, the data flow logic further configured to:
    fill a portion of the memory with zeros, the portion of memory having a size larger than a sum of sizes of the output tiles; and
    store the output tiles into the portion of the memory to form the composed tensor in the portion of the memory having a zero padding area around its perimeter;
    wherein an edge tile of the input tiles includes some of the zero padding area.

5. The data processing system of claim 4, the first tiling configuration comprising unpadded non-overlapping tiles and the second tiling configuration comprising overlapping tiles, wherein a first tile of the input tiles overlaps with a second tile of the input tiles.

6. The data processing system of claim 5, the second tiling configuration having larger tiles than the first tiling configuration.

7. The data processing system of claim 1, wherein the data flow logic is configured to store the output tiles in the memory by serially writing individual output tiles of the output tiles to the memory.

8. The data processing system of claim 1, wherein the one or more reconfigurable processors each have a coarse-grained reconfigurable architecture comprising:
    an array of configurable units, including a plurality of configurable compute units, a plurality of configurable memory units, and a plurality of address generation units, coupled together by an array-level network;
    a top-level network coupled to the plurality of address generation units of the array of configurable units;
    a first interface coupled between the top-level network and a first physical link that is coupled to a host system; and
    a second interface coupled between the top-level network and an external memory interface coupled to at least a portion of the memory;
    wherein the array of configurable units comprises the data flow logic.

9. A computer-implemented method to execute a sequence of subgraphs of a processing graph to process an input tensor for machine learning and/or inference using one or more reconfigurable processors, the processing graph including two or more processing nodes connected by one or more edges representing dataflow between the two or more processing nodes, the sequence of subgraphs including a preceding subgraph and a succeeding subgraph each comprising a subsequence of at least one processing node of the two or more processing nodes, the computer-implemented method comprising:
    storing, in a memory, a composed tensor generated from output tiles of the preceding subgraph having a first tiling configuration and comprising a respective portion of the composed tensor; and
    making input tiles generated from the composed tensor available for processing by the succeeding subgraph, the input tiles each generated from the composed tensor and having a second tiling configuration that is different from the first tiling configuration.

10. The computer-implemented method of claim 9, the second tiling configuration comprising overlapping tiles, wherein a first tile of the input tiles overlaps with a second tile of the input tiles.

11. The computer-implemented method of claim 9, further comprising:
    filling a portion of the memory with zeros, the portion of memory having a size larger than a sum of sizes of the output tiles; and
    storing the output tiles into the portion of the memory to form the composed tensor in the portion of the memory having a zero padding area around its perimeter;
    wherein an edge tile of the input tiles includes some of the zero padding area.

12. The computer-implemented method of claim 11, the first tiling configuration comprising unpadded non-overlapping tiles and the second tiling configuration comprising overlapping tiles, wherein a first tile of the input tiles overlaps with a second tile of the input tiles.

13. The computer-implemented method of claim 12, the second tiling configuration having larger tiles than the first tiling configuration.

14. The computer-implemented method of claim 9, further comprising storing the output tiles in the memory by serially writing individual output tiles of the output tiles to the memory.

15. A computer program product, the computer program product comprising a non-transitory computer readable storage medium having one or more configuration files embodied therewith, wherein the one or more configuration files, when loaded into one or more reconfigurable processors, cause the one or more reconfigurable processors to perform a method comprising:

executing a sequence of subgraphs of a processing graph to process an input tensor for machine learning and/or inference using one or more reconfigurable processors, the processing graph including two or more processing nodes connected by one or more edges representing dataflow between the two or more processing nodes, the sequence of subgraphs including a preceding subgraph and a succeeding subgraph each comprising a subsequence of at least one processing node of the two or more processing nodes;

storing, in a memory, a composed tensor generated from output tiles of the preceding subgraph having a first tiling configuration and comprising a respective portion of the composed tensor; and reading input tiles from the composed tensor for processing by the succeeding subgraph, the input tiles having a second tiling configuration that is different from the first tiling configuration.

16. The computer program product of claim 15, the second tiling configuration comprising overlapping tiles, wherein a first tile of the input tiles overlaps with a second tile of the input tiles.

17. The computer program product of claim 15, the method further comprising:

filling a portion of the memory with zeros, the portion of memory having a size larger than a sum of sizes of the output tiles; and storing the output tiles into the portion of the memory to form the composed tensor in the portion of the memory having a zero padding area around its perimeter;

wherein an edge tile of the input tiles includes some of the zero padding area.

18. The computer program product of claim 17, the first tiling configuration comprising unpadded non-overlapping tiles and the second tiling configuration comprising overlapping tiles, wherein a first tile of the input tiles overlaps with a second tile of the input tiles.

19. The computer program product of claim 18, the second tiling configuration having larger tiles than the first tiling configuration.

20. The computer program product of claim 15, the method further comprising storing the output tiles in the memory by serially writing individual output tiles of the output tiles to the memory.

* * * * *